(12) United States Patent
Yamamura

(10) Patent No.: US 10,748,015 B2
(45) Date of Patent: *Aug. 18, 2020

(54) OPTICAL UNIT, VEHICLE MONITOR, AND OBSTRUCTION DETECTOR

(71) Applicant: Koito Manufacturing Co., Ltd., Minato-ku, Tokyo (JP)

(72) Inventor: Satoshi Yamamura, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 15/434,121

(22) Filed: Feb. 16, 2017

(65) Prior Publication Data
US 2017/0159904 A1 Jun. 8, 2017

Related U.S. Application Data

(62) Division of application No. 13/640,035, filed as application No. PCT/JP2011/002175 on Apr. 12, 2011, now Pat. No. 10,192,124.

(30) Foreign Application Priority Data

Apr. 13, 2010 (JP) ................ 2010-092123
Apr. 13, 2010 (JP) ................ 2010-092124
(Continued)

(51) Int. Cl.
*B60Q 1/14* (2006.01)
*B60R 11/04* (2006.01)
(Continued)

(52) U.S. Cl.
CPC ......... *G06K 9/00825* (2013.01); *B60Q 1/143* (2013.01); *B60R 11/04* (2013.01);
(Continued)

(58) Field of Classification Search
CPC .............. B60Q 1/143; B60Q 2300/056; B60Q 2300/3321; B60Q 2300/40;
(Continued)

(56) References Cited

U.S. PATENT DOCUMENTS 4,871,256 A * 10/1989 Grindon ............... G01B 11/245
356/610
4,943,893 A 7/1990 Shibata et al.
(Continued)

FOREIGN PATENT DOCUMENTS

CN 2591773 Y 12/2003
DE 20311169 A 10/2003
(Continued)

OTHER PUBLICATIONS

European Search Report dated Jun. 6, 2018 regarding corresponding European Application No. 11768628.7 of PCT/JP2011002175.
(Continued)

*Primary Examiner* — Mohammed S Rahaman
(74) *Attorney, Agent, or Firm* — Buchanan Ingersoll & Rooney PC

(57) ABSTRACT

Disclosed is an optical unit wherein a rotating reflector rotates about a rotation axis in one direction, while reflecting light emitted from a light source. The rotating reflector is provided with a reflecting surface such that the light reflected by the rotating reflector, while rotating, forms a desired light distribution pattern, said light having been emitted from the light source. The light source is composed of light emitting elements. The rotation axis is provided within a plane that includes an optical axis and the light source. The rotating reflector is provided with, on the periphery of the rotation axis, a blade that functions as the reflecting surface.

2 Claims, 43 Drawing Sheets

US 10,748,015 B2
Page 2

(30) Foreign Application Priority Data

| Apr. 21, 2010 | (JP) | 2010-097946 |
|---|---|---|
| May 12, 2010 | (JP) | 2010-110139 |
| Feb. 3, 2011 | (JP) | 2011-021905 |

(51) Int. Cl.

| G06K 9/00 | (2006.01) |
|---|---|
| F21S 41/147 | (2018.01) |
| F21S 41/155 | (2018.01) |
| F21S 41/36 | (2018.01) |
| F21S 41/37 | (2018.01) |
| F21S 41/675 | (2018.01) |
| G01S 13/42 | (2006.01) |
| G01S 13/931 | (2020.01) |
| G01S 13/88 | (2006.01) |
| H04N 7/18 | (2006.01) |
| F21S 41/25 | (2018.01) |
| F21S 41/365 | (2018.01) |

(52) U.S. Cl.
CPC .......... *F21S 41/147* (2018.01); *F21S 41/155* (2018.01); *F21S 41/36* (2018.01); *F21S 41/37* (2018.01); *F21S 41/675* (2018.01); *G01S 13/426* (2013.01); *G01S 13/88* (2013.01); *G01S 13/931* (2013.01); *H04N 7/183* (2013.01); *B60Q 2300/056* (2013.01); *B60Q 2300/3321* (2013.01); *B60Q 2300/40* (2013.01); *B60Q 2300/41* (2013.01); *B60Q 2300/42* (2013.01); *B60Q 2300/45* (2013.01); *F21S 41/25* (2018.01); *F21S 41/365* (2018.01); *G01S 2013/93277* (2020.01)

(58) Field of Classification Search
CPC ............ B60Q 2300/41; B60Q 2300/42; B60Q 2300/45; B60R 11/04; F21S 41/147; F21S 41/148; F21S 41/153; F21S 41/155; F21S 41/25; F21S 41/36; F21S 41/365; F21S 41/37; F21S 41/675; G01S 13/426; G01S 13/88; G01S 13/931; G01S 2013/93277; G06K 9/00825; H04N 7/183
See application file for complete search history.

(56) References Cited

U.S. PATENT DOCUMENTS

| 5,412,543 | A | 5/1995 | Kobayashi et al. |
| 5,633,710 | A | 5/1997 | Kumra et al. |
| 6,034,642 | A | 3/2000 | Kojima et al. |
| 6,186,651 | B1 | 2/2001 | Sayers et al. |
| 6,351,324 | B1 | 2/2002 | Flint |
| 6,352,357 | B1 | 3/2002 | Woolard |
| 6,607,295 | B2 | 8/2003 | Hayakawa |
| 6,874,918 | B2* | 4/2005 | Tawa ............ B60Q 1/10 362/465 |
| 9,890,910 | B2 | 2/2018 | Yamamura |
| 2001/0002879 | A1 | 6/2001 | Suzuki |
| 2002/0159036 | A1* | 10/2002 | Yamagishi ....... G02B 26/123 353/31 |
| 2003/0214815 | A1 | 11/2003 | Ishida et al. |
| 2005/0078488 | A1 | 4/2005 | Oyama |
| 2005/0201117 | A1 | 9/2005 | Sugimoto et al. |
| 2005/0264275 | A1 | 12/2005 | Bosselmann et al. |
| 2006/0274546 | A1 | 12/2006 | Yamamura |
| 2007/0147055 | A1 | 6/2007 | Komatsu |
| 2007/0291487 | A1 | 12/2007 | Lee |
| 2008/0094851 | A1 | 4/2008 | Engl et al. |
| 2008/0101077 | A1 | 5/2008 | Watanabe |
| 2008/0225271 | A1 | 9/2008 | Ohmura |
| 2008/0291000 | A1 | 11/2008 | Kim et al. |
| 2009/0015388 | A1* | 1/2009 | Yagi ............ B60Q 1/0035 340/435 |
| 2009/0046474 | A1 | 2/2009 | Sato et al. |
| 2010/0033946 | A1* | 2/2010 | Chaves ............ F21S 10/06 362/35 |
| 2010/0052550 | A1 | 3/2010 | Kobayashi |

FOREIGN PATENT DOCUMENTS

| DE | 102005043594 A1 | 3/2007 | |
| EP | 0291475 A2 | 11/1988 | |
| EP | 0986716 A1 | 3/2000 | |
| JP | 04-223422 A | 8/1992 | |
| JP | 10-145129 A | 5/1998 | |
| JP | 10-253770 A | 9/1998 | |
| JP | 10253770 * | 9/1998 | ........... G02B 26/123 |
| JP | H10253770 | 9/1998 | |
| JP | 11-202236 A | 7/1999 | |
| JP | 11102236 * | 7/1999 | ........... G02B 26/123 |
| JP | H11-203904 A | 7/1999 | |
| JP | H11202236 | 7/1999 | |
| JP | 11-295632 A | 10/1999 | |
| JP | 2001-519744 A | 10/2001 | |
| JP | 2003-131141 A | 5/2003 | |
| JP | 2003-228020 A | 8/2003 | |
| JP | 2004-071393 A | 3/2004 | |
| JP | 2004-186031 A | 7/2004 | |
| JP | 2004-191863 A | 7/2004 | |
| JP | 2005-338630 A | 12/2005 | |
| JP | 2007-234479 A | 9/2007 | |
| JP | 2007-242475 A | 9/2007 | |
| JP | 2008-110723 A | 5/2008 | |
| JP | 2008-539537 A | 11/2008 | |
| JP | 2009-018726 A | 1/2009 | |
| JP | 2009-202756 A | 9/2009 | |
| JP | 2009-224039 A | 10/2009 | |
| JP | 2010-006109 A | 1/2010 | |
| JP | 2010039416 A | 2/2010 | |
| JP | 2010-064642 A | 3/2010 | |
| WO | 2006/116960 A | 11/2006 | |
| WO | 2007/049221 A | 5/2007 | |
| WO | 2008/053521 A1 | 5/2008 | |

OTHER PUBLICATIONS

Office Action (Notification of Reasons for Refusal) dated May 30, 2017, by the Japanese Patent Office in corresponding Japanese Patent Application No. 2016-140190, and an English translation of the Office Action. (6 pgs).
Chinese Office Action dated May 5, 2014 issued in corresponding Chinese Patent Appln. No. 201180018287.5, with English translation (23 pages).
Chinese Office Action dated Dec. 8, 2014 issued in corresponding Chinese Patent Appln. No. 201180018287.5, with English translation (19 pages).
International Preliminary Report on Patentability dated Nov. 6, 2012 issued in corresponding International Appln. No. PCT/JP2011/002175 (9 pages).
International Search Report dated Jul. 12, 2011 issued in corresponding International Appln. No. PCT/JP2011/002175 (7 pages).
Japanese Office Action dated May 17, 2016 in corresponding Japanese Patent Appln. No. 2014-227060, with English translation (6 pages).
Japanese Office Action dated May 17, 2016 in corresponding Japanese Patent Appln. No. 2014-227061, with English translation (6 pages).
Japanese Office Action dated May 17, 2016 in corresponding Japanese Patent Appln. No. 2014-227062, with English translation (6 pages).
Japanese Office Action dated Sep. 1, 2015 issued in corresponding Japanese Patent Appln. No. 2014-227060, with English translation (6 pages).
Japanese Office Action dated Sep. 1, 2015 issued in corresponding Japanese Patent Appln. No. 2014-227061, with English translation (9 pages).

(56) References Cited

OTHER PUBLICATIONS

Japanese Office Action dated Sep. 1, 2015 issued in corresponding Japanese Patent Appln. No. 2014-227062, with English translation (8 pages).
Japanese Office Action dated Sep. 9, 2014 issued in corresponding Japanese Patent Appln. No. 2012-510572, with English translation (8 pages).
Japanese Office Action dated Sep. 13, 2016 issued in corresponding Japanese Patent Appln. No. 2015-215960, with English translation (6 pages).
Chinese Office Action dated Dec. 30, 2016 issued in corresponding Chinese Patent Appln. No. 201510156240.5, with English translation (18 pages).
Official Action on related U.S. Appl. No. 15/434,107, dated Nov. 8, 2018.
Official Action on related U.S. Appl. No. 15/434,156, dated Nov. 8, 2018.
Office Action for corresponding JP application No. 2016-225855, (dated Feb. 20, 2018), JPO.
Supplementary Partial Search Report for corresponding EP Application No. 11768628.7, (dated Feb. 21, 2018).
Office Action (Notification of Reason(s) for Refusal) dated Nov. 7, 2017 by the Japanese Patent Office in corresponding Japanese Patent Application No. 2016-140190 and an English translation of the Office Action (6 pages).
Office Action (Notification of Reason(s) for Refusal) dated Sep. 5, 2017 by the Japanese Patent Office in corresponding Japanese Patent Application No. 2016-225855 and an English translation of the Office Action (6 pages).
Office Action (Notification of Reason(s) for Refusal) dated Apr. 23, 2019 in corresponding Japanese Patent Application No. 2018-145038, and an English translation thereof.
Non-Final Office Action dated Apr. 18, 2019 in U.S. Appl. No. 15/434,156.
Final Office Action dated May 9, 2019 in U.S. Appl. No. 15/434,107.
Office Action dated Aug. 16, 2019 in correspsonding U.S. Appl. No. 15/434,107.
Office Action (Communication pursuant to Article 94(3) EPC) dated Oct. 1, 2019, by the European Patent Office in corresponding European Patent Application No. 11768628.7. (6 pages).

* cited by examiner

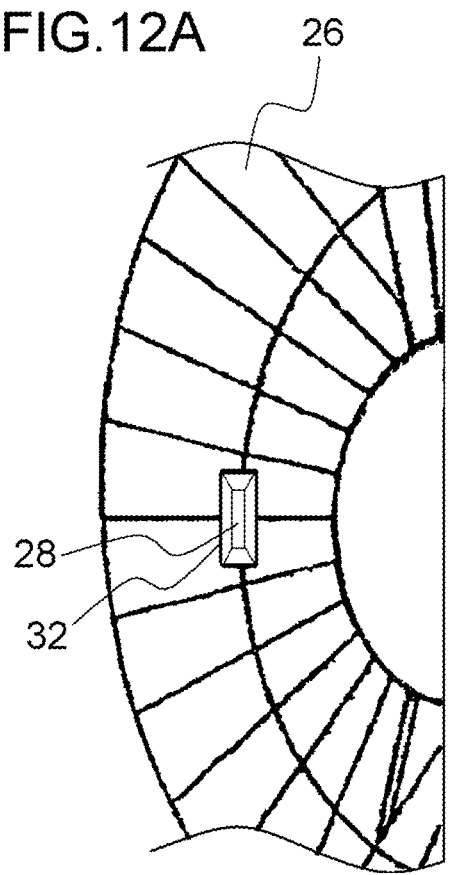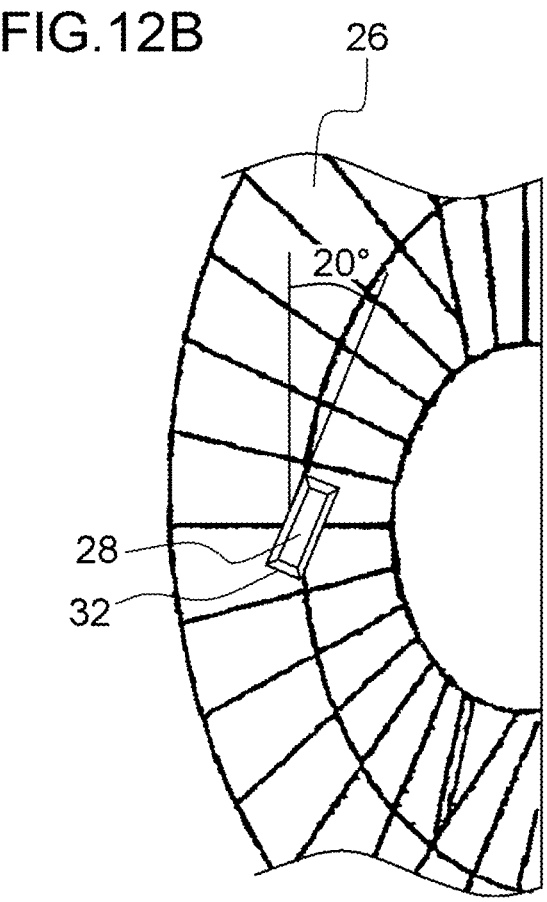

○ FOCAL POINT CORRESPONDING TO MILLIMETER WAVE
※ FOCAL POINT CORRESPONDING TO VISIBLE LIGHT

OPTICAL UNIT, VEHICLE MONITOR, AND OBSTRUCTION DETECTOR

CROSS-REFERENCE TO RELATED APPLICATIONS

This application is based upon and claims the benefit of priority from the prior Japanese Patent Application No. 2010-092123, filed on Apr. 13, 2010, Japanese Patent Application No. 2010-092124, filed on Apr. 13, 2010, Japanese Patent Application No. 2010-097946, filed on Apr. 21, 2010, Japanese Patent Application No. 2010-110139, filed on May 12, 2010, and Japanese Patent Application No. 2011-021905, filed on Feb. 3, 2011, the entire contents of which are incorporated herein by reference.

BACKGROUND OF THE INVENTION

1. Field of the Invention

The present invention relates to an optical unit, and more particularly, to an optical unit used for a vehicle lamp. Further, the present invention relates to a vehicle monitor. Furthermore, the present invention relates to an obstruction detector.

2. Description of the Related Art

In recent years, a vehicle headlight that includes a mirror and can reciprocatively turn the mirror has been known (see Patent Document 1). The mirror reflects light emitted from a light source, which is formed of a plurality of light emitting elements, to the front of a vehicle. The vehicle headlight can scan an illumination region in front of a vehicle with light reflected by the mirror that is reciprocatively turned. The vehicle headlight includes an actuator that makes the mirror be reciprocatively turned.

Further, in the past, a method of detecting the light of a lamp of a vehicle, which is present on the front, using a camera has been known as a method of detecting a vehicle that travels on the front at night. However, this method has a possibility that the light reflected by a reflective object, such as a roadside delineator or a signboard, is erroneously detected as the light of a lamp of a vehicle. Accordingly, there is known a technique that discriminates a lamp of a vehicle, which is present on the front, from other reflective objects using a fact that the brightness of reflected light is changed when the brightness of a headlamp is reduced (see Patent Document 2).

Furthermore, various methods of detecting vehicles-in-front or pedestrians and obstructions, which are present in front of a vehicle, have been devised in the past. Patent Document 3 discloses a vehicle illumination device that includes an infrared sensor for detecting an object around a vehicle using infrared light and a visible light source irradiating the object with visible light when the infrared sensor detects the object. The vehicle illumination device scans a region in front of the vehicle in a predetermined pattern with infrared light, which is reflected by a reflecting mirror to be reciprocatively turned.

CITATION LIST

Patent Document

Patent Document 1: JP 2009-224039 A
Patent Document 2: JP 2001-519744 W
Patent Document 3: JP 2009-18726 A However, since the above-mentioned actuator includes a permanent magnet and a coil, there is a restriction on the size of the mirror that can be reciprocatively turned. For this reason, it is difficult to increase a ratio of light, which is reflected by the mirror, to the light emitted from a light source. Accordingly, there is room for improvement in terms of the efficient use of the light emitted from the light source.

Further, an additional circuit is required in the technique disclosed in Patent Document 2 in order to reduce the brightness of the headlamp, so that costs are increased. Furthermore, since the brightness of the headlamp is temporarily changed, a driver may feel discomfort.

Meanwhile, a method using a millimeter-wave radar has been developed as another method of detecting a vehicle-in-front or the like that is present in front of a vehicle. When a normal millimeter-wave radar is mounted on a vehicle to detect an obstruction on the front, noises reflected by the road surface are increased if the mounting position of the normal millimeter-wave radar is excessively low and radar irradiation to an obstruction tends to be reduced if the mounting position of the normal millimeter-wave radar is excessively high. For this reason, a desirable place where the normal millimeter-wave radar is disposed is limited. Moreover, since the millimeter-wave radar has a size of about 80 mm×80 mm, the millimeter-wave radar needs to be disposed in consideration of the interference with other components.

SUMMARY OF THE INVENTION

The invention has been made in consideration of these circumstances, and an object of the invention is to provide a technique related to an optical unit that can efficiently use the light of a light source for illumination.

Further, another object of the invention is to provide a technique that accurately and easily detects a vehicle traveling on the front at night.

Furthermore, still another object of the invention is to provide a technique that can dispose an obstruction detector at a suitable place.

To solve the above-mentioned problems, an optical unit according to an aspect of the invention includes a rotating reflector that is rotated about a rotation axis in one direction while reflecting light emitted from a light source. The rotating reflector is provided with a reflecting surface so that the light of the light source reflected by the rotating reflector while the rotating reflector is rotated forms a desired light distribution pattern.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 12(a) is a view showing a state where a compound parabolic concentrator including a LED is disposed so that the longitudinal direction of the compound parabolic concentrator is parallel to a vertical direction, and FIG. 12(b) is a view showing a state where the compound parabolic concentrator is disposed so that the longitudinal direction of the compound parabolic concentrator is inclined with respect to the vertical direction;

DETAILED DESCRIPTION OF THE INVENTION

Figure 1:
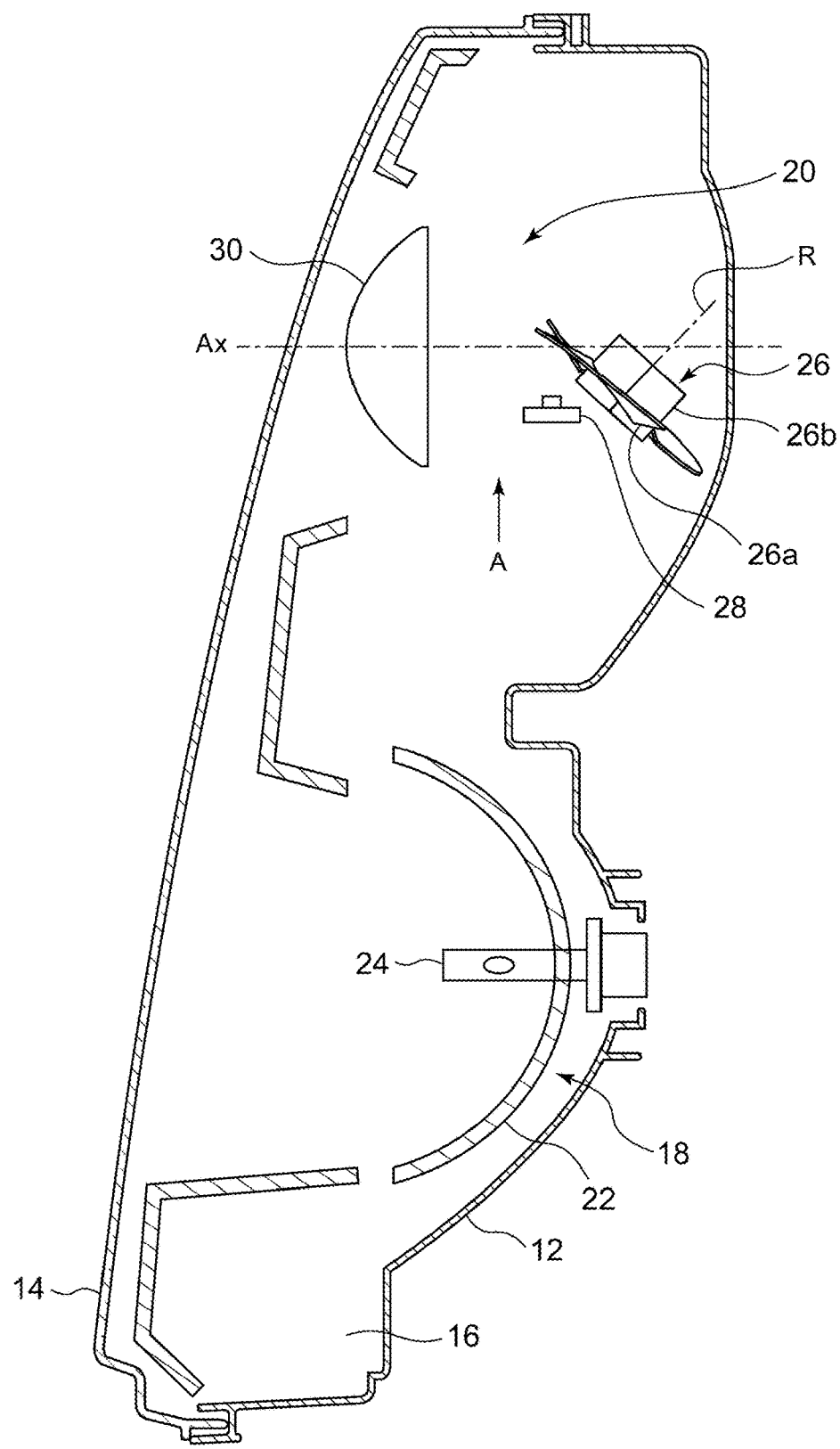
FIG. 1 is a horizontal cross-sectional view of a vehicle headlight according to this embodiment.

To solve the above-mentioned problems, an optical unit according to an aspect of the invention includes a rotating reflector that is rotated about a rotation axis in one direction while reflecting light emitted from a light source. The rotating reflector is provided with a reflecting surface so that the light of the light source reflected by the rotating reflector while the rotating reflector is rotated forms a desired light distribution pattern.

According to this aspect, since it is possible to form a desired light distribution pattern by the rotation of the rotating reflector in one direction, drive using a special mechanism such as a resonance mirror is not needed and there is less restriction on the size of the reflecting surface unlike in the resonance mirror. For this reason, it is possible to efficiently use the light, which is emitted from the light source, for illumination by selecting a rotating reflector that has a larger reflecting surface.

The optical unit may further include a light source that is formed of a light emitting element. The rotation axis may be provided on a plane that includes the optical axis and the light source. Furthermore, the rotation axis may be provided substantially parallel to a scan plane of an irradiation beam that performs scanning in a left and right direction by rotation. Accordingly, the thickness of the optical unit is reduced. Here, substantially parallel may mean virtually parallel and does not need to mean perfectly parallel. This is to allow an error in a range that does not significantly suppress the effect of an optical unit according to a certain aspect.

The rotating reflector includes blades that function as the reflecting surface and are provided around the rotation axis, and the blades have a twisted shape so that an angle between an optical axis and the reflecting surface is changed in a circumferential direction having a center on the rotation axis. Thus, the scanning with use of the light of the light source becomes possible.

The optical unit may further include a plurality of blades that are arranged in a circumferential direction of the rotation axis, and partition members that are provided between the adjacent blades and extend in a direction of the rotation axis. The partition members may be formed so as to suppress the incidence of the light emitted from the light source upon the reflecting surface of the other adjacent blade when the light emitted from the light source enters the reflecting surface of one adjacent blade. When light simultaneously enters both the adjacent blades, both end portions of a light distribution pattern shine at the same time. In this case, it is difficult to independently control the irradiation states of both the end portions of the light distribution pattern. Accordingly, the light sources are turned off at the timing where light simultaneously enters both the adjacent blades, so that both the end portions of the light distribution pattern cannot be simultaneously irradiated. Meanwhile, if the light sources are temporarily turned off at the above-mentioned timing, the brightness of both the end portions of the light distribution pattern is reduced to some extent. Accordingly, since the above-mentioned partition members are provided between the adjacent blades, it is possible to block the light, which is directed to the end portion of the adjacent blade, of the light, which is emitted from the light source irradiating the end portion of one blade, to some extent. That is, since the time, which passes while light simultaneously enters both the adjacent blades, is shortened, it is also possible to correspondingly shorten the time that passes while the light source is turned off.

The optical unit may further include a projection lens that projects the light reflected by the rotating reflector in a light irradiation direction of the optical unit. The projection lens may correct an image of the light source distorted by being reflected on the reflecting surface to a shape close to the shape of the light source itself. Thus, a desired region can be accurately irradiated.

The light source may include a rectangular light emitting surface, and each side of the light emitting surface may be inclined with respect to a vertical direction so that an image of the light source projected forward by the projection lens is substantially erected. Thus, a structure for correcting the image of the light source can be simplified.

The optical unit may further include a plurality of light sources that are formed of light emitting elements. The plurality of light sources may be disposed so that light emitted from the respective light sources is reflected at different positions on the reflecting surface. Accordingly, it is possible to form a plurality of light distribution patterns and to form new light distribution patterns by combining these light distribution patterns. Therefore, it is easier to design an ideal light distribution pattern.

The optical unit may further include: a first projection lens that projects light, which is emitted from one light source of the plurality of light sources and reflected by the rotating reflector, in a light irradiation direction of the optical unit as a first light distribution pattern; and a second projection lens that projects light, which is emitted from the other light source of the plurality of light sources and reflected by the rotating reflector, in the light irradiation direction of the optical unit as a second light distribution pattern. Thus, by appropriately selecting the projection lens, different light distribution patterns can be formed by one rotating reflector.

The light source may include a light concentrating member where a light emitting element is disposed on a bottom and a rectangular opening portion is formed. The light concentrating member may include light concentrating surfaces that are formed from the bottom toward the opening portion in order to concentrate the light of the light emitting element. The light concentrating surfaces may be formed so that the heights of end portions of the opening portion in a longitudinal direction of the opening portion are higher than the heights of end portions of the opening portion in a width direction of the opening portion. Accordingly, it is possible to suppress the generation of diffused light, which does not reach the reflecting surface of the rotating reflector, of the light of the light emitting element.

The optical unit may be formed so as to be used for a vehicle lamp.

Another aspect of the invention is also an optical unit. The optical unit according to this aspect of the invention is used for a vehicle lamp, and includes: a heat dissipation part that radiates heat of a light source; and a cooling fan. The cooling fan includes blades that form a light distribution pattern by reflecting light, which is emitted from the light source, forward and causes convection near the heat dissipation part.

According to this aspect, since it is possible to form a desired light distribution pattern using a cooling fan, drive using a special mechanism such as a resonance mirror is not needed and there is less restriction on the size of the reflecting surface unlike in the resonance mirror. For this reason, it is possible to efficiently use the light, which is emitted from the light source, for illumination by selecting a cooling fan that has a larger blade. Further, since a reflector does not need to be provided separately from the cooling fan, it is possible to simplify the structure of the optical unit.

Another aspect of the invention is a vehicle monitor. The vehicle monitor according to this aspect of the invention includes: an optical unit that forms a light distribution pattern by scanning an irradiation beam to the front of a vehicle; a camera that takes an image of a region in front of the vehicle; and a determining device that determines whether a reflective body reflecting the irradiation beam is present in a partial region on the basis of an image that is taken by the camera when the partial region included in the light distribution pattern is irradiated with the irradiation beam and an image that is taken by the camera when the partial region is not irradiated with the irradiation beam.

Still another aspect of the invention is also a vehicle monitor. The vehicle monitor according to this aspect of the invention includes: a plurality of optical units that form a light distribution pattern by scanning irradiation beams to the front of a vehicle; a camera that takes an image of a region in front of the vehicle; and a determining device that determines whether a reflective body reflecting the irradiation beam is present in a partial region on the basis of an image that is taken by the camera when the partial region included in the light distribution pattern is irradiated with the irradiation beam and an image that is taken by the camera when the partial region is not irradiated with the irradiation beam.

According to this aspect, not only a lamp of a vehicle that is present on the front but also a reflective body that reflects the irradiation beam can be detected from the image that is taken by the camera when the partial region included in the light distribution pattern is irradiated with the irradiation beam. Meanwhile, a lamp of a vehicle that is present on the front can be detected from the image that is taken by the camera when the partial region is not irradiated with the irradiation beam, but a reflective body not irradiated with the irradiation beam is not detected. Accordingly, whether a reflective body is present in a partial region can be determined through the comparison between the image that is taken when the partial region is irradiated with an irradiation beam and the image that is taken when the partial region is not irradiated with an irradiation beam.

The optical unit may scan an irradiation beam so that a region irradiated with an irradiation beam varies at each of the timing of plural times of imaging that are performed by the camera.

Each of the plurality of optical units may scan an irradiation beam so that a region irradiated with irradiation beams varies at each of the timing of plural times of imaging that are performed by the camera.

Assuming that the number of times of scanning of a first optical unit of the plurality of optical units is represented by A1 (times/s), the number of times of scanning of a second optical unit of the plurality of optical units is represented by A2 (times/s), the number of times of imaging of the camera is represented by D (times/s), and m and n are natural numbers, the following expressions (1) and (2) may be satisfied:

$$mD<A1<(m+0.5)D \text{ or } (m+0.5)D<A1<(m+1)D \quad \text{Expression (1)}$$

$$nD<A2<(n+0.5)D \text{ or } (n+0.5)D<A2<(n+1)D \quad \text{Expression (2).}$$

Accordingly, it is possible to take an image when a certain region is irradiated with an irradiation beam and an image when the certain region is not irradiated with an irradiation beam.

Assuming that the number of times of scanning of the optical unit is represented by A [times/s], scanning speed is represented by B [deg/s], the width of an irradiation beam is represented by C [deg], and the number of times of imaging of the camera is represented by D [times/s], an expression C (decimal part of $A/D) \times (B/A) \leq (B/A) - C$ may be satisfied. Accordingly, it is possible to take an image when a certain region is irradiated with an irradiation beam and an image when the certain region is not irradiated with an irradiation beam.

The optical unit may include a rotating reflector that is rotated about a rotation axis in one direction while reflecting light emitted from a light source. The rotating reflector may be provided with a reflecting surface so that the light of the light source reflected by the rotating reflector while the rotating reflector is rotated forms a desired light distribution pattern. Accordingly, it is possible to form a desired light distribution pattern by the rotation of the rotating reflector in one direction. Further, it is possible to efficiently use the light, which is emitted from the light source, for illumination by selecting a rotating reflector that has a larger reflecting surface.

The vehicle monitor may further include a controller that controls the rotational speed of the rotating reflector. Accordingly, it is possible to easily change the rotational speed of the rotating reflector to an appropriate value considering the imaging timing of the camera.

The optical unit may include a rotating reflector that is rotated about a rotation axis in one direction while reflecting light emitted from a light source. The rotating reflector may be provided with a reflecting surface so that the light of the light source reflected by the rotating reflector while the rotating reflector is rotated forms a desired light distribution pattern. Accordingly, it is possible to form a desired light distribution pattern by the rotation of the rotating reflector in one direction. Further, it is possible to efficiently use the light, which is emitted from the light source, for illumination by selecting the rotating reflector that has a larger reflecting surface.

Another aspect of the invention is an obstruction detector. The obstruction detector according to this aspect of the invention includes: an invisible-light radar; a rotating reflector that is rotated about a rotation axis in one direction while reflecting invisible light sent from the invisible-light radar; and a projection lens that focuses the invisible light reflected by the rotating reflector and projects the invisible light to a surrounding region. The rotating reflector is provided with a reflecting surface so that a surrounding region is scanned with the invisible light reflected by the rotating reflector while the rotating reflector is rotated.

According to this aspect, since it is possible to scan the surrounding region with invisible light by the operation of the rotating reflector, it is possible to simplify the structure of the invisible-light radar. Accordingly, it is possible to dispose an obstruction detector at a suitable place. Here, the surrounding region is a region around a place where the obstruction detector is installed. For example, when the obstruction detector is installed in a vehicle, the front, the rear, the side, and the like of the vehicle are included in the surrounding region.

The obstruction detector may further include a light source that is formed of a light emitting element. The rotating reflector may be provided with a reflecting surface so as to form a desired light distribution pattern in front of a vehicle by reflecting light emitted from the light source while being rotated. Furthermore, the projection lens may project the light, which is reflected by the rotating reflector, in a light irradiation direction. Accordingly, it is possible to achieve the scanning using invisible light and the formation of a light distribution pattern by the operation of the rotating reflector.

The invisible-light radar may be a millimeter-wave radar. The light source may be provided so that the position of a virtual image formed by the rotating reflector is positioned near a focal point of the projection lens corresponding to visible light. The millimeter-wave radar may be provided so that the position of a virtual image formed by the rotating reflector is positioned near a focal point of the projection lens corresponding to a millimeter wave that is different from the focal point of the projection lens corresponding to visible light. Accordingly, the millimeter-wave radar and the light source can be disposed at the positions of the focal points suitable therefore without interfering with each other.

The millimeter-wave radar may include a waveguide, and the waveguide may be provided so that the position of a virtual image of an end portion of the waveguide formed by the rotating reflector is positioned closer to the projection lens than the focal point corresponding to visible light. Accordingly, for example, the receiving part and the sending part of the millimeter-wave radar can be disposed more distant from the projection lens than the light source. As a result, light, which is directed to the projection lens from the light source, is prevented from being blocked by the receiving part and the sending part.

The projection lens may be made of a resin material. Accordingly, the weight of the obstruction detector is reduced. Further, it is possible to efficiently transmit millimeter waves.

Meanwhile, the arbitrary combination of the above-mentioned components, the changes of the expression of the invention into a method, a device, a system, and the like are effective as aspects of the invention.

The invention will be described below on the basis of embodiments with reference to the drawings. The same or equivalent components, members, and processing illustrated in the respective drawings are denoted by the same reference numeral, and the repeated description thereof will not be repeated. Further, the embodiments are illustrative without limiting the invention, and all characteristics described in the embodiments or the combination thereof may not be necessarily essential in the invention.

An optical unit of the invention may be used for various vehicle lamps. A case where the optical unit of the invention is applied to a vehicle headlight among vehicle lamps will be described below.

First Embodiment

FIG. 1 is a horizontal cross-sectional view of a vehicle headlight according to this embodiment. A vehicle headlight 10 is a right headlight that is mounted on the right side of the front end portion of an automobile, and has the same structure as a headlight mounted on the left side except that the vehicle headlight 10 is symmetrical to the headlight mounted on the left side. For this reason, in the following description, the right vehicle headlight 10 will be described in detail and the description of the left vehicle headlight will not be described.

As illustrated in FIG. 1, the vehicle headlight 10 includes a lamp body 12 that includes a recess opened forward. A front opening of the lamp body 12 is covered with a transparent front cover 14, so that a lamp chamber 16 is formed. The lamp chamber 16 functions as a space in which two lamp units 18 and 20 are received so as to be disposed side by side in the width direction of a vehicle.

Among these lamp units, an outer lamp unit, that is, the lamp unit 20 of the right vehicle headlight 10 that is disposed on the upper side in FIG. 1 is a lamp unit including a lens, and is adapted to emit a variable high beam. Meanwhile, among these lamp units, an inner lamp unit, that is, the lamp unit 18 of the right vehicle headlight 10 that is disposed on the lower side in FIG. 1 is adapted to emit a low beam.

The lamp unit 18 for a low beam includes a reflector 22, a light source bulb (incandescent bulb) 24 that is supported by the reflector 22, and a shade (not illustrated). The reflector 22 is supported so as to be tiltable with respect to the lamp body 12 by known means (not illustrated), for example, means using an aiming screw and a nut.

As illustrated in FIG. 1, the lamp unit 20 includes a rotating reflector 26, a LED 28, and a convex lens 30 as a projection lens that is disposed in front of the rotating reflector 26. Meanwhile, a semiconductor light emitting element, such as an EL element or a LD element, instead of the LED 28 may be used as a light source. In particular, it is preferable that a light source capable of being accurately turned on/off in a short time be used in the control for blocking light on a part of a light distribution pattern to be described below. The shape of the convex lens 30 may be appropriately selected according to light distribution characteristics, such as required light distribution pattern or illuminance distribution. However, an aspherical lens or a free curved-surface lens may be used. In this embodiment, an aspherical lens is used as the convex lens 30.

The rotating reflector 26 is rotated about a rotation axis R as a center in one direction by a drive source such as a motor (not illustrated). Further, the rotating reflector 26 includes a reflecting surface that is adapted to form a desired light distribution pattern by reflecting the light emitted from the LED 28 while being rotated. In this embodiment, the rotating reflector 26 forms an optical unit.

Figure 2:
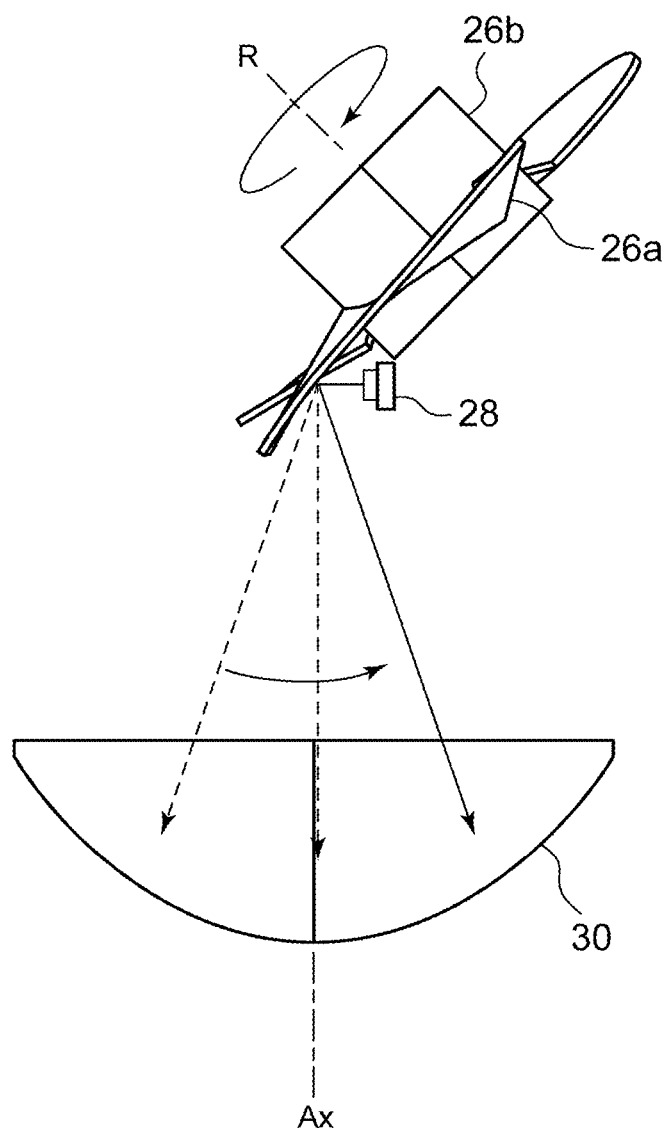
FIG. 2 is a top view schematically showing the structure of a lamp unit that includes an optical unit according to this embodiment.
Figure 3:
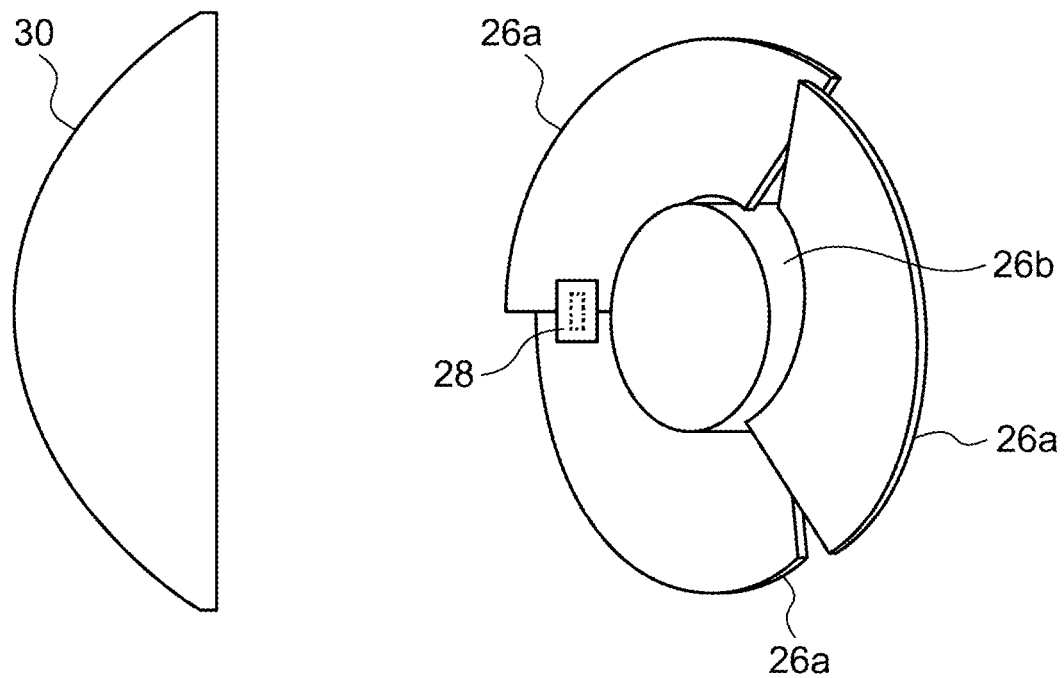
FIG. 3 is a side view when the lamp unit is seen in an "A" direction illustrated in FIG. 1.

FIG. 2 is a top view schematically showing the structure of the lamp unit 20 that includes the optical unit according to this embodiment. FIG. 3 is a side view when the lamp unit 20 is seen in an "A" direction illustrated in FIG. 1.

The rotating reflector 26 includes three blades 26a that function as the reflecting surface, have the same shape, and are provided around a cylindrical rotating part 26b. The rotation axis R of the rotating reflector 26 is inclined with respect to an optical axis Ax, and is provided in a plane that includes the optical axis Ax and the LED 28. In other words, the rotation axis R is provided substantially parallel to a scan plane of light (irradiation beam) of the LED 28 that performs scanning in a left and right direction by rotation. Accordingly, the thickness of the optical unit is reduced. Here, the scan plane may be a fan-shaped plane that is formed by continuously connecting the trajectories of light of the LED 28 that is, for example, scanning light. Further, the LED 28 of the lamp unit 20 according to this embodiment is relatively small, and the position of the LED 28 is also disposed between the rotating reflector 26 and the convex lens 30 and shifted from the optical axis Ax. For this reason, it is possible to make the vehicle headlight 10 short in a depth direction (the longitudinal direction of the vehicle) as compared to a case where a light source, a reflector, and a lens are arranged in a line on an optical axis as in a projector type lamp unit in the related art.

Furthermore, the shapes of the blades 26a of the rotating reflector 26 are formed so that a secondary light source of the LED 28 formed by reflection is formed in the vicinity of the focal point of the convex lens 30. Moreover, the blades 26a have a twisted shape so that an angle between the optical axis Ax and the reflecting surface is changed in the circumferential direction having a center on the rotation axis R. Accordingly, scanning using the light of the LED 28 can be performed as illustrated in FIG. 2. This will be described in more detail.

FIGS. 4(a) to 4(e) are perspective views showing the aspects of the blades that correspond to the rotation angle of the rotating reflector 26 of the lamp unit according to this embodiment. FIGS. 4(f) to 4(j) are views illustrating that a direction where the light emitted from the light source is reflected is changed according to the states of FIGS. 4(a) to 4(e).

Figure 4A:
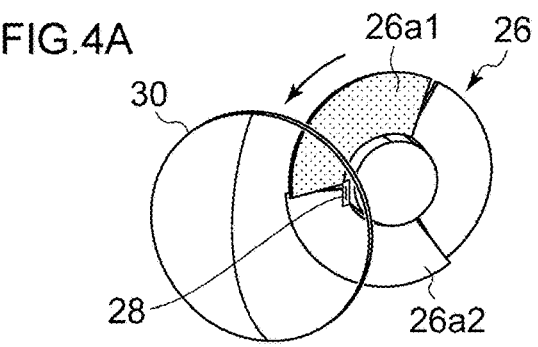
FIGS. 4(a) to 4(e) are perspective views showing the aspects of blades that correspond to the rotation angle of a rotating reflector of the lamp unit according to this embodiment.
Figure 4F:
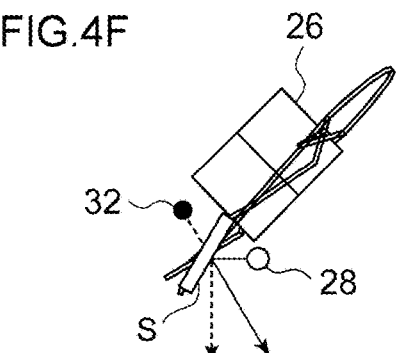
FIGS. 4(f) to 4(j) are side views illustrating a direction where the light emitted from the light source is reflected by the rotating reflector according to the states of FIGS. 4(a) to 4(e)
Figure 4B:
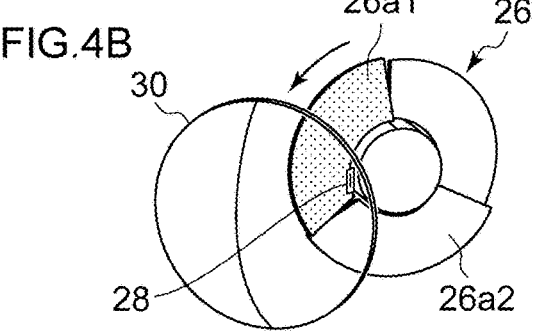
Figure 4G:
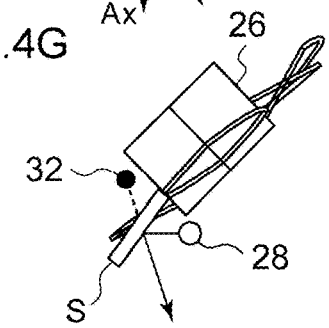

FIG. 4(a) shows a state where the LED 28 is disposed so as to irradiate a boundary region between two blades 26a1 and 26a2. In this state, the light of the LED 28 is reflected in a direction, which is inclined with respect to the optical axis Ax, by a reflecting surface S of the blade 26a1 as illustrated in FIG. 4(f). As a result, one end portion region of both left and right end portions of a region in front of the vehicle where a light distribution pattern is formed is irradiated. After that, when the rotating reflector 26 is rotated and is in the state illustrated in FIG. 4(b), the reflecting surface S of the blade 26a1 reflecting the light of the LED 28 (the angle of reflection) is changed since the blade 26a1 is twisted. As a result, the light of the LED 28 is reflected in a direction that is closer to the optical axis Ax than the reflection direction illustrated in FIG. 4(f) as illustrated in FIG. 4(g).

Figure 4C:
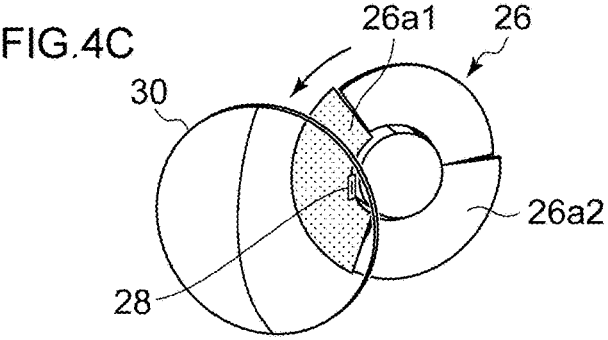
Figure 4H:
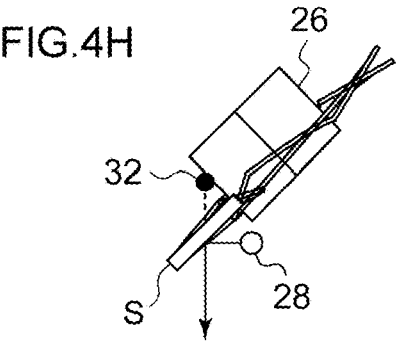
Figure 4D:
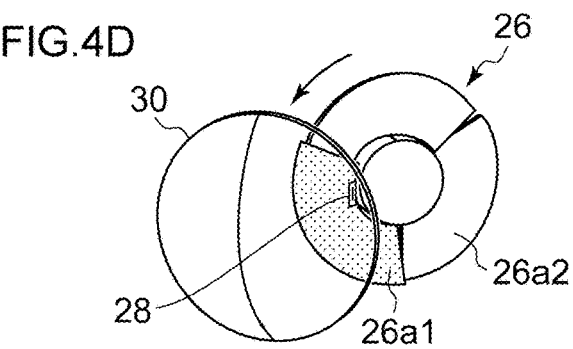
Figure 4I:
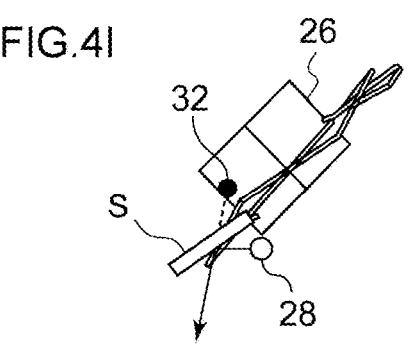
Figure 4E:
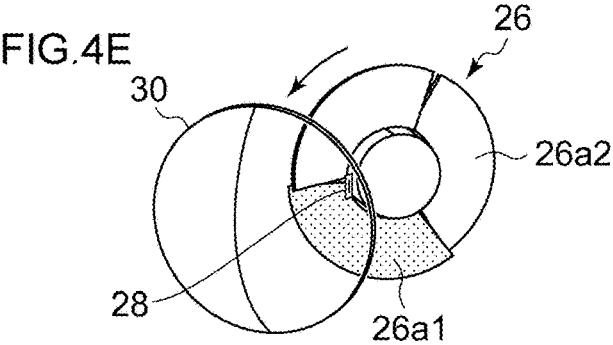
Figure 4J:
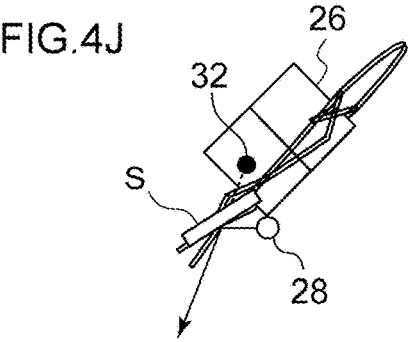
Figure 5A:
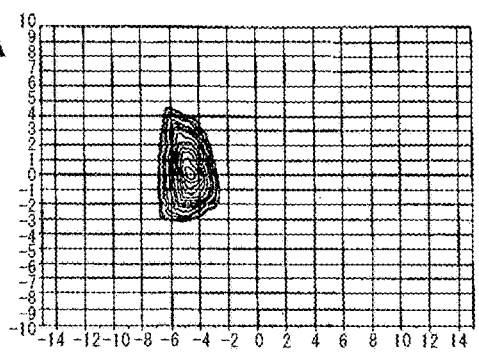
FIGS. 5(a) to 5(e) are views showing projection images at scanning positions where the rotating reflector corresponds to the states of FIGS. 4(f) to 4(j)
Figure 5B:
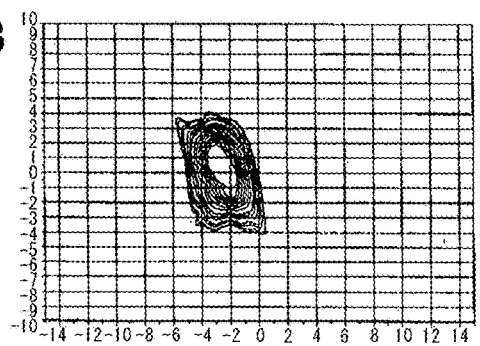
Figure 5C:
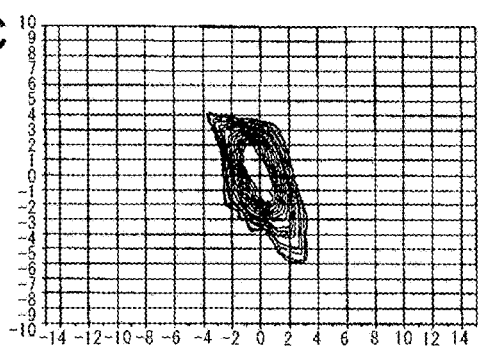
Figure 5D:
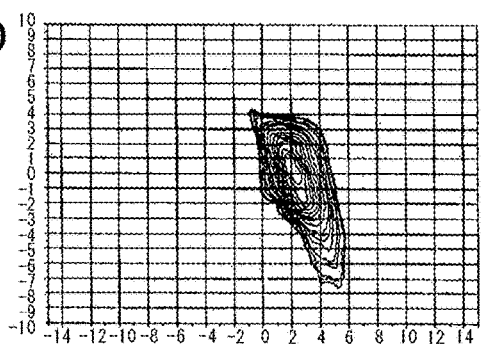
Figure 5E:
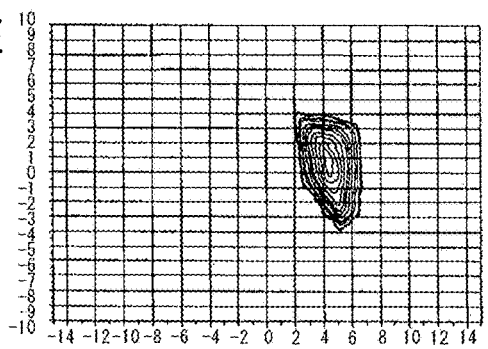

Subsequently, when the rotating reflector 26 is rotated as illustrated in FIGS. 4(c), 4(d), and 4(e), the reflection direction of the light of the LED 28 is changed toward the other end portion of both the left and right end portions of the region in front of the vehicle where the light distribution pattern is formed. The rotating reflector 26 according to this embodiment is adapted to be capable of scanning the front region in one direction (horizontal direction) one time with the light of the LED 28 by being rotated by 120°. In other words, one blade 26a passes in front of the LED 28, so that a desired region in front of the vehicle is scanned one time with the light of the LED 28. Meanwhile, as illustrated in FIGS. 4(f) to 4(j), the secondary light source (the virtual image of a light source) 32 is moved to the left and right near the focal point of the convex lens 30. The number or shapes of the blades 26a and the rotational speed of the rotating reflector 26 are appropriately set on the basis of the results of experiments or simulations in consideration of the characteristics of a required light distribution pattern or the flicker of an image to be scanned. Further, a motor is preferable as a drive part that may change rotational speed according to various kinds of control of light distribution. Accordingly, it is possible to easily change scanning timing. A motor, from which rotation timing information is obtained, is preferable as such a motor. Specifically, a DC brushless motor is used as the motor. Since rotation timing information is obtained from a motor when the DC brushless motor is used, a device such as an encoder may be omitted.

The rotating reflector 26 according to this embodiment can scan a region in front of the vehicle in the left and right direction with the light of the LED 28 through the devising of the shape or rotational speed of the blade 26a as described above. FIGS. 5(a) to 5(e) are views showing projection images at scanning positions where the rotating reflector corresponds to the states of FIGS. 4(f) to 4(j). The units of a vertical axis and a horizontal axis in FIGS. 5(a) to 5(e) are degree (°), and the vertical axis and the horizontal axis represent an irradiation range and an irradiation position. As illustrated in FIGS. 5(a) to 5(e), the projection images are moved in the horizontal direction by the rotation of the rotating reflector 26.

Figure 6A:
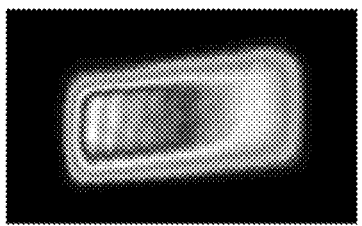
FIG. 6(a) is a view showing a light distribution pattern when a range of ±5° on the left and right sides of an optical axis is scanned by the vehicle headlight according to this embodiment.
Figure 6C:
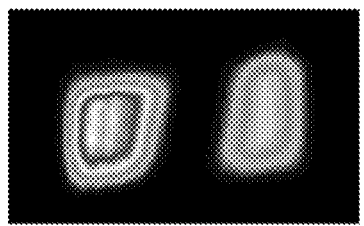
FIG. 6(c) is a view showing a state where light is blocked at one position on the light distribution pattern by the vehicle headlight according to this embodiment.
Figure 6E:
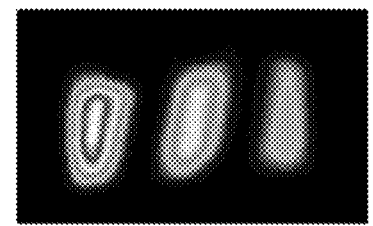
FIG. 6(e) is a view showing a state where light is blocked at a plurality of positions on the light distribution pattern by the vehicle headlight according to this embodiment.
Figure 6B:
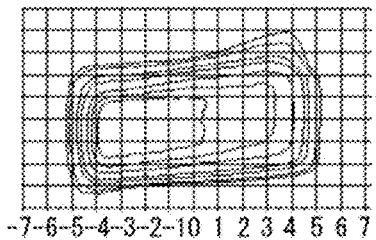
FIG. 6(b) is a view showing the light intensity distribution of the light distribution pattern illustrated in FIG. 6(a)
Figure 6D:
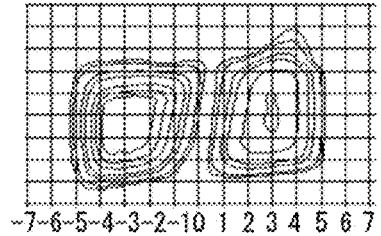
FIG. 6(d) is a view showing the light intensity distribution of the light distribution pattern illustrated in FIG. 6(c)
Figure 6F:
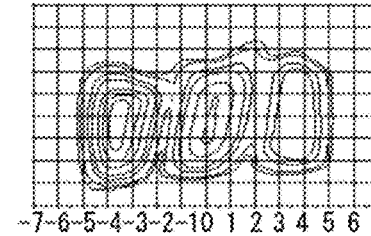
FIG. 6(f) is a view showing the light intensity distribution of the light distribution pattern illustrated in FIG. 6(e)

FIG. 6(a) is a view showing a light distribution pattern when a range of ±5° on the left and right sides of the optical axis is scanned by the vehicle headlight according to this embodiment, FIG. 6(b) is a view showing the light intensity distribution of the light distribution pattern illustrated in FIG. 6(a), FIG. 6(c) is a view showing a state where light is blocked at one position on the light distribution pattern by the vehicle headlight according to this embodiment, FIG. 6(d) is a view showing the light intensity distribution of the light distribution pattern illustrated in FIG. 6(c), FIG. 6(e) is a view showing a state where light is blocked at a plurality of positions on the light distribution pattern by the vehicle headlight according to this embodiment, and FIG. 6(f) is a view showing the light intensity distribution of the light distribution pattern illustrated in FIG. 6(e).

As illustrated in FIG. 6(a), the vehicle headlight 10 according to this embodiment can form a high beam-light distribution pattern, which is long substantially in the horizontal direction, by reflecting the light of the LED 28 with the rotating reflector 26 and scanning the front region by the reflected light. Since it is possible to form a desired light distribution pattern by the rotation of the rotating reflector 26 in one direction as described above, drive using a special mechanism such as a resonance mirror is not needed and there is less restriction on the size of the reflecting surface unlike in the resonance mirror. For this reason, it is possible to efficiently use the light, which is emitted from the light source, for illumination by selecting the rotating reflector 26 that has a larger reflecting surface. That is, it is possible to increase the maximum light intensity of the light distribution pattern. Meanwhile, the diameter of the rotating reflector 26 according to this embodiment is substantially the same as the diameter of the convex lens 30, and the area of the blade 26a can also be increased according to the diameter of the rotating reflector 26.

Further, the vehicle headlight 10, which includes the optical unit according to this embodiment, can form high beam-light distribution patterns on which light is blocked in arbitrary regions as illustrated in FIGS. 6(c) and 6(e) by synchronizing the change of the intensity of emitted light or the turning-on/off timing of the LED 28 with the rotation of the rotating reflector 26. Furthermore, when the intensity of emitted light of the LED 28 is changed (the LED 28 is turned on/off) in synchronization with the rotation of the rotating reflector 26 so that a high beam-light distribution pattern is formed, it is also possible to perform a control for swiveling a light distribution pattern itself by shifting the phase of change of light intensity.

As described above, the vehicle headlight according to this embodiment can form a light distribution pattern by scanning the light of the LED and can arbitrarily form light blocking portions at a part of the light distribution pattern by controlling the change of the intensity of emitted light. For this reason, it is possible to accurately block light in desired regions by a small number of LEDs as compared to a case where a part of a plurality of LEDs are turned off to form light blocking portions. Moreover, since the vehicle headlight 10 can form a plurality of light blocking portions, it is possible to block light in the regions corresponding to the respective vehicles even when a plurality of vehicles is present in the front region.

Further, since the vehicle headlight 10 can control the blocking of light without moving a light distribution pattern that forms a base, it is possible to reduce the discomfort that is felt by a driver at the time of the control of the blocking of light. Furthermore, since it is possible to swivel a light distribution pattern without moving the lamp unit 20, it is possible to simplify the mechanism of the lamp unit 20. For this reason, the vehicle headlight 10 only has to include a motor, which is required for the rotation of the rotating reflector 26, as a drive part for variable control of light distribution. Accordingly, the vehicle headlight is simplified in structure and is reduced in cost and size.

Moreover, the LED 28 is disposed in front of the rotating reflector 26 according to this embodiment as illustrated in FIGS. 1 and 2, and the rotating reflector 26 according to this embodiment functions as a cooling fan that sends air to the LED 28. For this reason, a cooling fan and a rotating reflector do not need to be separately provided, so that it is possible to simplify the structure of the optical unit. Further, since the LED 28 is cooled with the air sent by the rotating reflector 26, a heat sink for cooling the LED 28 can be omitted or reduced in size. Accordingly, the optical unit is reduced in size, cost, and weight.

Meanwhile, such a cooling fan may not necessarily have a function of directly sending air to the light source, and may cause convection on a heat dissipation part such as a heat sink. For example, the disposition of the rotating reflector 26 or a heat sink may be set so that the air sent by the rotating reflector 26 cools the LED 28 by causing convection near the heat dissipation part such as a heat sink provided separately from the LED 28. Meanwhile, the heat dissipation part may be not only a separate member such as a heat sink but also a part of a light source.

Second Embodiment

Figure 7A:
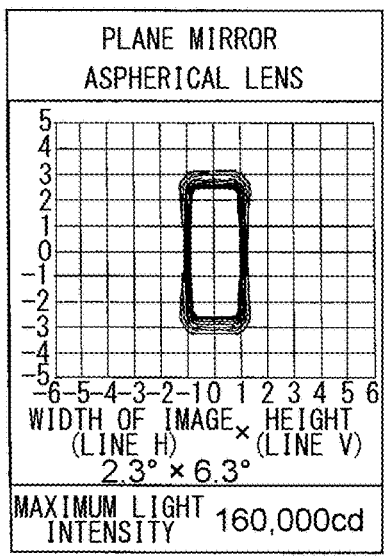
FIG. 7(a) is a view showing a projection image when light of a LED is reflected by a plane mirror and is projected by an aspherical lens.
Figure 7B:
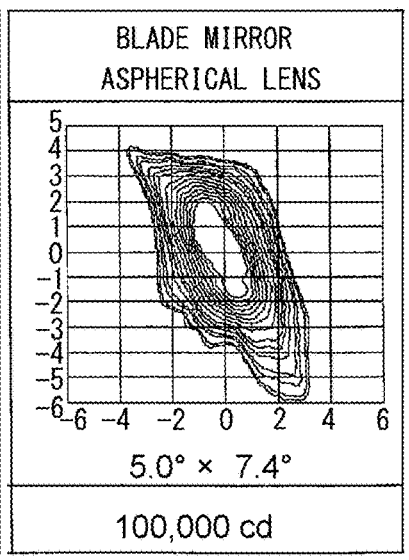
FIG. 7(b) is a view showing a projection image of a vehicle headlight according to a first embodiment.
Figure 7C:
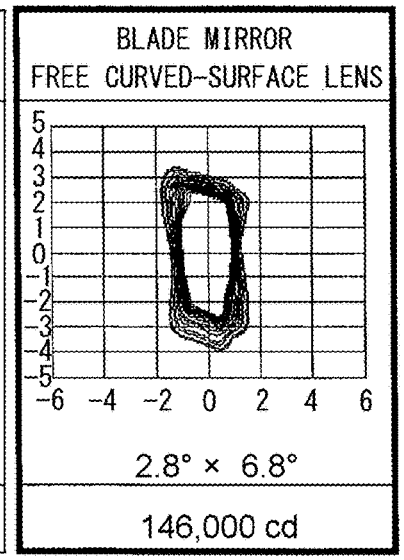
FIG. 7(c) is a view showing a projection image of a vehicle headlight according to a second embodiment.

When the light of a LED is reflected and is projected forward by a projection lens, the shape of a projection image does not necessarily correspond to the shape of a light emitting surface of the LED. FIG. 7(a) is a view showing a projection image when the light of the LED is reflected by a plane mirror and is projected by an aspherical lens, FIG. 7(b) is a view showing a projection image of the vehicle headlight according to the first embodiment, and FIG. 7(c) is a view showing a projection image of a vehicle headlight according to a second embodiment.

If a reflecting surface is a flat surface, a projection image is similar to the shape of the light emitting surface of the LED as illustrated in FIG. 7(a). However, since the blades 26a forming the reflecting surface are twisted in the rotating reflector 26 according to the first embodiment, a projection image is distorted as illustrated in FIG. 7(b). Specifically, in the first embodiment, the projection image is blurred (an irradiation range is widened) and inclined. For this reason, there are cases where the shape of a light blocking portion or a light distribution pattern, which is formed through the scanning of the projection image, is inclined and a boundary between the light blocking portion and an irradiated portion does not becomes clear.

Figure 8:
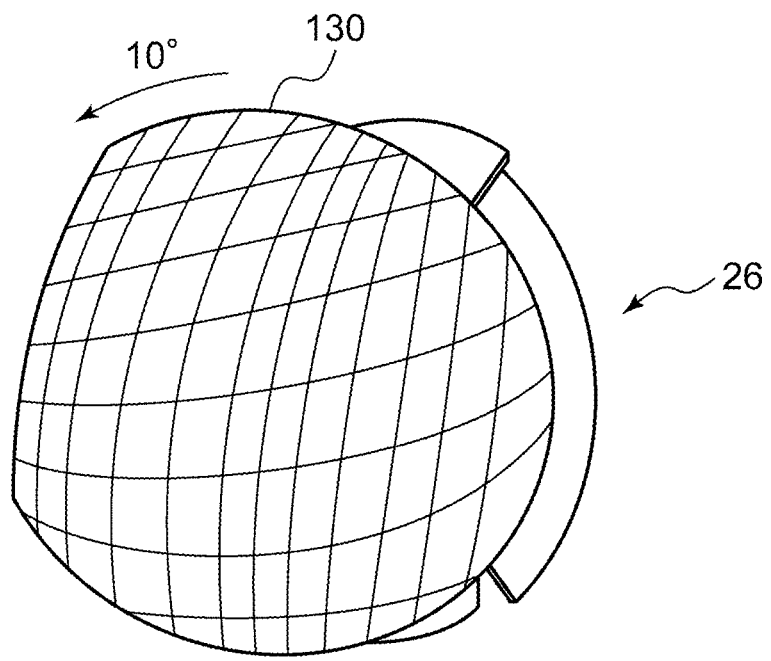
FIG. 8 is a front view of an optical unit according to the second embodiment.
Figure 9A:
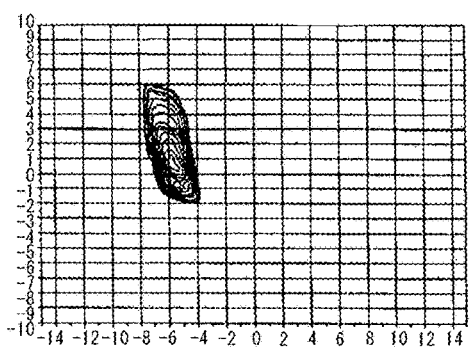
FIGS. 9(a) to 9(e) are views showing projection images when a rotating reflector of the optical unit according to the second embodiment is rotated by 30°.
Figure 9B:
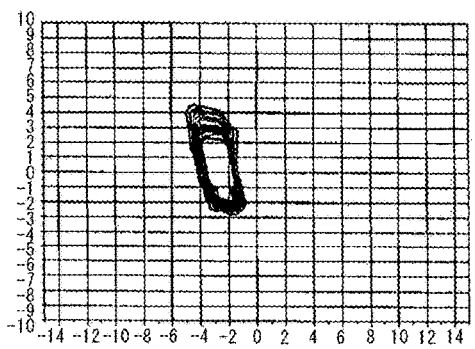
Figure 9C:
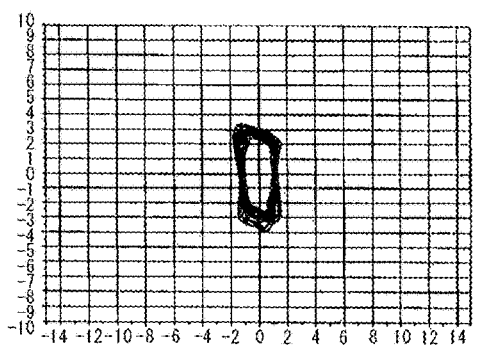
Figure 9D:
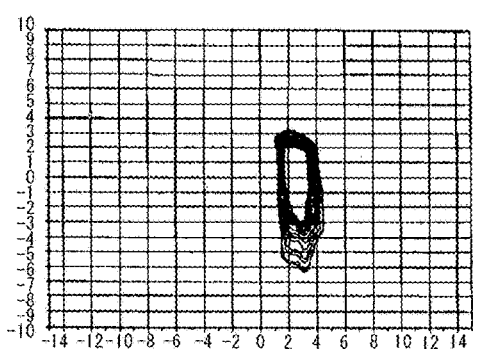
Figure 9E:
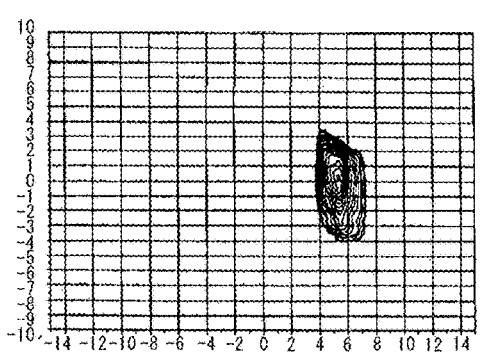

Accordingly, in the second embodiment, an optical unit is adapted to correct an image distorted by being reflected on a curved surface. Specifically, a free curved-surface lens is used as a convex lens in the vehicle headlight according to the second embodiment. FIG. 8 is a front view of the optical unit according to the second embodiment.

The optical unit according to the second embodiment includes a rotating reflector 26 and a projection lens 130. The projection lens 130 projects the light, which is reflected by the rotating reflector 26, in the light irradiation direction of the optical unit. The projection lens 130 is a free curved-surface lens that corrects an image of the LED, distorted by being reflected on the reflecting surface of the rotating reflector 26, to a shape close to the shape of the light source itself (the shape of a light emitting surface of the LED). The shape of the free curved-surface lens may be appropriately designed according to the twist or shape of the blade. According to the optical unit of this embodiment, as illustrated in FIG. 7(c), the distorted image of the LED is corrected to a shape close to a rectangular shape that is the shape of the light source. Further, the maximum light intensity of a projection image, which is formed by the optical unit according to the first embodiment, is 100000 cd (see FIG. 7(b)), but the maximum light intensity of a projection image, which is formed by the optical unit according to the second embodiment, is increased to 146000 cd.

FIGS. 9(a) to 9(e) are views showing projection images when a rotating reflector of the optical unit according to the second embodiment is rotated by 30°. Since a projection image, which is less blurred than the projection image of the first embodiment, is formed as illustrated in FIGS. 9(a) to 9(e), it is possible to accurately irradiate a desired region with bright light.

Figure 10A:
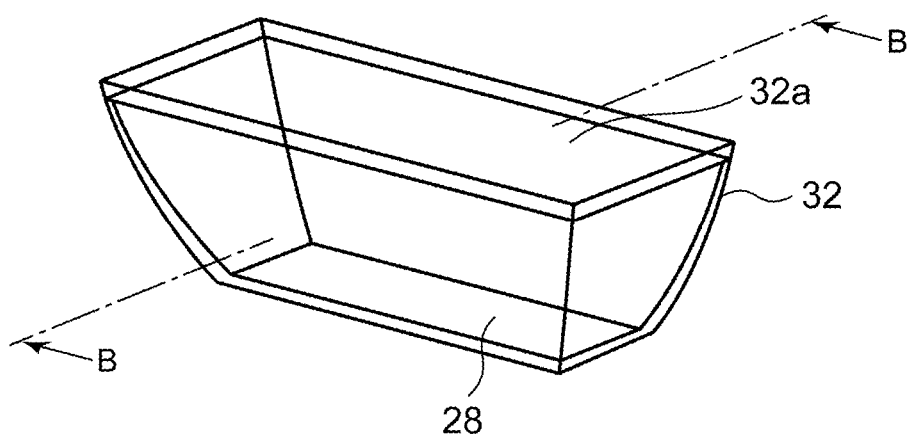
FIG. 10(a) is a perspective view of a light source according to the second embodiment.
Figure 10B:
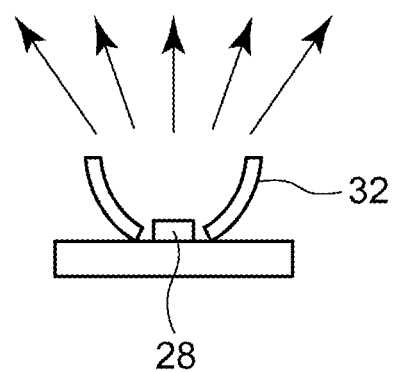
FIG. 10(b) is a cross-sectional view taken along line B-B of FIG. 10(a)

Meanwhile, since the light emitted from the LED 28 is wide as it is, there is a case where a part of the light is wasted without being reflected by the rotating reflector 26. Moreover, even though the light is reflected by the rotating reflector 26, the resolution of the light blocking portion tends to be reduced if the size of the projection image is increased. Accordingly, a light source of this embodiment includes the LED 28 and a compound parabolic concentrator (CPC) 32 that concentrates the light of the LED 28. FIG. 10(a) is a perspective view of the light source according to the second embodiment, and FIG. 10(b) is a cross-sectional view taken along line B-B of FIG. 10(a).

The compound parabolic concentrator 32 is a box-shaped concentrator where the LED 28 is disposed on the bottom. Four side surfaces of the compound parabolic concentrator 32 are subjected to mirror-finishing so as to have the shape of a parabola that has a focal point on the LED 28 or in a region near the LED 28. Accordingly, the light emitted from the LED 28 is concentrated and emitted forward. In this case, a rectangular opening portion 32a of the compound parabolic concentrator 32 may be considered as the light emitting surface of a light source.

Third Embodiment

The optical unit according to the second embodiment can correct the shape of the projection image to a shape close to a rectangular shape, which is the shape of a light source, by the function of the free curved-surface lens. However, when a light distribution pattern is formed through the scanning of the projection image corrected in this way, there is still room for improvement.

Figure 11A:
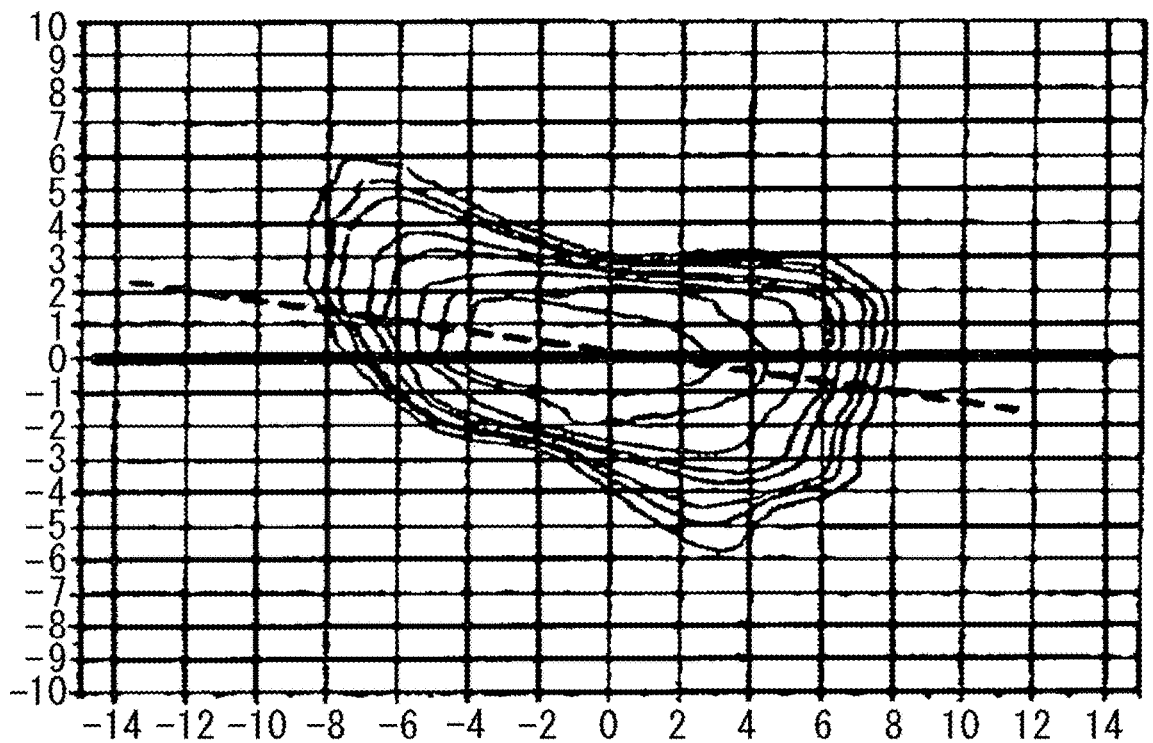
FIG. 11(a) is a view showing an irradiation pattern that is formed by the optical unit according to the second embodiment.
Figure 11B:
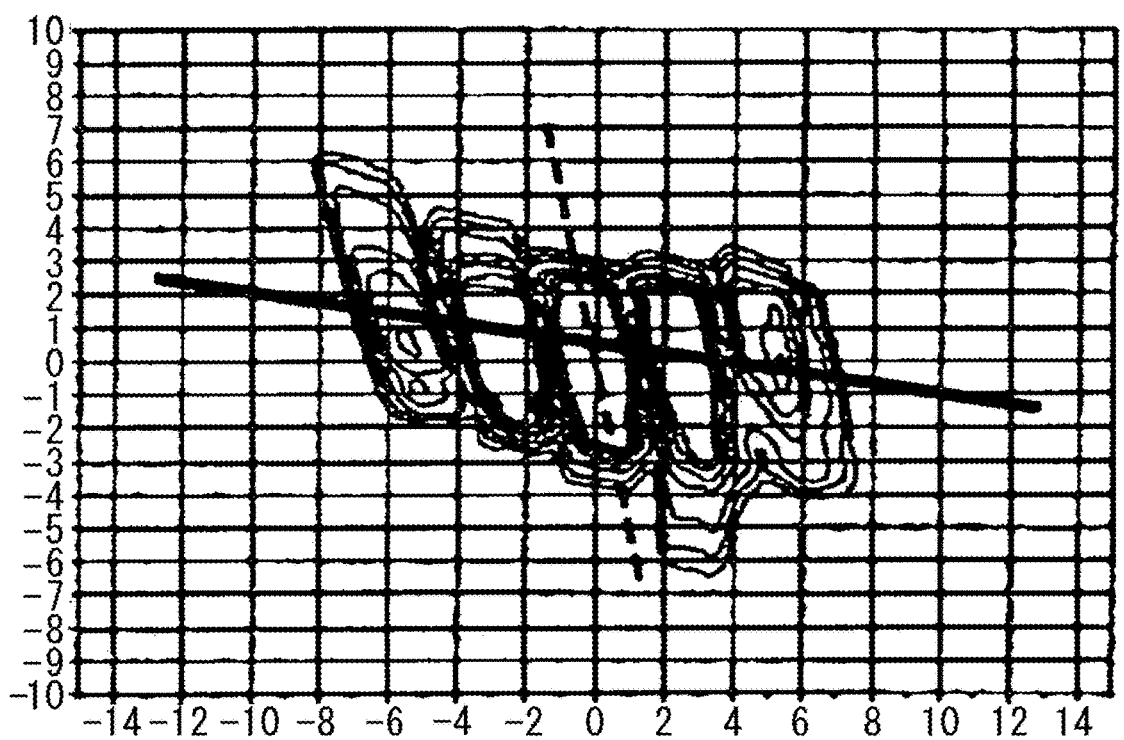
FIG. 11(b) is a view showing a state where the projection images formed by the optical unit according to the second embodiment are combined.

FIG. 11(a) is a view showing an irradiation pattern that is formed by the optical unit according to the second embodiment, and FIG. 11(b) is a view showing a state where the projection images formed by the optical unit according to the second embodiment are combined. FIG. 12(a) is a view showing a state where a compound parabolic concentrator 32 including the LED 28 is disposed so that the longitudinal direction of the compound parabolic concentrator 32 is parallel to a vertical direction, and FIG. 12(b) is a view showing a state where the compound parabolic concentrator 32 is disposed so that the longitudinal direction of the compound parabolic concentrator 32 is inclined with respect to the vertical direction.

When the light source is in the state illustrated in FIG. 12(a), the irradiation pattern is inclined with respect to a horizontal line by about 10° as illustrated in FIG. 11(a). Further, when the light source is in the state illustrated in FIG. 12(a), each of the projection images is inclined with respect to a vertical line by about 20° as illustrated in FIG. 11(b). Accordingly, a structure for correcting the inclination of the irradiation pattern and the projection images will be described in this embodiment.

First, it is possible to correct the inclination of the irradiation pattern by rotating the entire optical system, which includes the projection lens 130 (see FIG. 8) formed of a free curved-surface lens, the rotating reflector 26, and the LED 28, about the optical axis by 10°. Further, it is possible to correct the inclination of each of the projection images by inclining the light source that includes the LED 28 and the compound parabolic concentrator 32. Specifically, each of the sides of the light emitting surface of the light source is inclined with respect to the vertical direction by 20° as illustrated in FIG. 12(b) so that a projection image projected forward by the projection lens 130 is substantially erected.

Figure 13A:
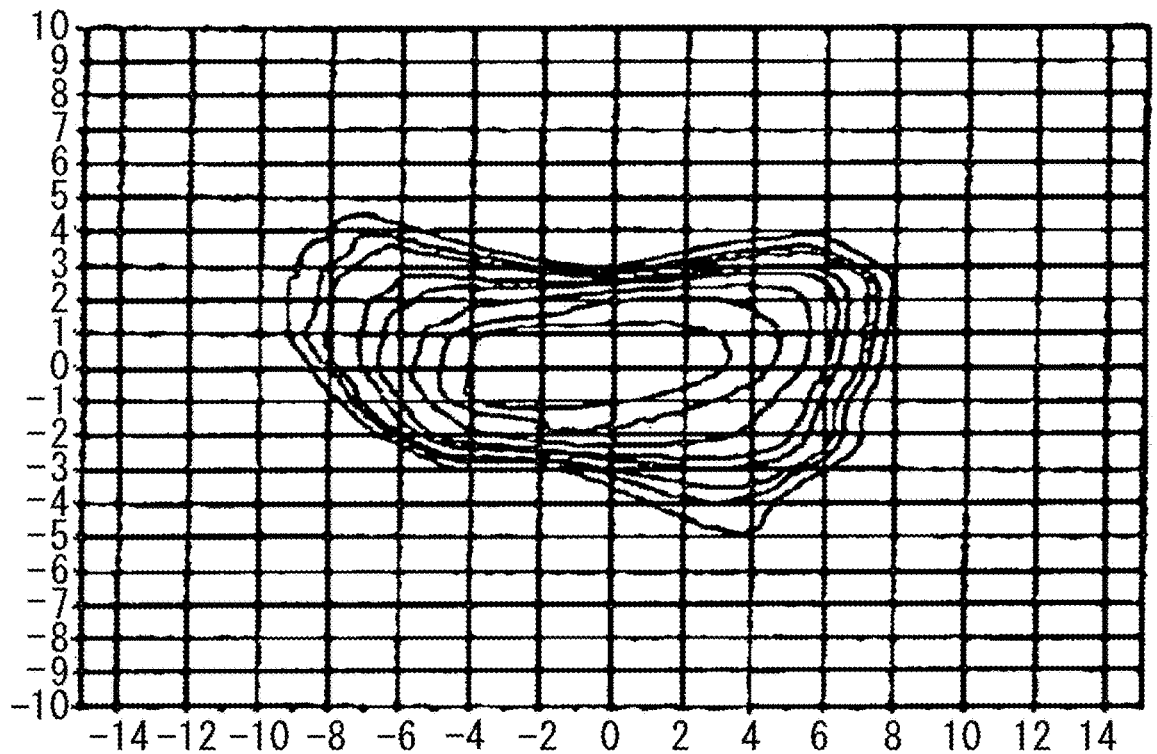
FIG. 13(a) is a view showing an irradiation pattern that is formed by an optical unit according to a third embodiment.
Figure 13B:
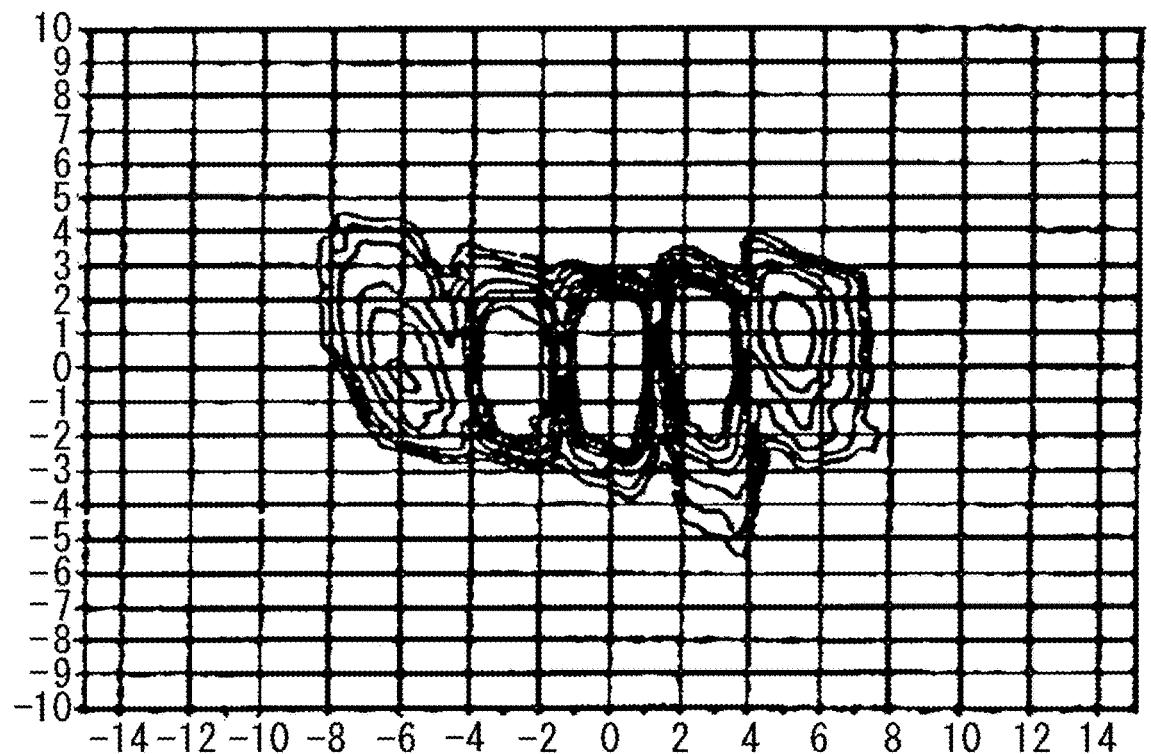
FIG. 13(b) is a view showing a state where the projection images formed by the optical unit according to the third embodiment are combined.

FIG. 13(a) is a view showing an irradiation pattern that is formed by an optical unit according to a third embodiment, and FIG. 13(b) is a view showing a state where the projection images formed by the optical unit according to the third embodiment are combined. The inclination of the irradiation pattern or each of the projection images is corrected as illustrated in FIG. 13, so that it is possible to form an ideal light distribution pattern. Moreover, since it is possible to correct the irradiation pattern and the projection images by inclining the entire optical system that includes the projection lens 130, the LED 28, and the rotating reflector 26, it is easy to perform adjustment to obtain a desired light distribution pattern.

Fourth Embodiment

As in the optical units of the above-mentioned embodiments, it is possible to form a high beam-light distribution pattern by one light source. However, there are also considered a case where a brighter irradiation pattern is needed and a case where a LED having low light intensity is used for the reduction of cost. Accordingly, an optical unit including a plurality of light sources will be described in this embodiment.

Figure 14:
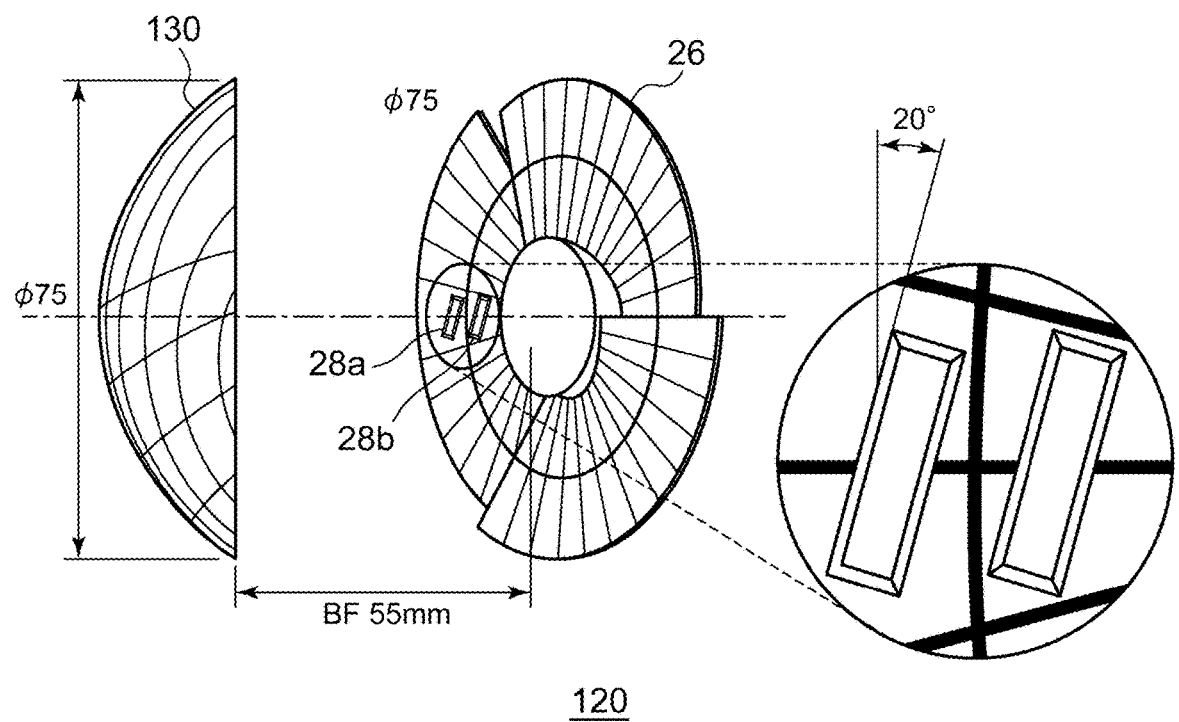
FIG. 14 is a side view schematically showing a lamp unit according to a fourth embodiment.
Figure 15:
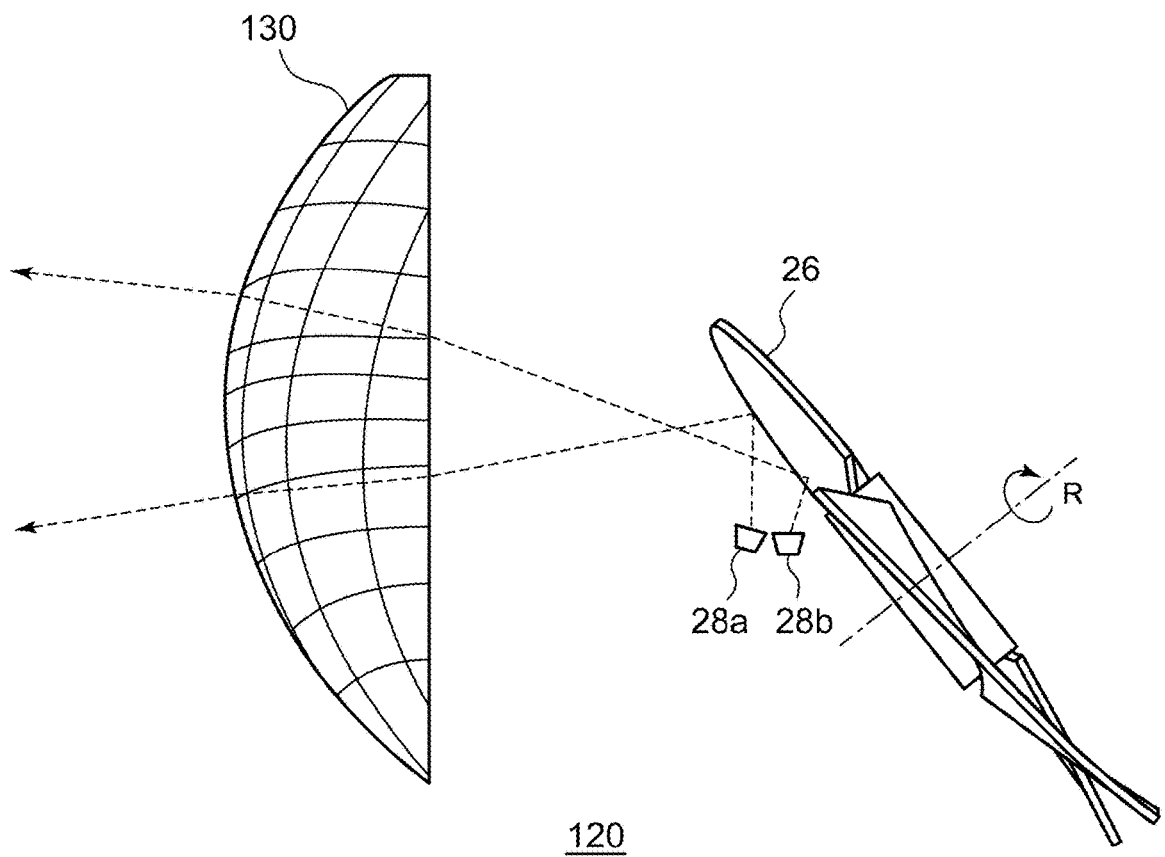
FIG. 15 is a top view schematically showing the lamp unit according to the fourth embodiment.
Figure 16:
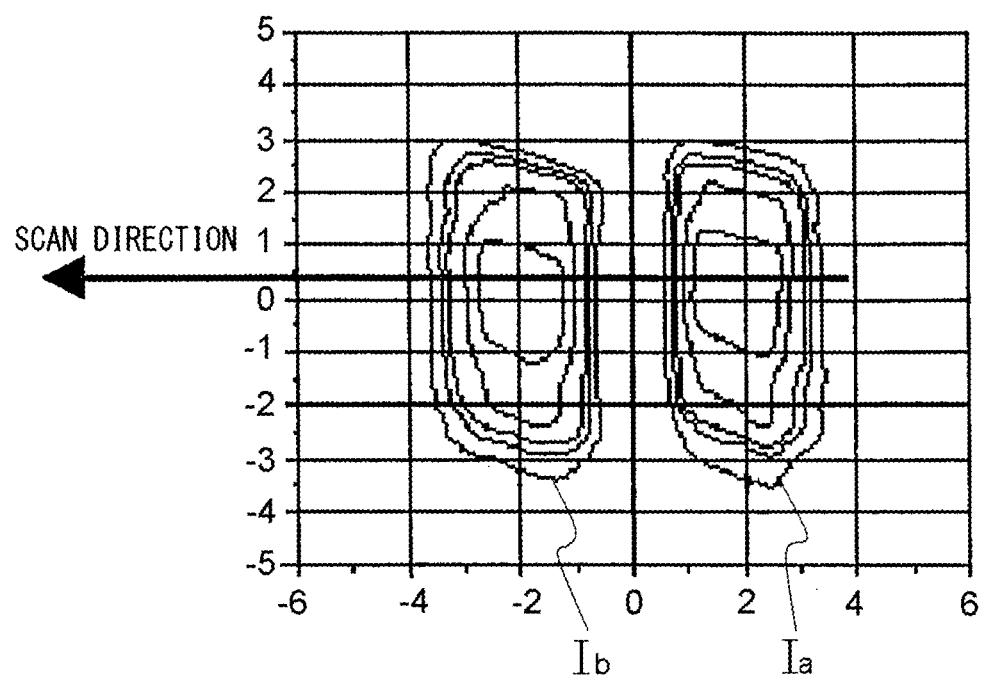
FIG. 16 is a view showing a projection image when a rotating reflector is in the state of FIG. 14.

FIG. 14 is a side view schematically showing a lamp unit according to a fourth embodiment. FIG. 15 is a top view schematically showing the lamp unit according to the fourth embodiment. The lamp unit 120 according to the fourth embodiment includes a projection lens 130, a rotating reflector 26, and two LEDs 28a and 28b. FIG. 16 is a view showing a projection image when the rotating reflector 26 is in the state of FIG. 14. A projection image Ia is formed by the light of the LED 28a that is disposed on the front side close to the projection lens 130, and a projection image Ib is formed by the light of the LED 28b that is disposed on the rear side distant from the projection lens 130.

Figure 17A:
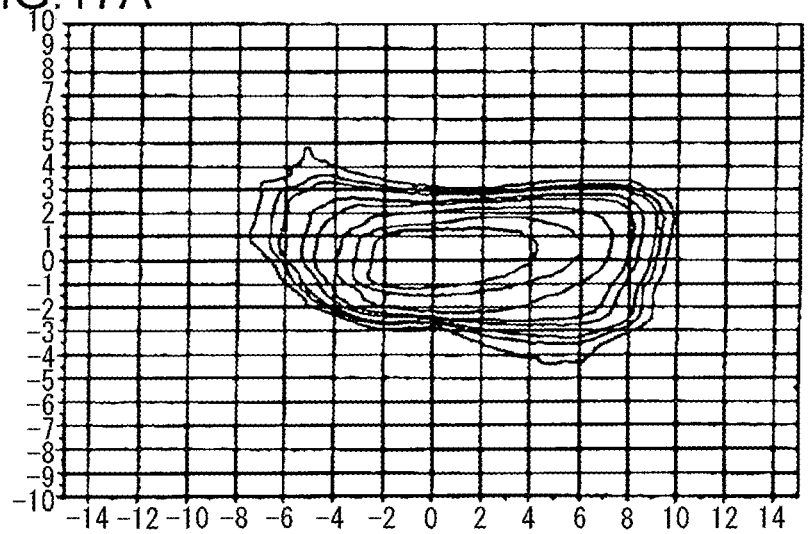
FIG. 17(a) is a view showing an irradiation pattern that is formed by a front LED.
Figure 17B:
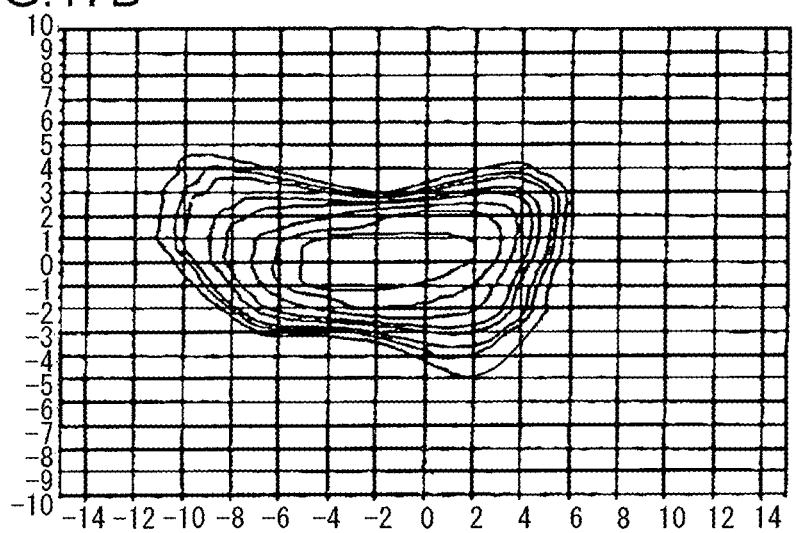
FIG. 17(b) is a view showing an irradiation pattern that is formed by a rear LED.
Figure 17C:
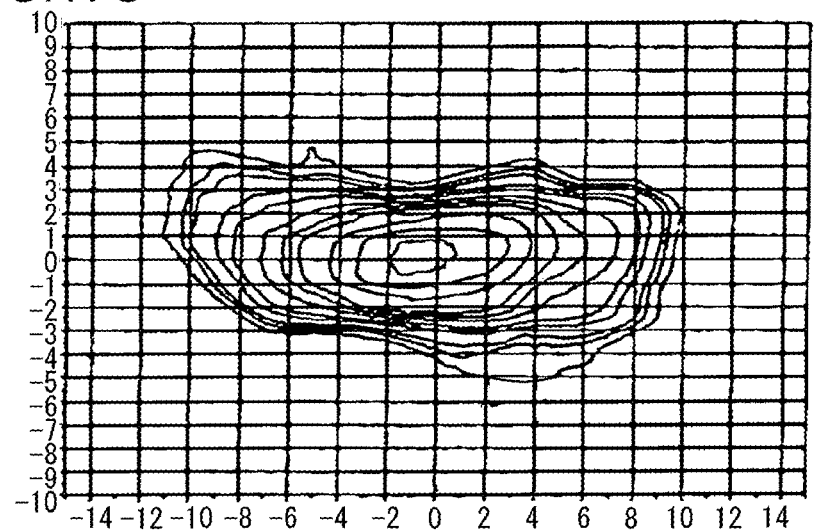
FIG. 17(c) is a view showing a combined light distribution pattern that is formed by two LEDs.

FIG. 17(a) is a view showing an irradiation pattern that is formed by the front LED 28a, FIG. 17(b) is a view showing an irradiation pattern that is formed by the rear LED 28b, and FIG. 17(c) is a view showing a combined light distribution pattern that is formed by two LEDs. As illustrated in FIG. 17(c), it is possible to form a desired light distribution pattern even though a plurality of LEDs are used. Further, the maximum light intensity, which is hardly achieved by one LED, is achieved in the combined light distribution pattern.

Figure 18A:
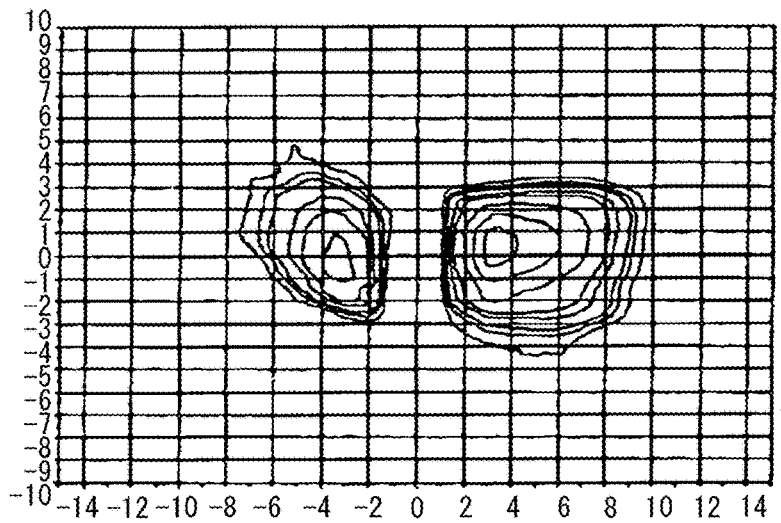
FIG. 18(a) is a view showing an irradiation pattern that is formed by the front LED and includes a light blocking portion.
Figure 18B:
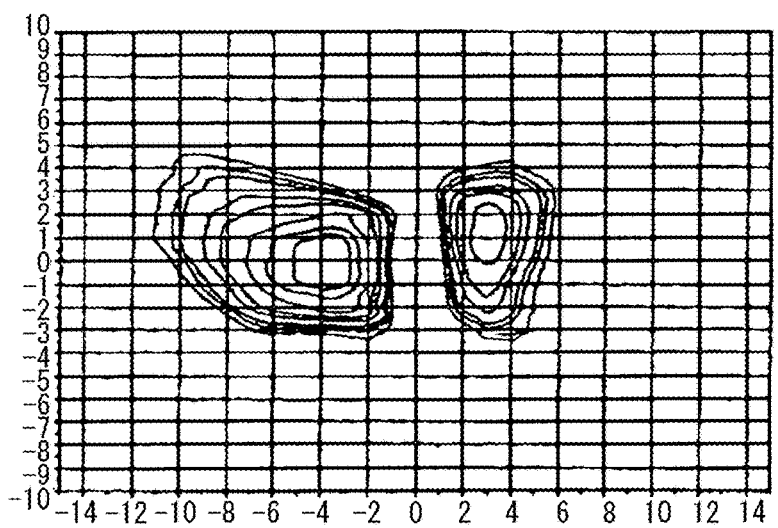
FIG. 18(b) is a view showing an irradiation pattern that is formed by the rear LED and includes a light blocking portion.
Figure 18C:
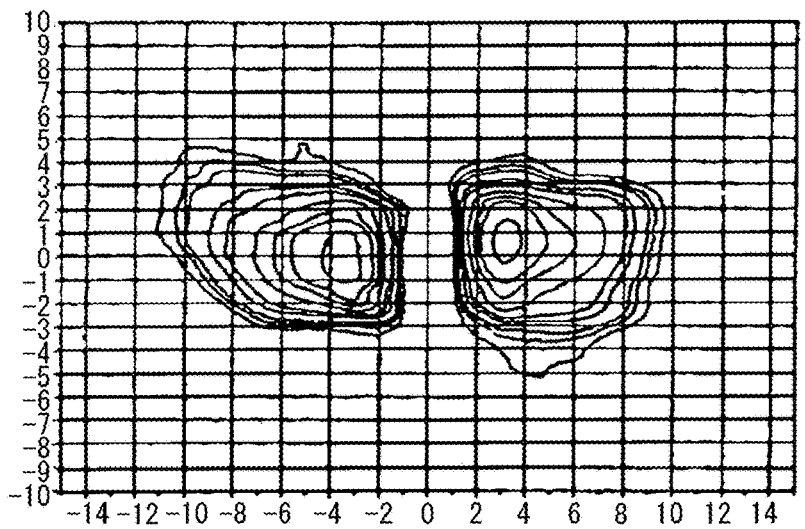
FIG. 18(c) is a view showing a combined light distribution pattern that is formed by two LEDs and includes a light blocking portion.

Next, a case where a light blocking portion is formed in the light distribution pattern by the lamp unit 120 will be described. FIG. 18(a) is a view showing an irradiation pattern that is formed by the front LED 28a and includes a light blocking portion, FIG. 18(b) is a view showing an irradiation pattern that is formed by the rear LED 28b and includes a light blocking portion, and FIG. 18(c) is a view showing a combined light distribution pattern that is formed by the two LEDs and includes a light blocking portion. For the formation of the light distribution patterns illustrated in FIGS. 18(a) and 18(b), the turning-on/off timing of each of the LEDs is appropriately shifted to adjust the positions of the respective light blocking portions. As illustrated in FIG. 18(c), it is possible to form a desired light distribution pattern including a light blocking portion even though the plurality of LEDs are used. Further, the maximum light intensity, which is hardly achieved by one LED, is achieved in the combined light distribution pattern.

Fifth Embodiment

Figure 19:
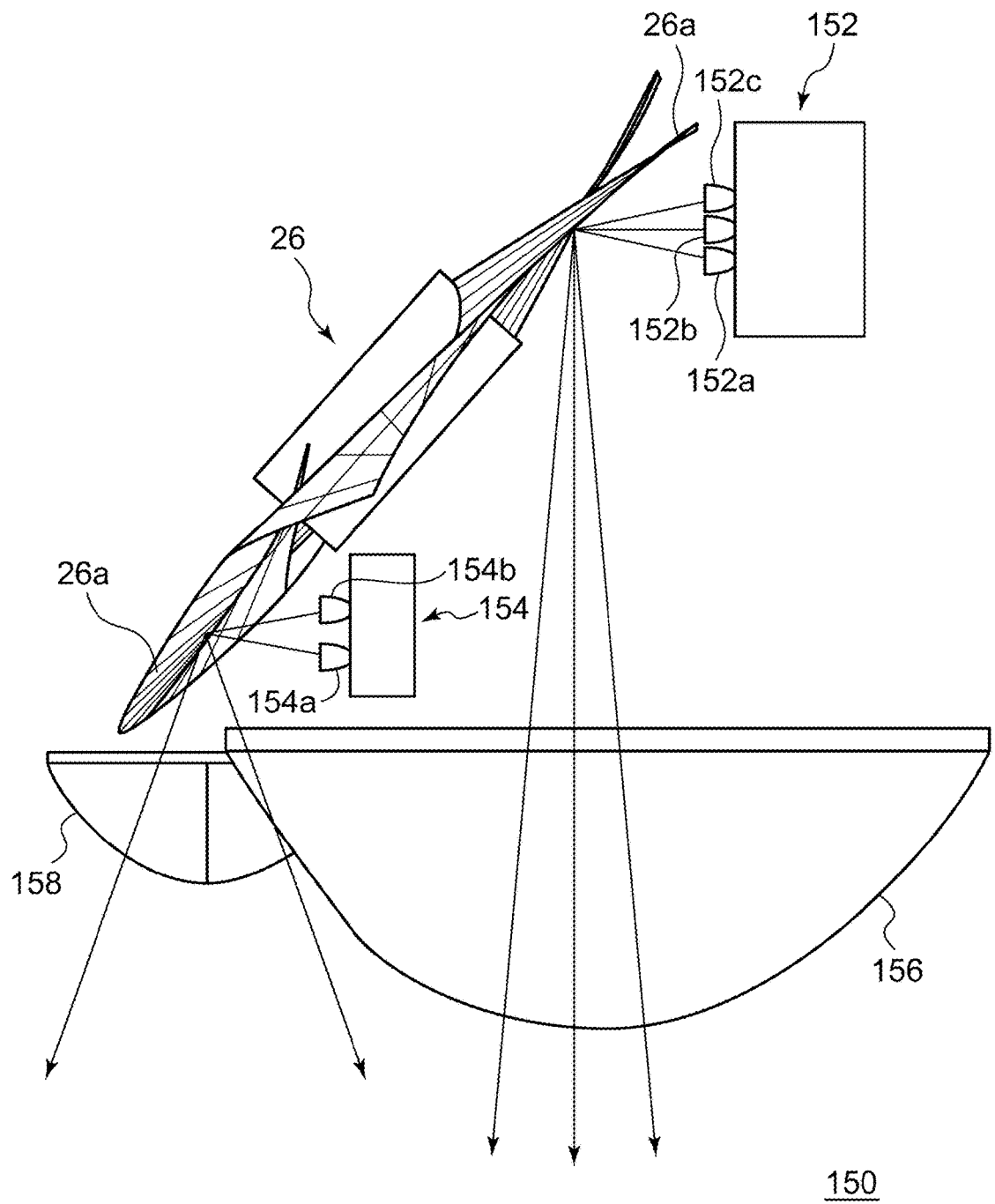
FIG. 19 is a top view schematically showing the structure that includes an optical unit according to a fifth embodiment.

FIG. 19 is a top view schematically showing the structure that includes an optical unit according to a fifth embodiment.

The optical unit 150 according to this embodiment includes a rotating reflector 26 and a plurality of light sources that include LEDs as light emitting elements. Among the plurality of light sources, one light source 152 includes a plurality of LED units 152a, 152b, and 152c. The plurality of LED units 152a, 152b, and 152c are LED units for concentrating light, and are disposed so as to achieve the strong concentration of light to the front in a traveling direction suitable for a high beam-light distribution pattern. Among the plurality of light sources, the other light source 154 includes a plurality of LED units 154a and 154b. The plurality of LED units 154a and 154b are LED units for diffusing light, and are disposed so as to achieve diffused light that irradiates a wide range suitable for a high beam-light distribution pattern. Meanwhile, each of the light sources does not need to necessarily include a plurality of LED units, and may include one LED unit as long as sufficient brightness can be achieved. Further, all LED units do not need to be always turned on, and only a part of the LED units may be turned on according to the traveling state of a vehicle or the condition of a front region.

The light sources 152 and 154 are disposed so that the light emitted from the light sources 152 and 154 is reflected at different positions by the respective blades of the rotating reflector 26. Specifically, the LED units 152a, 152b, and 152c for concentrating light of the light source 152 are disposed so that the light emitted from the LED units 152a, 152b, and 152c is reflected by the fan-shaped blades 26a positioned more distant from a first projection lens 156. For this reason, a change in the position of the light source 152, which is caused by the reflection of light using the fan-shaped blades 26a, can be projected forward by the first projection lens 156 of which the focal length is long (projection magnification is low). As a result, when a front region is scanned with the light emitted from the light source 152 while the rotating reflector 26 is rotated, it is possible to form a light distribution pattern of which a scan range is not wide enough and which more brightly illuminates a narrow range.

Meanwhile, the LED units 154a and 154b for diffusing light of the light source 154 are disposed so that the light emitted from the LED units 154a and 154b is reflected by the fan-shaped blades 26a positioned more close to a second projection lens 158. For this reason, a change in the position of the light source 154, which is caused by the reflection of light using the fan-shaped blades 26a, can be projected by the second projection lens 158 of which the focal length is short (projection magnification is high). As a result, when a front region is scanned with the light emitted from the light source 154 while the rotating reflector 26 is rotated, it is possible to form a light distribution pattern of which a scan range is wide and which illuminates a wide range.

Since the plurality of light sources 152 and 154 are disposed as described above so that the light emitted from the respective light sources 152 and 154 is reflected at different positions on the reflecting surface of the rotating reflector 26, it is possible to form a plurality of light distribution patterns and to form new light distribution patterns by combining these light distribution patterns. Accordingly, it is easier to design an ideal light distribution pattern.

Next, the position of each of the projection lenses will be described. The light emitted from the light sources 152 and 154 enters the respective projection lenses by being reflected by the blades 26a as described above. This is equivalent to the fact that light beams enter the respective projection lenses from secondary light sources of the light sources 152 and 154 virtually formed on the back sides of the blades 26a. When a light distribution pattern is formed by the scanning of light, it is important to project and scan a light source image, which is as clear as possible without being blurred, in order to improve resolution.

Accordingly, it is preferable that the focal point of the lens correspond to the secondary light source at the position of each of the projection lenses. Meanwhile, considering required various irradiation patterns and the fact that the positions of the secondary light sources of the light sources 152 and 154 are changed with the rotation of the blades 26a, all the secondary light sources do not need to necessarily correspond to the focal points of the projection lenses.

On the basis of such knowledge, for example, the first projection lens 156 is disposed so that at least one of the secondary light sources of the light source 152 formed by the reflection of light using the blades 26a passes through the vicinity of the focal point of the first projection lens 156. Further, the second projection lens 158 is disposed so that at least one of the secondary light sources of the light source 154 formed by the reflection of light using the blades 26a passes through the vicinity of the focal point of the second projection lens 158.

Figure 20:
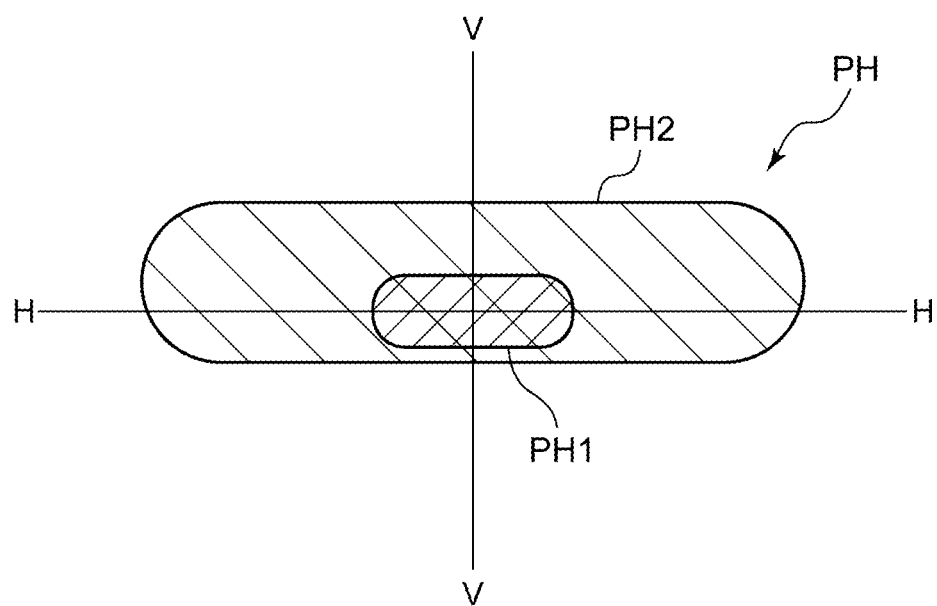
FIG. 20 is a view schematically showing a light distribution pattern that is formed by a vehicle headlight including the optical unit according to the fifth embodiment.

FIG. 20 is a view schematically showing a light distribution pattern that is formed by a vehicle headlight including the optical unit according to the fifth embodiment. A high beam-light distribution pattern PH illustrated in FIG. 20 includes a first light distribution pattern PH1 that is formed by the light source 152 and brightly irradiates a region in front of a vehicle in the distance, and a second light distribution pattern PH2 that is formed by the light source 154 and irradiates a wide range in front of a vehicle.

Meanwhile, the optical unit 150 according to this embodiment further includes the first projection lens 156 and the second projection lens 158. The first projection lens 156 projects the light, which is emitted from the light source 152 and reflected by the rotating reflector 26, in the light irradiation direction of the optical unit as the first light distribution pattern PH1. The second projection lens 158 projects the light, which is emitted from the light source 154 and reflected by the rotating reflector 26, in the light irradiation direction of the optical unit as the second light distribution pattern PH2. Accordingly, it is possible to form different light distribution patterns with one rotating reflector by appropriately selecting each of the projection lenses.

Figure 21A:
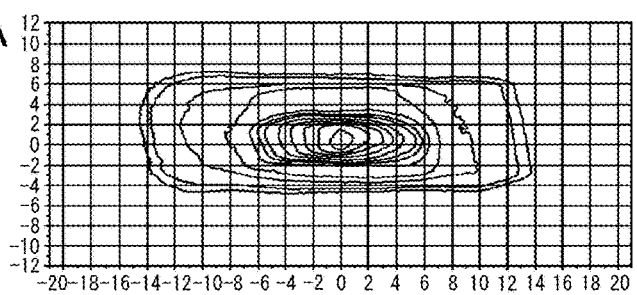
FIG. 21(a) is a view showing light distribution patterns that are formed by the respective light sources.
Figure 21B:
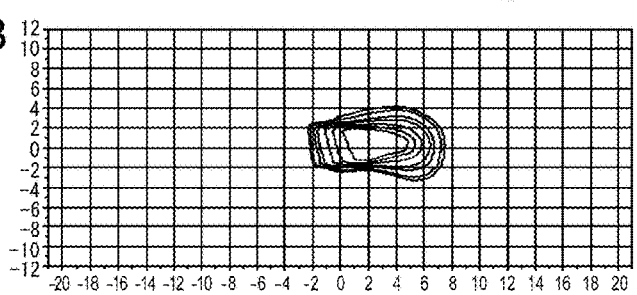
FIGS. 21(b) to 21(f) are views showing irradiation patterns that are formed by the respective LED units.
Figure 21C:
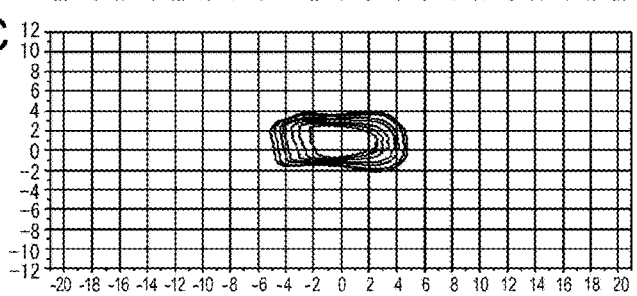
Figure 21D:
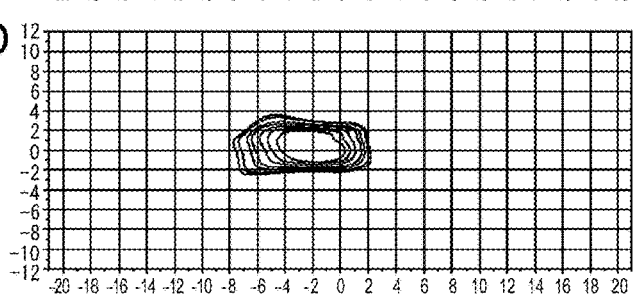
Figure 21E:
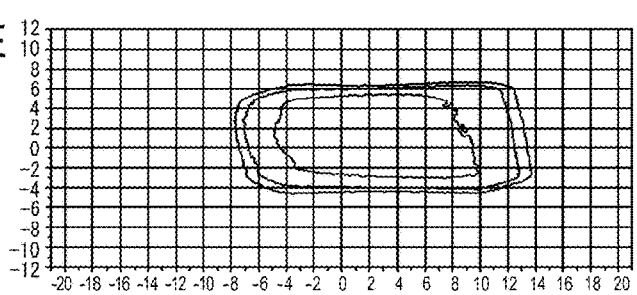
Figure 21F:
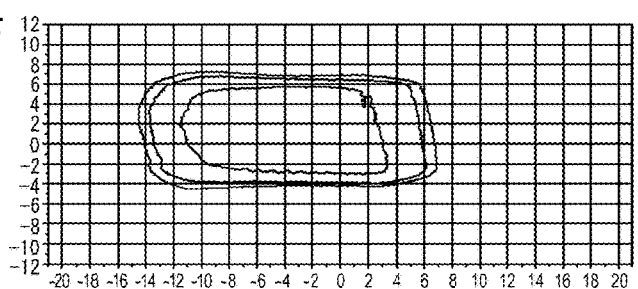

Next, irradiation patterns, which are formed by the respective LEDs forming the first and second light distribution patterns PH1 and PH2, will be described. FIG. 21(a) is a view showing light distribution patterns that are formed by the light sources 152 and 154, and FIGS. 21(b) to 21(f) are views showing irradiation patterns that are formed by the respective LED units 152a, 152b, 152c, 154a, and 154b. As illustrated in FIGS. 21(b) to 21(d), the irradiation regions of the irradiation patterns formed by the LED units 152a, 152b, and 152c are small and the maximum light intensities thereof are high. Meanwhile, as illustrated in FIGS. 21(e) and 21(f), the maximum light intensities of the irradiation patterns formed by the LED units 154a and 154b are low but the irradiation regions thereof are large. Further, when the irradiation patterns of the respective LEDs are superimposed, a high beam-light distribution pattern illustrated in FIG. 21(a) is formed.

Figure 22C:
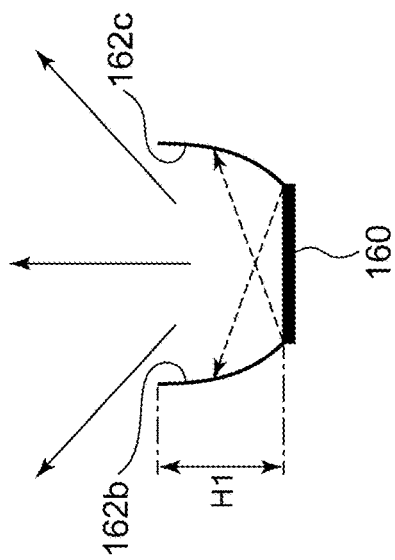
FIG. 22(c) is a cross-sectional view taken along line D-D of FIG. 22(a)
Figure 22B:
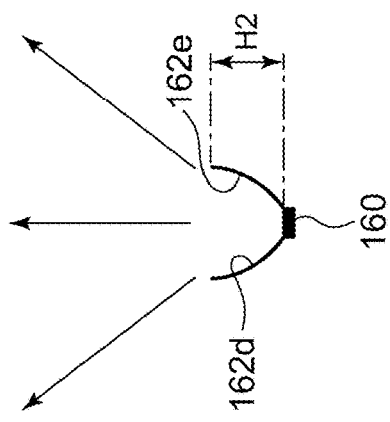
FIG. 22(b) is a cross-sectional view taken along line C-C of FIG. 22(a)
Figure 22A:
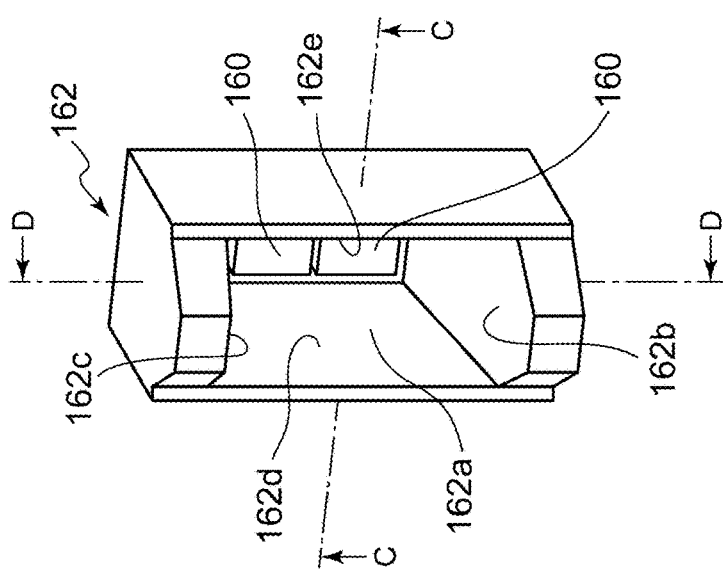
FIG. 22(a) is a perspective view of the LED unit according to the fifth embodiment.

Next, the LED units of the light sources 152 and 154 will be described in more detail. FIG. 22(a) is a perspective view of the LED unit according to the fifth embodiment, FIG. 22(b) is a cross-sectional view taken along line C-C of FIG. 22(a), and FIG. 22(c) is a cross-sectional view taken along line D-D of FIG. 22(a). The LED unit 152a of the light source 152 according to this embodiment includes LEDs 160 and a compound parabolic concentrator 162 that concentrates the light of the LEDs 160. Meanwhile, since the respective LED units 152a, 152b, 152c, 154a, and 154b have the same structure, the LED unit 152a will be described below by way of example.

The compound parabolic concentrator 162 is a member where the LEDs 160 are disposed on the bottom and a rectangular opening portion 162a is formed. The compound parabolic concentrator 162 includes four side surfaces (light concentrating surfaces) 162b to 162e that are formed from the bottom toward the opening portion 162a in order to concentrate the light of the LEDs 160. The four side surfaces 162b to 162e are subjected to mirror-finishing so as to have the shape of a parabola that has a focal point on the LEDs 160 or in a region near the LEDs 160. Accordingly, the light emitted from the LEDs 160 is concentrated and emitted forward. Meanwhile, the light emitted from the LEDs 160 is apt to be diffused in the longitudinal direction of the opening portion 162a as denoted by arrows that are illustrated in FIG. 22(c) by a dotted line. For this reason, if all the side surfaces have the same height, there is a case that it is not possible to sufficiently concentrate the light, which is directed in the longitudinal direction of the opening portion 162a, of the light emitted from the LEDs 160. That is, a part of the light, which is obliquely emitted from the opening portion as it is without being reflected by the side surfaces, does not reach the reflecting surface of the rotating reflector 26.

Accordingly, in the compound parabolic concentrator 162 according to this embodiment, the respective four side surfaces are formed so that the height H1 of each of the side surfaces 162b and 162c corresponding to the end portions of the opening portion 162a in the longitudinal direction of the opening portion 162a is higher than the height H2 of each of the side surfaces 162d and 162e corresponding to the end portions of the opening portion 162a in the width direction of the opening portion 162a. Therefore, the generation of the diffused light, which does not reach the reflecting surface of the rotating reflector, of the light of the LEDs 160 is suppressed, so that the amount of light entering the respective projection lenses is increased. As a result, it is possible to efficiently use the light of the light source for illumination.

Figure 23A:
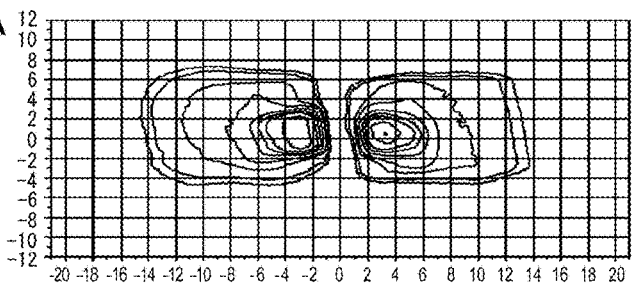
FIG. 23(a) is a view showing a light distribution pattern that is formed by the respective light sources and includes a light blocking portion.
Figure 23B:
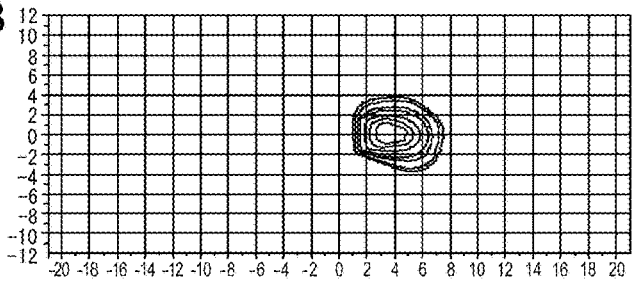
FIGS. 23(b) to 23(f) are views showing irradiation patterns that are formed by the respective LED units and include light blocking portions.
Figure 23C:
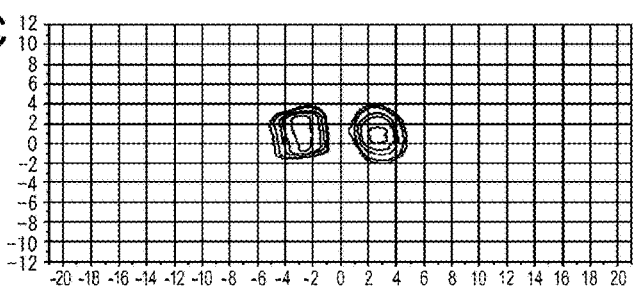
Figure 23D:
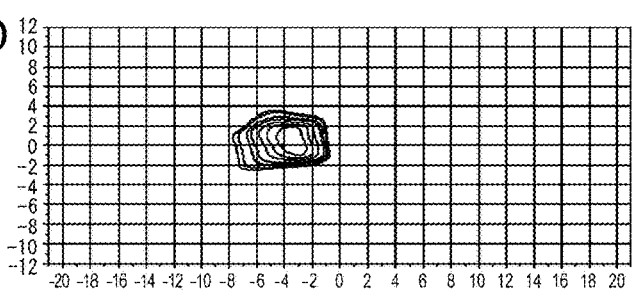
Figure 23E:
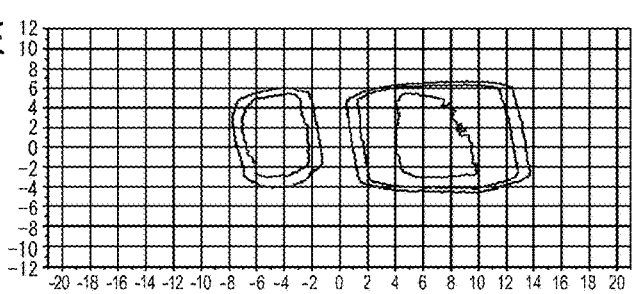
Figure 23F:
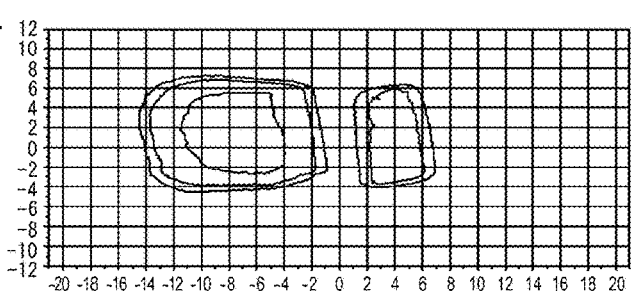

Meanwhile, it is possible to form a light blocking portion at a light distribution pattern even though the optical unit 150 according to this embodiment is used. FIG. 23(a) is a view showing a light distribution pattern that is formed by the light sources 152 and 154 and includes a light blocking portion, and FIGS. 23(b) to 23(f) are views showing irradiation patterns that are formed by the respective LED units 152a, 152b, 152c, 154a, and 154b and include light blocking portions. As illustrated in FIGS. 23(b) to 23(d), the irradiation regions of the irradiation patterns, which are formed by the LED units 152a, 152b, and 152c and include a light blocking portion, are small and the maximum light intensities thereof are high. Meanwhile, as illustrated in FIGS. 23(e) and 23(f), the maximum light intensities of the irradiation patterns, which are formed by the LED units 154a and 154b and include light blocking portions, are low but the irradiation regions thereof are large. Further, when the irradiation patterns of the respective LEDs are superimposed, a high beam-light distribution pattern, which is illustrated in FIG. 23(a) and includes a light blocking portion, is formed.

Sixth Embodiment

In the optical unit according to each of the above-mentioned embodiments, two irradiation beams simultaneously appear in different directions when light simultaneously enters both the adjacent blades. Accordingly, both end portions of a light distribution pattern shine at the same time. In this case, it is difficult to independently control the irradiation states of both the end portions of the light distribution pattern. Accordingly, the light sources are turned off at the timing where light simultaneously enters both the adjacent blades so that both the end portions of the light distribution pattern are not simultaneously irradiated. Meanwhile, if the light sources are temporarily turned off at the above-mentioned timing, the brightness of both the end portions of the light distribution pattern is reduced to some extent.

Figure 24:
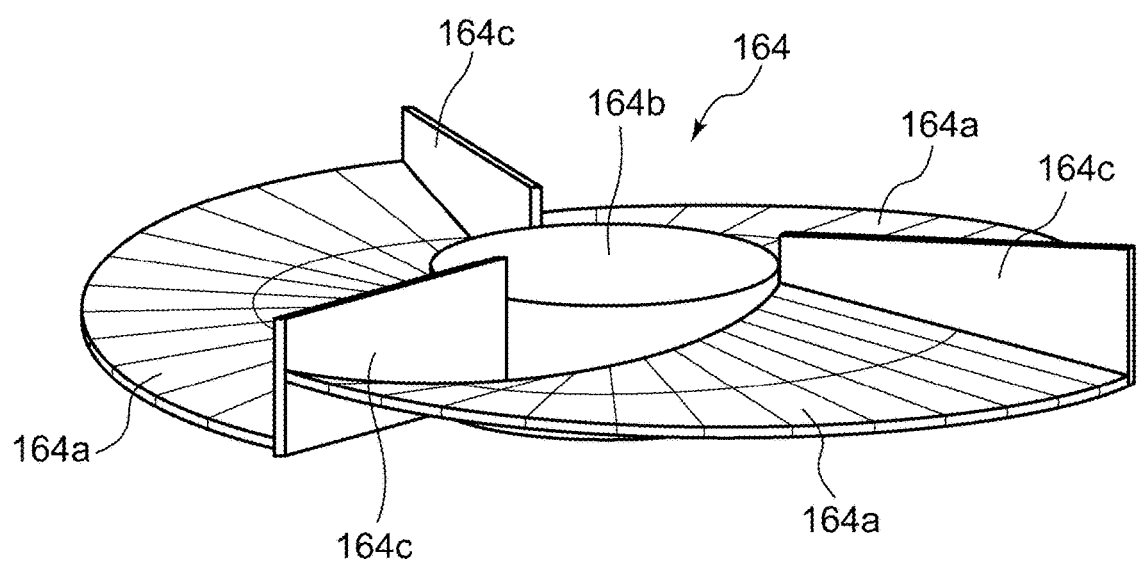
FIG. 24 is a perspective view of a rotating reflector according to a sixth embodiment.

Accordingly, the rotating reflector according to this embodiment is provided with partition members between the adjacent blades to suppress the reduction of the brightness of a light distribution pattern. FIG. 24 is a perspective view of a rotating reflector according to a sixth embodiment. A rotating reflector 164 illustrated in FIG. 24 includes three blades 164a that have the same shape as the blades of the above-mentioned rotating reflector 26 and are arranged in the circumferential direction of a cylindrical rotating part 164b. Each of the blades 164a functions as a reflecting surface. Further, the rotating reflector 164 further includes three rectangular partition members 164c that are provided between the adjacent blades 164a and extend in the direction of a rotation axis. The partition member 164c is formed so as to suppress the incidence of light emitted from a light source upon the reflecting surface of the other adjacent blade when the light emitted from the light source enters the reflecting surface of one adjacent blade. Accordingly, it is possible to block the light, which is directed toward the end portion of an adjacent blade, of the light, which is emitted from the light source and irradiates the end portion of one blade, to some extent. That is, since the time, which passes while light simultaneously enters both the adjacent blades, is shortened, it is also possible to correspondingly shorten the time that passes while the light source is turned off. Accordingly, it is possible to suppress the deterioration of irradiation efficiency to the minimum.

Next, appropriate numbers will be examined as the number of the blades of the rotating reflector. The vehicle headlight including the optical unit according to each of the above-mentioned embodiments irradiates an object to be irradiated (for example, a vehicle or a pedestrian), which is present in a front region, by reflecting the light of the light source and scanning the front region while the blades of the rotating reflector are rotated. For this reason, the object to be irradiated is brightened when irradiated with light and is darken when not irradiated with light. Accordingly, the object to be irradiated seems to be flickered according to conditions. A flicker frequency where an object to be irradiated flickering in a stop state as described above is not perceived as flicker generally needs to be set to 80 Hz or more.

Further, a flicker frequency needs to be set to 300 Hz or more in order to suppress a phenomenon (a so-called stroboscopic effect) where an object to be irradiated, which is present in a front region, is seen in a granular shape due to the movement of the line of sight. Considering flicker or a stroboscopic effect as described above, the entire irradiation pattern requires a scanning frequency of 300 Hz or more. However, if an irradiation pattern corresponds to only a very small region, a stroboscopic effect does not easily occur in the region during the travel of a vehicle. Accordingly, a scanning frequency in the small region may be 80 Hz or more.

Figure 25A:
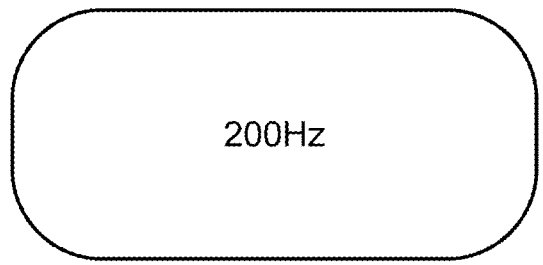
FIG. 25(a) is a view showing an ideal irradiation pattern when the shapes of the respective blades are completely the same.
Figure 25B:
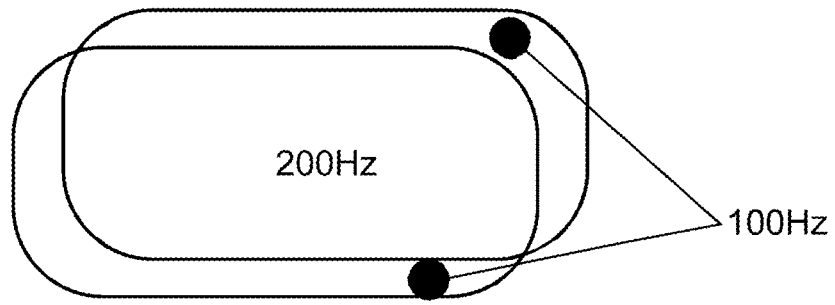
FIG. 25(b) is a view showing an irradiation pattern when there is an error in the shape of each of the blades.

The number of blades or the rotational speed of the rotating reflector may be determined on the basis of such knowledge. Meanwhile, when all the shapes of the plurality of blades are not the same, the shapes of the irradiation patterns scanned using the respective blades do not completely correspond to each other. FIG. 25(a) is a view showing an ideal irradiation pattern when the shapes of the respective blades are completely the same, and FIG. 25(b) is a view showing an irradiation pattern when there is an error in the shape of each of the blades. Meanwhile, the irradiation patterns illustrated in FIG. 25 are formed when a rotating reflector including two blades is rotated at a speed of 100 revolutions per second.

When the shapes of the respective blades are completely the same as illustrated in FIG. 25(a), the irradiation patterns scanned using all the blades completely overlap each other. For this reason, when an object to be irradiated is irradiated with the irradiation patterns, the object to be irradiated flickers at 200 Hz. Meanwhile, when there is an error in the shape of each of the blades as illustrated in FIG. 25(b), the central portions of the irradiation patterns overlap each other but the outer peripheral portions of the irradiation patterns are shifted from each other by the blades that perform scanning. For this reason, objects to be irradiated, which are present at the central portions of the irradiation patterns, flicker at 200 Hz, but objects to be irradiated, which are present in the vicinity of the outer peripheral portions of the irradiation patterns, flicker at 100 Hz that corresponds to the rotational speed of the rotating reflector. It is considered that a flicker frequency differs depending on an irradiation region of the irradiation pattern when there is an error in the shape of the blade as described above.

In the central portion of the irradiation pattern that is significantly affected by a stroboscopic effect as described above, the rotational speed of the rotating reflector and the number of the blades may be determined so that the flicker frequency of an object to be irradiated is 300 Hz or more. Meanwhile, since the outer peripheral portion of the irradiation pattern is a small region, a stroboscopic effect does not easily occur. Accordingly, the rotational speed of the rotating reflector and the number of the blades may be determined so that the flicker of an object to be irradiated, which flickers in a stop state, is not perceived and the flicker frequency of the object to be irradiated is 80 Hz or more.

For example, if the rotational speed of the rotating reflector is 150 revolutions per second or more when the number of the blades of the rotating reflector is two, a scanning frequency in the central portion of the irradiation pattern is 300 Hz or more and a scanning frequency in the vicinity of the outer peripheral portion of the irradiation pattern is 150 Hz or more. Likewise, if the rotational speed of the rotating reflector is 100 revolutions per second or more when the number of the blades of the rotating reflector is three, a scanning frequency in the central portion of the irradiation pattern is 300 Hz or more and a scanning frequency in the vicinity of the outer peripheral portion of the irradiation pattern is 100 Hz or more. Further, if the rotational speed of the rotating reflector is 80 revolutions per second or more when the number of the blades of the rotating reflector is four, a scanning frequency in the central portion of the irradiation pattern is 320 Hz or more and a scanning frequency in the vicinity of the outer peripheral portion of the irradiation pattern is 80 Hz or more. Furthermore, if the rotational speed of the rotating reflector is 80 revolutions per second or more when the number of the blades of the rotating reflector is five, a scanning frequency in the central portion of the irradiation pattern is 400 Hz or more and a scanning frequency in the vicinity of the outer peripheral portion of the irradiation pattern is 80 Hz or more. Moreover, if the rotational speed of the rotating reflector is 80 revolutions per second or more when the number of the blades of the rotating reflector is six, a scanning frequency in the central portion of the irradiation pattern is 480 Hz or more and a scanning frequency in the vicinity of the outer peripheral portion of the irradiation pattern is 80 Hz or more.

When the rotational speed or the number of the blades of the rotating reflector is appropriately selected in this way, the flicker of an object to be irradiated, which is present in the irradiation pattern, or the occurrence of a stroboscopic effect is suppressed. Meanwhile, it is preferable that rotational speed be low in terms of the durability of a drive source (for example, a motor) that drives the rotating reflector. Meanwhile, the light source is turned off at the timing where the boundary portion of an adjacent blade is irradiated as described above. Accordingly, as the number of the blades is increased, turning-off time is increased. For this reason, it is preferable that the number of the blades be small in terms of the efficient use of the light of the light source. Accordingly, the rotational speed of the rotating reflector according to this embodiment may be equal to or higher than 80 revolutions per second and lower than 150 revolutions per second. Further, it is preferable that the number of the blades be two, three, or four.

Figure 26:
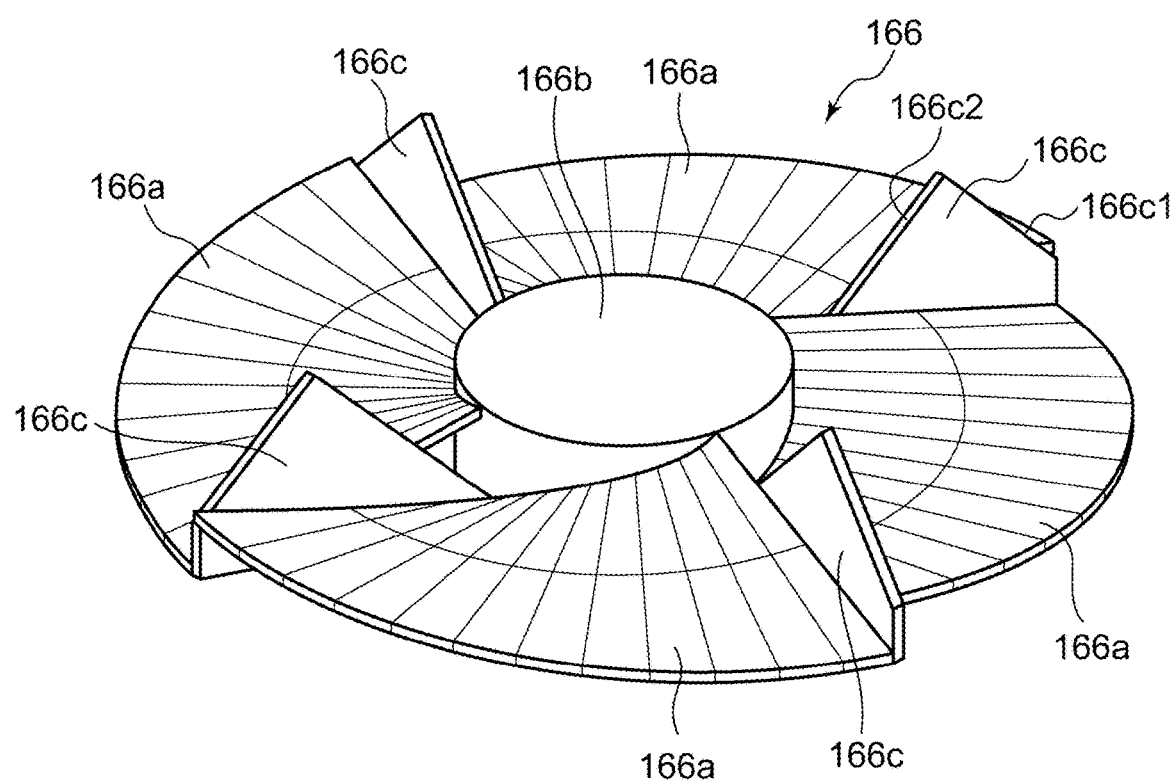
FIG. 26 is a perspective view of a rotating reflector according to a modification of the sixth embodiment.
Figure 27:
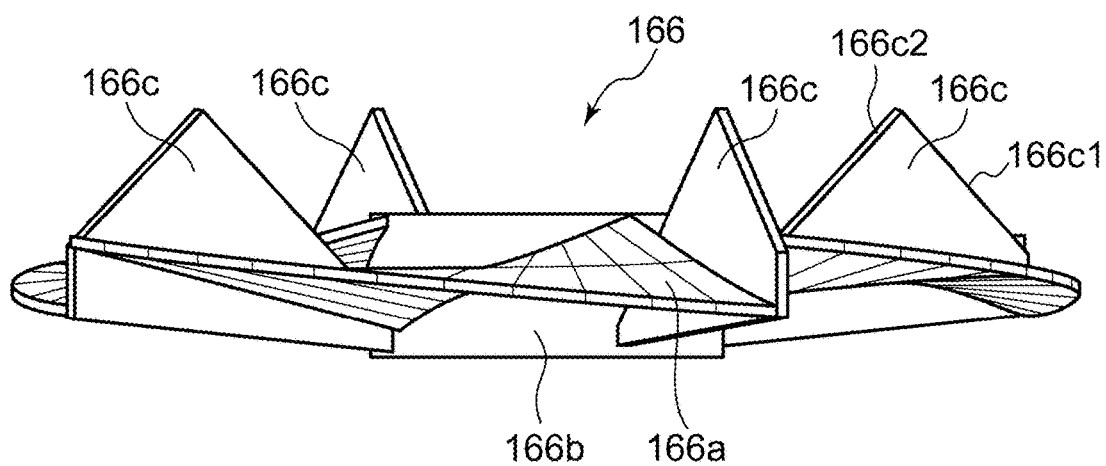
FIG. 27 is a side view of the rotating reflector illustrated in FIG. 26.

The rotating reflector including four blades will be described below. The blowing capacity of the optical unit is increased with the increase of the number of the blades. FIG. 26 is a perspective view of a rotating reflector according to a modification of the sixth embodiment. FIG. 27 is a side view of the rotating reflector illustrated in FIG. 26.

A rotating reflector 166 illustrated in FIGS. 26 and 27 includes four blades 166a that are arranged in the circumferential direction of a cylindrical rotating part 166b. The blade 166a has the shape of a fan having a central angle of 90°, and is twisted as in the above-mentioned rotating reflector. Each of the blades 166a functions as a reflecting surface. Further, the rotating reflector 166 further includes four partition plates 166c that are provided between the adjacent blades 166a and extend in the direction of a rotation axis. The partition plate 166c is formed so as to suppress the incidence of light emitted from a light source upon the reflecting surface of the other adjacent blade when the light emitted from the light source enters the reflecting surface of one adjacent blade. Accordingly, it is possible to block the light, which is directed toward the end portion of an adjacent blade, of the light, which is emitted from the light source and irradiates the end portion of one blade, to some extent. That is, since the time, which passes while light simultaneously enters both the adjacent blades, is shortened, it is also possible to correspondingly shorten the time that passes while the light source is turned off. Accordingly, it is possible to suppress the deterioration of irradiation efficiency to the minimum. Meanwhile, the partition plate 166c includes two oblique sides 166c1 and 166c2 that are formed at the upper portion thereof so as to be inclined with respect to the rotation axis.

Figure 28:
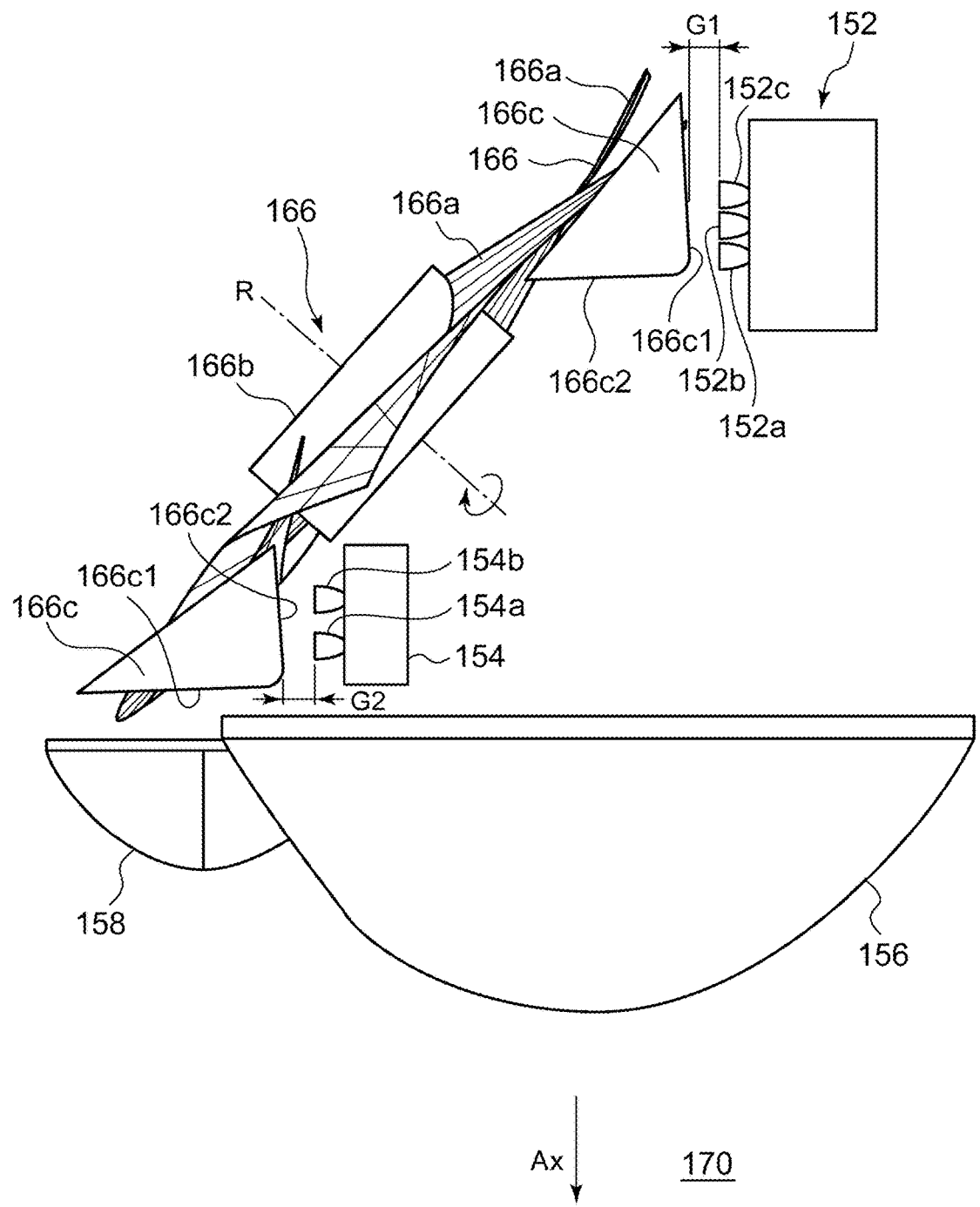
FIG. 28 is a top view schematically showing the structure that includes an optical unit according to the sixth embodiment.

FIG. 28 is a top view schematically showing the structure that includes the optical unit according to the sixth embodiment. Meanwhile, the same structures and members as those of the optical unit according to each of the above-mentioned embodiments will be denoted by the same reference numerals and the description thereof will not be repeated.

An optical unit 170 according to this embodiment includes the above-mentioned rotating reflector 166 and the plurality of above-mentioned light sources 152 and 154. The rotating reflector 166 is provided with the partition plates 166c between the adjacent blades 166a. The rotating reflector 166 is disposed so that a rotation axis R of the rotating reflector 166 of the optical unit 170 is inclined with respect to an optical axis Ax of the optical unit 170.

The shape of the oblique side 166c1 of the partition plate 166c is set so as to pass through the vicinity of the opening portions of the respective LED units 152a, 152b, and 152c at the position facing the light source 152. Further, the shape of the oblique side 166c1 is set so that the oblique side 166c1 is substantially parallel to the arrangement direction of the respective LED units 152a, 152b, and 152c when passing in front of the respective LED units 152a, 152b, and 152c. For this reason, the distances (gap G1) between the oblique side 166c1 and the respective LED units become uniform when the oblique side 166c1 passes in front of the respective LED units 152a, 152b, and 152c. As a result, it is possible to align the turning-off timing of the respective LED units. Meanwhile, it is preferable that the gap G1 be in the range of about 1 to 2 mm. Accordingly, when the light emitted from the light source enters the reflecting surface of one adjacent blade, the incidence of light emitted from a light source upon the reflecting surface of the other adjacent blade is prevented until immediately before the light source passes immediately above the partition plates.

Meanwhile, the shape of the oblique side 166c2 of the partition plate 166c is set so as to pass through the vicinity of the opening portions of the respective LED units 154a and 154b at the position facing the light source 154. Further, the shape of the oblique side 166c2 is set so that the oblique side 166c2 is substantially parallel to the arrangement direction of the respective LED units 154a and 154b when passing in front of the respective LED units 154a and 154b. For this reason, the distances (gap G2) between the oblique side 166c2 and the respective LED units become uniform when the oblique side 166c2 passes in front of the respective LED units 154a and 154b. As a result, it is possible to align the turning-off timing of the respective LED units. Meanwhile, it is preferable that the gap G2 be in the range of about 1 to 2 mm. Accordingly, when the light emitted from the light source enters the reflecting surface of one adjacent blade, the incidence of light emitted from a light source upon the reflecting surface of the other adjacent blade is prevented until immediately before the light source passes immediately above the partition plates.

Since it is possible to suppress the incidence of light, by the partition plate 166c, emitted from the light source upon the reflecting surface of the other adjacent blade when the light emitted from the light source enters the reflecting surface of one adjacent blade as described above, it is possible to shorten the turning-off time of the light source. As a result, it is possible to suppress the deterioration of the irradiation efficiency of the optical unit to the minimum.

Seventh Embodiment

A vehicle monitor according to a seventh embodiment includes an optical unit and a camera. The optical unit forms a light distribution pattern in front of a vehicle using the persistence of vision of the human eye by scanning an irradiation beam in the left and right direction (or the up and down direction) with a rotating reflector, a resonance mirror, or the like. The camera takes an image of a region in front of the vehicle. Since the imaging time of a general camera is milliseconds or sub-milliseconds, a state where a partial region of a light distribution pattern is irradiated with an irradiation beam is recorded in an image taken by the camera.

When a reflective object, such as a delineator or a signboard, which reflects light, is irradiated with an irradiation beam, the reflective object is imaged as a bright spot. However, when a reflective object is present at a position different from the position of an irradiation beam, the reflective object is not imaged as a bright spot. Accordingly, it is possible to identify a bright spot, of which the light intensity is not significantly changed, as a self-luminous object such as a street light or a lamp of a vehicle-in-front and to identify a bright spot, of which the light intensity is significantly changed, as a reflective object, by setting scanning speed and the imaging timing of the camera so that the irradiation position of an irradiation beam varies at every imaging timing and analyzing continuous or a plurality of taken images. In addition, it is possible to identify a moving object such as a vehicle lamp and a fixed object such as a street light, by using information, such as light intensity or a distance, a color, an angle, a moving direction, and a positional relationship with the shapes of lines on the road.

Figure 30:
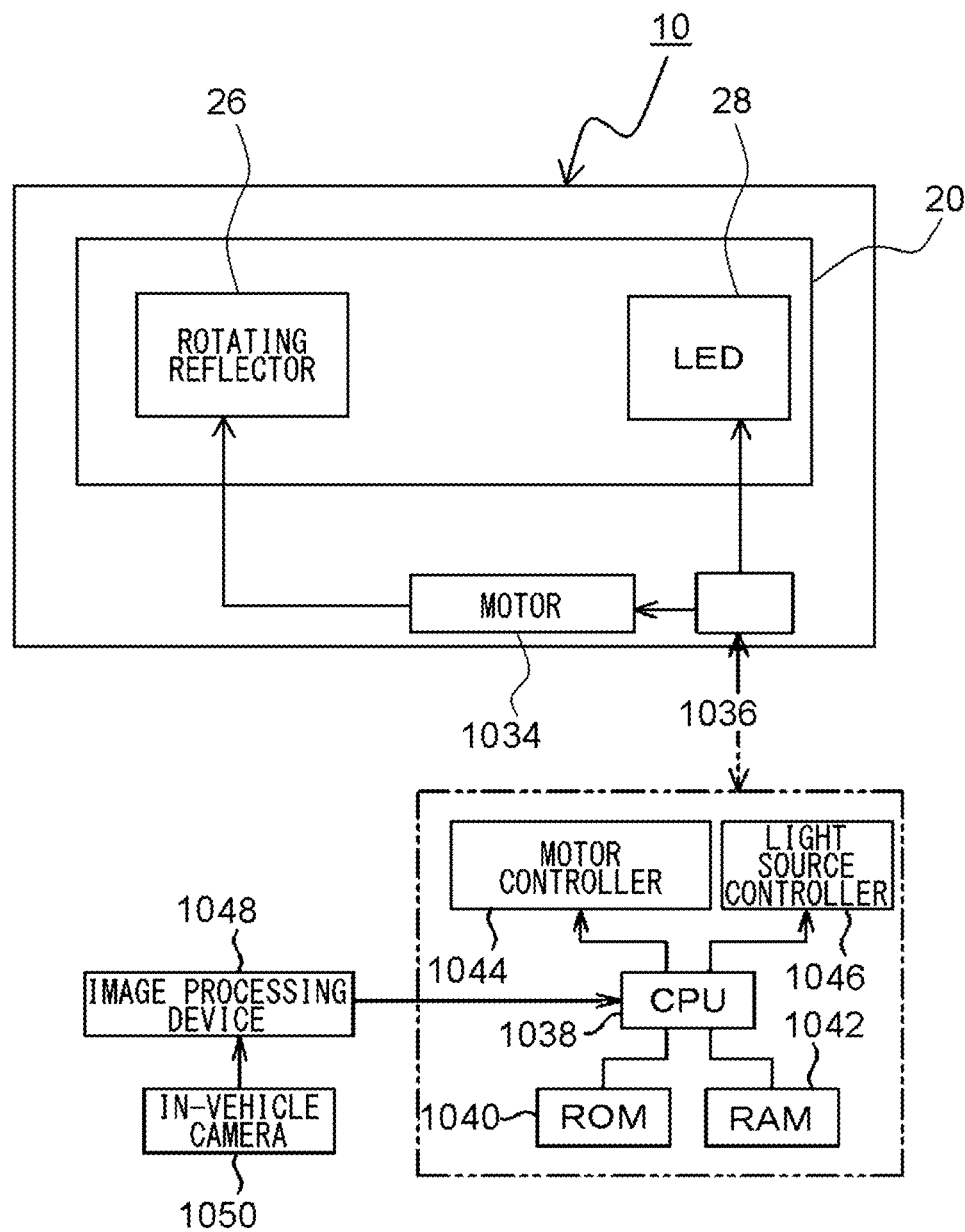
FIG. 30 is a block diagram of a vehicle monitor according to a seventh embodiment.

FIG. 30 is a block diagram of a vehicle monitor according to a seventh embodiment. A vehicle headlight 10 illustrated in FIG. 30 includes a lamp unit 20 that includes a rotating reflector 26 and a LED 28, a motor 1034 that rotationally drives the rotating reflector 26, and a control unit 1036 that controls the LED 28 and the motor 1034.

The control unit 1036 is provided with a CPU 1038, a ROM 1040, a RAM 1042, a motor controller 1044 that controls the motor 1034 rotationally driving the rotating reflector 26, and a light source controller 1046 that controls the LED 28. A plurality of light distribution control programs is stored in the ROM 1040. The CPU 1038 selectively executes these programs, outputs operation commands to the motor controller 1044 and the light source controller 1046, and controls a light distribution pattern formed in front of a vehicle. Further, the control unit 1036 is connected to an image processing device 1048 of the vehicle. The image processing device 1048 analyzes the imaging data of an in-vehicle camera 1050 and provides the information on the road surface in front of the vehicle to the control unit 1036.

The vehicle monitor according to this embodiment includes the lamp unit 20 that forms a light distribution pattern by scanning an irradiation beam to the front of the vehicle, the in-vehicle camera 1050 that takes an image of a region in front of the vehicle, and a determining device that determines whether a reflective body is present in front of the vehicle. Further, the determining device according to this embodiment is formed of the CPU 1038 and the image processing device 1048. On the basis of an image that is taken by the in-vehicle camera 1050 when a partial region included in the light distribution pattern is irradiated with an irradiation beam and an image that is taken by the in-vehicle camera 1050 when the partial region is not irradiated with an irradiation beam, the determining device determines whether a reflective body reflecting an irradiation beam is present in the partial region.

Figure 31:
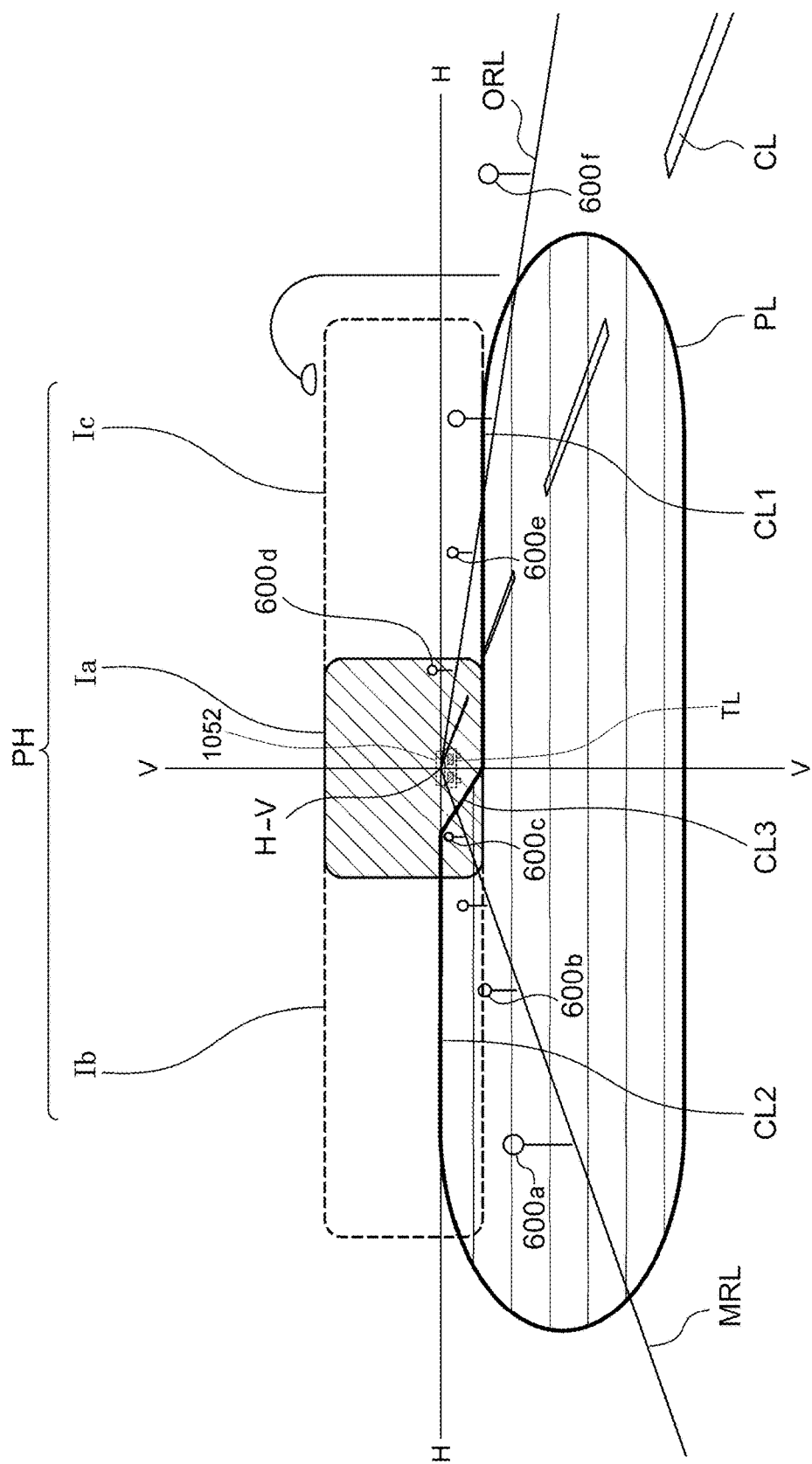
FIG. 31 is a view schematically showing a state where a partial region (a middle region in front of a vehicle) included in a light distribution pattern is irradiated with an irradiation beam.
Figure 32:
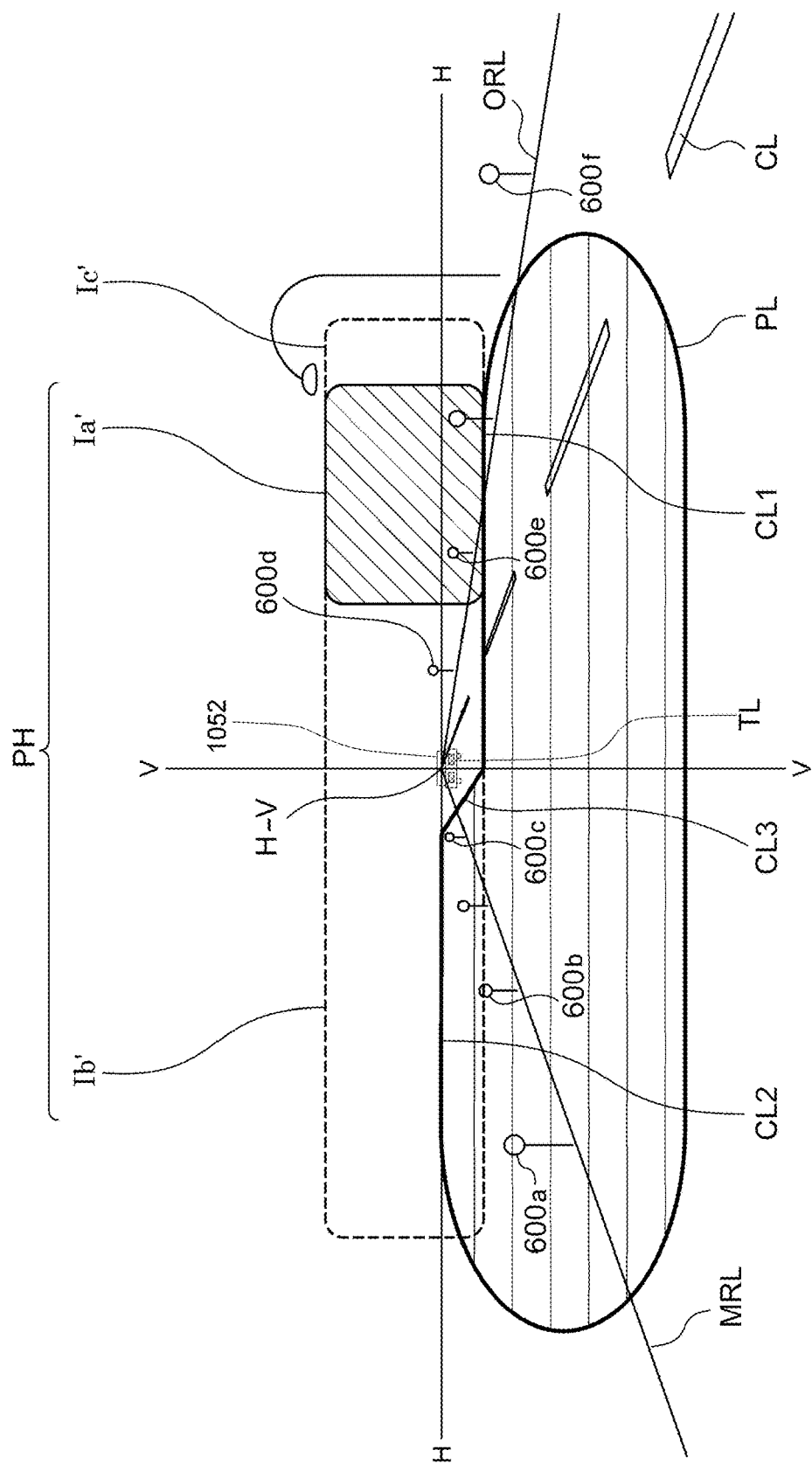
FIG. 32 is a view schematically showing a state where a partial region (the middle region in front of the vehicle) included in a light distribution pattern is not irradiated with an irradiation beam.

FIG. 31 is a view schematically showing a state where a partial region (a middle region in front of a vehicle) included in a light distribution pattern is irradiated with an irradiation beam. FIG. 32 is a view schematically showing a state where a partial region (the middle region in front of the vehicle) included in a light distribution pattern is not irradiated with an irradiation beam. In FIG. 31, a low beam-light distribution pattern PL and a high beam-light distribution pattern PH, which are formed on a virtual vertical screen disposed at a position 25 m ahead of the vehicle by the light emitted from the vehicle headlight 10, are superimposed on a view that perspectively shows a region in front of a subject vehicle when the vehicle travels on a paved straight road having one lane on one side (having two lanes on both sides). Further, a centerline CL, a travel lane-side line MRL, and an opposite lane-side line ORL are illustrated in FIG. 31. The travel lane-side line MRL extends toward the left lower side from an H-V point (an intersection between a horizontal line H-H and a vertical line V-V) that is a vanishing point of a perspective view, and the centerline CL and the opposite lane-side line ORL extends toward the right lower side from the H-V point. Meanwhile, a plurality of delineators 600a to 600f, which are provided on the left and right shoulders of the road, are illustrated in FIGS. 31 and 32.

The low beam-light distribution pattern PL is formed by an irradiation beam emitted from the lamp unit 18 for a low beam. The low beam-light distribution pattern PL illustrated in FIG. 31 is a light distribution pattern that is considered so as not to direct glare at oncoming vehicles or pedestrians when a vehicle travels in an urban area or the like in a region where vehicles and pedestrians keep to the left according to a traffic regulation. The low beam-light distribution pattern PL includes cut-off lines CL1, CL2, and CL3, which have different levels on the left and right, at the upper end edge thereof. The cut-off line CL1 is formed on the right side of the line V-V of the vehicle headlight 10 as a cut-off line corresponding to the opposite lane so as to extend in the horizontal direction. The cut-off line CL2 is formed on the left side of the line V-V as a cut-off line corresponding to the travel lane so as to extend in the horizontal direction at a position higher than the cut-off line CL1. Further, the cut-off line CL3 is formed as an oblique cut-off line connecting an end portion of the cut-off line CL2, which is close to the line V-V, with an end portion of the cut-off line CL1 that is close to the line V-V. The cut-off line CL3 obliquely extends toward the left upper side at an angle of inclination of 45° from a point of intersection of the cut-off line CL1 and the line V-V.

The high beam-light distribution pattern PH is formed by an irradiation beam emitted from the lamp unit 20 for a high beam. The high beam-light distribution pattern PH is additionally formed on the low beam-light distribution pattern PL.

As illustrated in FIG. 31, a light distribution region of the high beam-light distribution pattern PH has a substantially rectangular shape that has long sides in the horizontal direction. Meanwhile, the high beam-light distribution pattern PH is formed by scanning an irradiation beam as described above. For this reason, when an image of a region in front of the vehicle is taken at the timing where an irradiation beam scans the middle region in front of the vehicle, an image, where a region Ia corresponding to the projection image of the light source is bright since the region Ia is irradiated with an irradiation beam and regions Ib and Ic formed on both sides of the region Ia are dark, is obtained. According to the analysis of this image, in the middle region in front of the vehicle that is a partial region included in the light distribution pattern, light reflected by the delineators 600c and 600d and a tail lamp TL of a vehicle-in-front 1052 are detected as bright spots.

Next, when an image of a region in front of the vehicle is taken at the timing different from the imaging timing illustrated in FIG. 31 (see FIG. 32), an image, where a region Ia' corresponding to the projection image of the light source moved to the right side of the middle region in front of the vehicle is bright since the region Ia' is irradiated with an irradiation beam and regions Ib' and Ic' formed on both sides of the region Ia' are dark, is obtained. According to the analysis of this image, in the middle region in front of the vehicle included in the region Ib', the tail lamp TL of the vehicle-in-front 1052 is detected as a bright spot but the delineators 600c and 600d are not detected as bright spots since the delineators 600c and 600d are not irradiated with an irradiation beam.

In this way, depending on whether the delineators are irradiated with an irradiation beam, it is determined whether the delineators appear as bright spots in the image. Then, processing for discriminating a reflective body, such as a delineator or a sign, from a lamp of a vehicle-in-front will be described using these properties.

Figure 33:
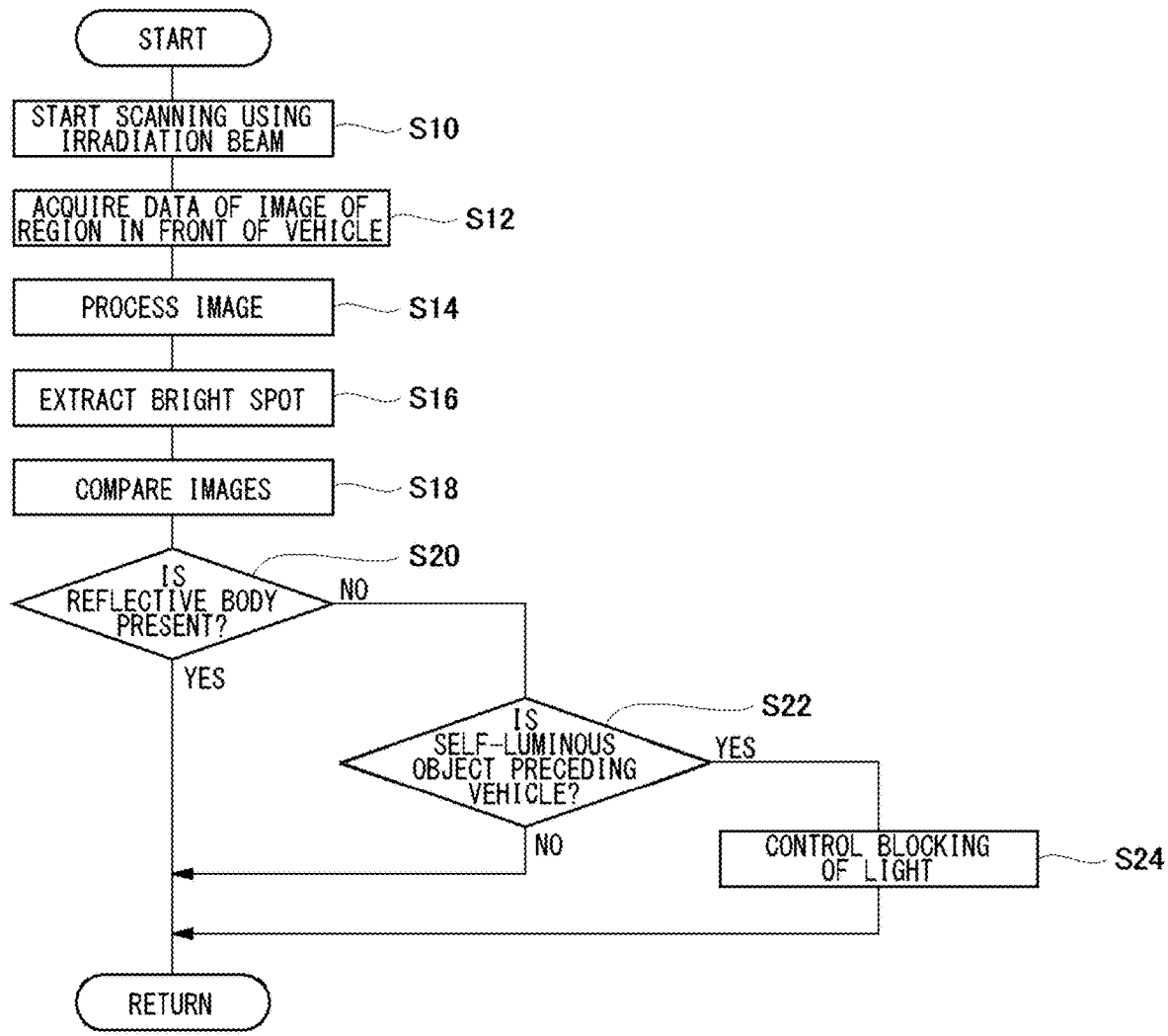
FIG. 33 is a flowchart illustrating the processing for determining a reflective body according to the seventh embodiment.

FIG. 33 is a flowchart illustrating the processing for determining a reflective body according to this embodiment. When forward irradiation using a high beam-light distribution pattern is required according to the driver's selection or the situation of travel environment, the scanning of a region in front of a vehicle with an irradiation beam emitted from the vehicle headlight 10 is started (S10). Next, the image processing device 1048 acquires the data of the image of the region in front of the vehicle that is taken by the in-vehicle camera 1050 (S12), processes the image (S14), and sends the processed image to the CPU 1038. The CPU 1038 extracts bright spots on the basis of the image data of which the image has been processed (S16). The CPU 1038 extracts bright spots even on the basis of the data of a plurality of images that are taken at different timings, and compares the plurality of images (S18).

Meanwhile, an image, which is taken when a region to which a driver pays attention (a middle region in front of the vehicle in this embodiment) is irradiated with an irradiation beam, and an image, which is taken when the region is not irradiated, are included in the plurality of images. Not only the tail lamp TL of the vehicle-in-front 1052 present on the front but also the delineators 600c and 600d reflecting an irradiation beam can be detected from the image that is taken by the camera when the middle region in front of the vehicle, which is included in a light distribution pattern, is irradiated with an irradiation beam. Meanwhile, the tail lamp TL of the vehicle-in-front 1052 present on the front can be detected from the image that is taken by the camera when the middle region in front of the vehicle is not irradiated with an irradiation beam, but the delineators 600c and 600d not irradiated with an irradiation beam are not detected.

Accordingly, whether a reflective body or a self-luminous object is present in a partial region is determined through the comparison between the image that is taken when the partial region is irradiated with an irradiation beam and the image that is taken when the partial region is not irradiated with an irradiation beam.

The CPU 1038 discriminates whether a reflective body is present in the partial region on the basis of the analysis results of the plurality of above-mentioned images (S20). Specifically, if a bright spot, which is detected at a position corresponding to the partial region in the image taken when the partial region is irradiated with an irradiation beam, is detected as a vanishing point or a very dark point in the image that is taken when the partial region is not irradiated with an irradiation beam, it is determined that the bright spot is a reflective body (Yes in S20). Since there is no concern that glare is directed even though the forward irradiation using a high beam-light distribution pattern continues to be performed in this case, processing is temporarily ended. Meanwhile, if a bright spot is detected at a position corresponding to the partial region in the image that is taken when the partial region is not irradiated with an irradiation beam, it is determined that a self-luminous object is present in the partial region (No in S20).

The self-luminous object includes a street light, an illumination lamp, and the like other than a tail lamp TL or a headlamp HL of a vehicle-in-front. Accordingly, the CPU 1038 determines whether the self-luminous object is a vehicle-in-front (S22). The determination of whether the self-luminous object is a vehicle-in-front is performed using information, such as light intensity or a distance of the bright spot, a color, an angle, and a moving direction, and the relative speed of the self-luminous object, and the positional relationship between the self-luminous object and the shapes of lines on the road. If it is determined that the self-luminous object is not a vehicle-in-front (No in S22), processing is temporarily ended since there is no concern that glare is directed even though the forward irradiation using a high beam-light distribution pattern continues to be performed. Meanwhile, if it is determined that the self-luminous object is a vehicle-in-front (Yes in S22), glare is directed at the vehicle-in-front when the forward irradiation using a high beam-light distribution pattern continues to be performed. Accordingly, a control for blocking light in a region including the vehicle-in-front is performed (S24).

The vehicle monitor according to this embodiment can discriminate a reflective body present on the front while forming a normal high beam-light distribution pattern as described above. For this reason, special control of light distribution does not need to be performed to detect a vehicle on the front, so that a driver does not feel discomfort. Further, since the vehicle monitor according to this embodiment can suppress the erroneous detection of a reflective body including a delineator, the vehicle monitor can accurately and easily detect a vehicle that travels on the front at night.

Figure 34:
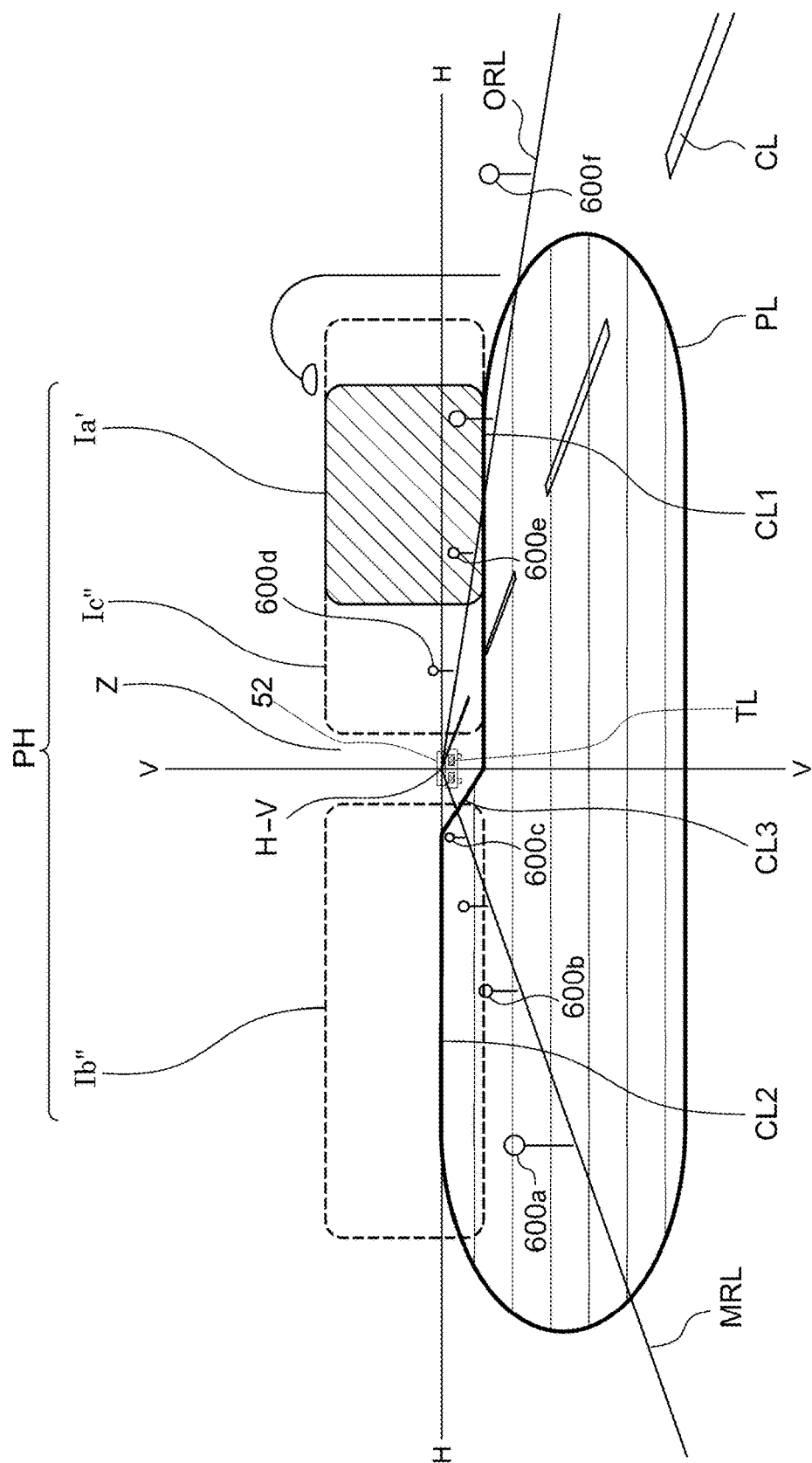
FIG. 34 is a view illustrating a state where light is blocked on a part of a high beam-light distribution pattern.

As described in each of the above-mentioned embodiments, the vehicle headlight 10 is adapted to be capable of blocking light on a part of a high beam-light distribution pattern by turning on and off the LED 28. FIG. 34 is a view illustrating a state where light is blocked on a part of a high beam-light distribution pattern.

As illustrated in FIG. 34, a high beam-light distribution pattern PH includes a light blocking portion Z and regions Ib" and Ic" formed on both sides of the light blocking portion Z. According to the vehicle headlight 10 of this embodiment, the control of light distribution using a high beam-light distribution pattern can be performed in a range where glare is not directed at a vehicle-in-front. Accordingly, forward visibility can be improved.

Figure 35:
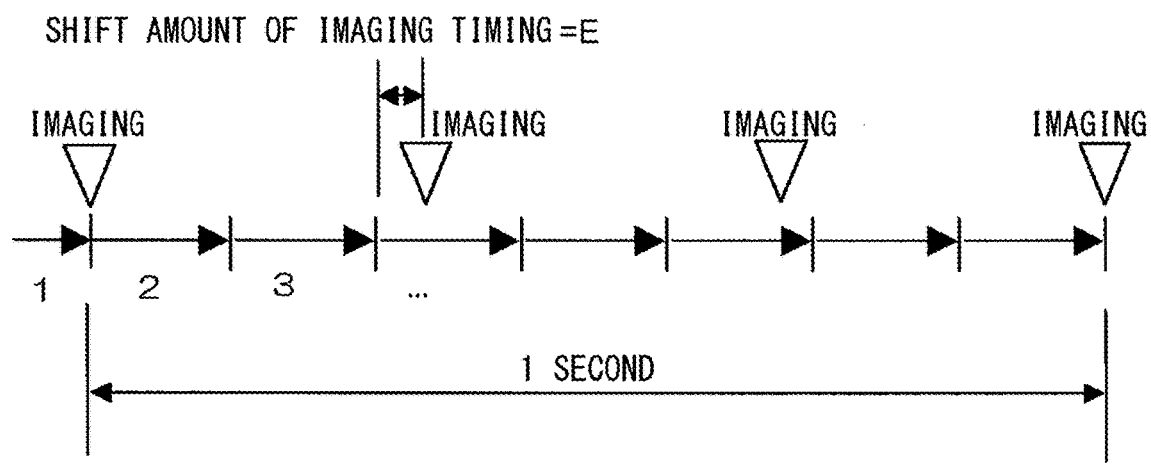
FIG. 35 is a view schematically illustrating an irradiation position and imaging timing.

Next, imaging timing and the irradiation position of an irradiation beam that is scanned horizontally will be described. FIG. 35 is a view schematically illustrating an irradiation position and imaging timing. The optical unit according to the embodiment scans an irradiation beam so that a region irradiated with an irradiation beam varies at each of the timing of plural times of imaging that are performed by a camera. That is, the optical unit scans an irradiation beam so that a region irradiated with an irradiation beam at the timing of Nth (here, N is a natural number) imaging performed by the in-vehicle camera 1050 is different from a region irradiated with an irradiation beam at the timing of (N+1)th imaging performed by the in-vehicle camera 1050. Meanwhile, an image to be taken may not necessarily be a continuous image. Further, image data, which is obtained by averaging image data of about 3 to 10 frames, may be treated as one image.

If imaging timing and the irradiation position of an irradiation beam that is scanned horizontally are shown while a horizontal axis is used as a time axis as illustrated in FIG. 35, the shift amount "E" of imaging timing relative to a scanning period is a remainder that is obtained when the number of times of scanning per second is divided by the number of times of imaging. Meanwhile, FIG. 35 shows a case where the number of times of scanning is 7 times per second and the number of times of imaging is 3 times per second. In this case, the shift amount E of imaging timing relative to a scanning period is ⅓ that is a remainder obtained when 7 is divided by 3.

Figure 36:
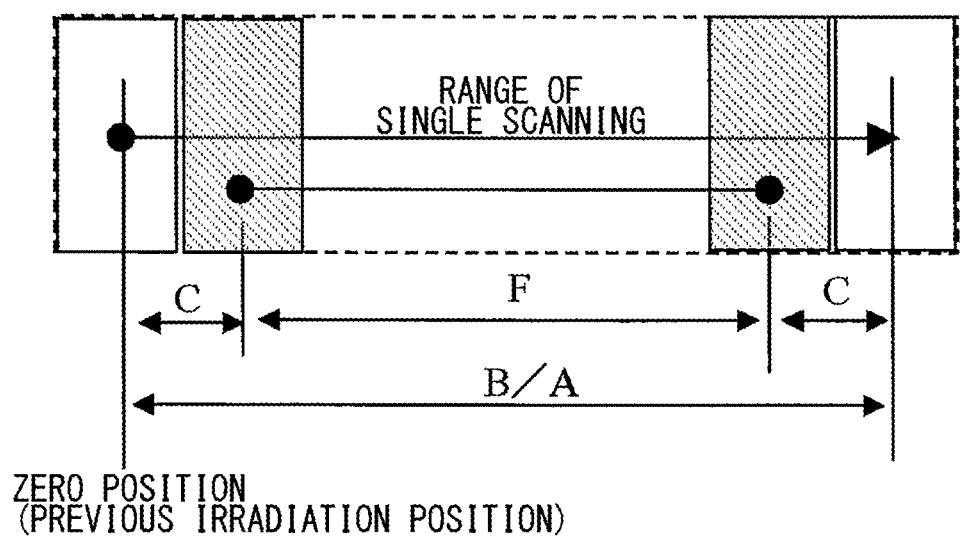
FIG. 36 is a view schematically illustrating a condition where the same region of a continuous taken image is not continuously irradiated.

FIG. 36 is a view schematically illustrating a condition where the same region of a continuous taken image is not continuously irradiated.

When the irradiation position of an irradiation beam in a previous taken image is assumed as a left end of a scanned region (a zero position of FIG. 36) as illustrated in FIG. 36, the same region of a continuous taken image is not irradiated if the irradiation position at the next imaging timing is in the range of F of FIG. 36.

Accordingly, assuming that the number of times of scanning of the optical unit is represented by A [times/s], scanning speed is represented by B [deg/s], the width of an irradiation beam is represented by C [deg], and the number of times of imaging of the camera is represented by D [times/s], the irradiation range of an irradiation beam in the latest taken image does not correspond to the irradiation range of an irradiation beam in a taken image immediately before the latest taken image when the following expression (1) is satisfied.

$$C \leq (\text{decimal part of } A/D) \times (B/A) \leq (B/A) - C \quad \text{Expression (1)}$$

Here, it is preferable that the number A of times of scanning be in the range of about 60 to 1000 [times/s]. Further, it is preferable that scanning speed B be in the range of about 10 to 60 [deg/s]. Furthermore, it is preferable that the width C of an irradiation beam be in the range of about 1 to 5 [deg]. Moreover, it is preferable that the number D of times of imaging of the camera be in the range of about 10 to 60 [times/s]. Accordingly, it is possible to take an image when a certain region is irradiated with an irradiation beam and an image when the certain region is not irradiated with an irradiation beam.

Meanwhile, for example, the following expression (2) may be satisfied as a condition where the same positions in M taken images do not continue to be irradiated.

$$C/(N-1) \leq (\text{decimal part of } A/D) \times (B/A) \leq (B/A) - C(N-1) \quad \text{Expression (2)}$$

Eighth Embodiment

Figure 37:
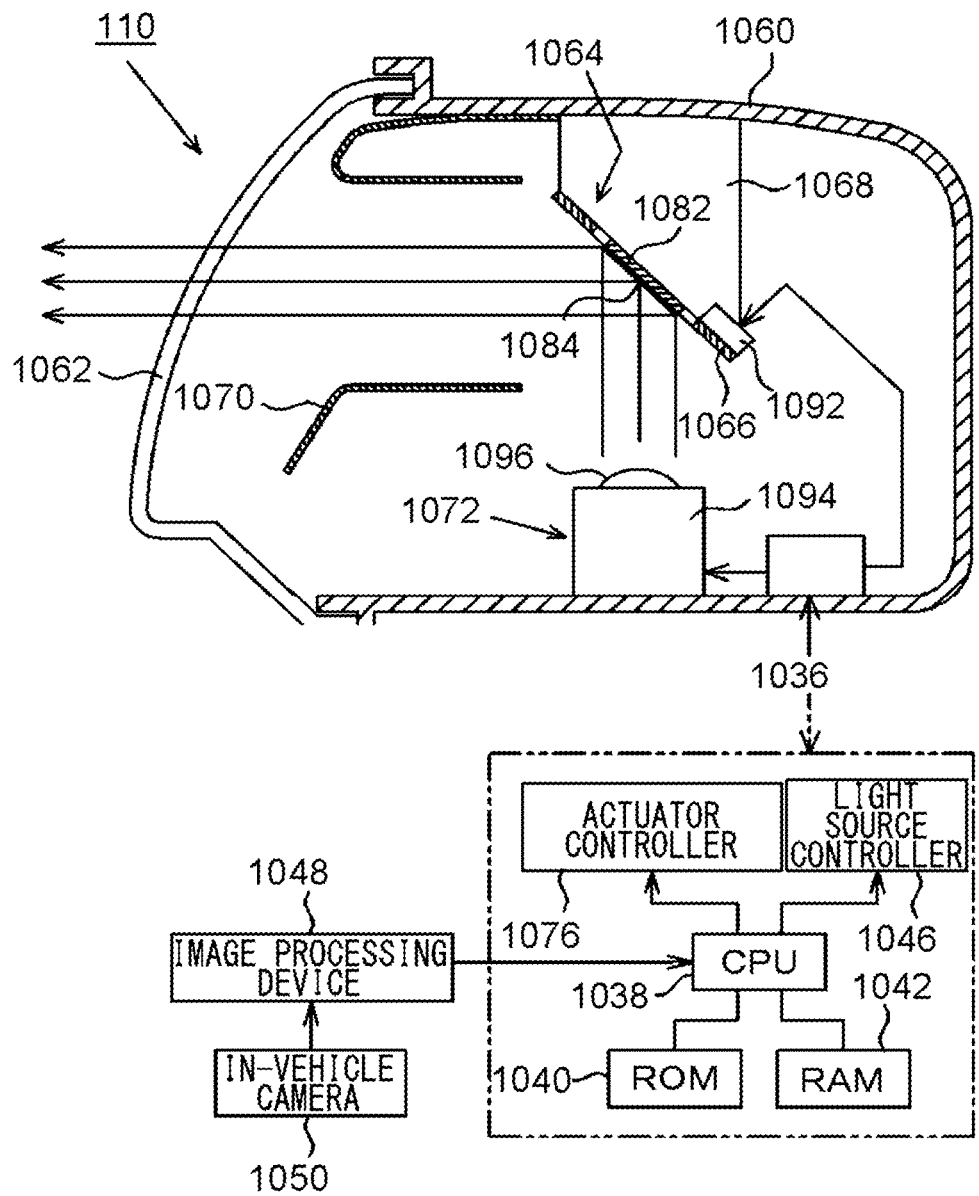
FIG. 37 is a schematic view showing the entire structure of a vehicle headlight according to an eighth embodiment.
Figure 38:
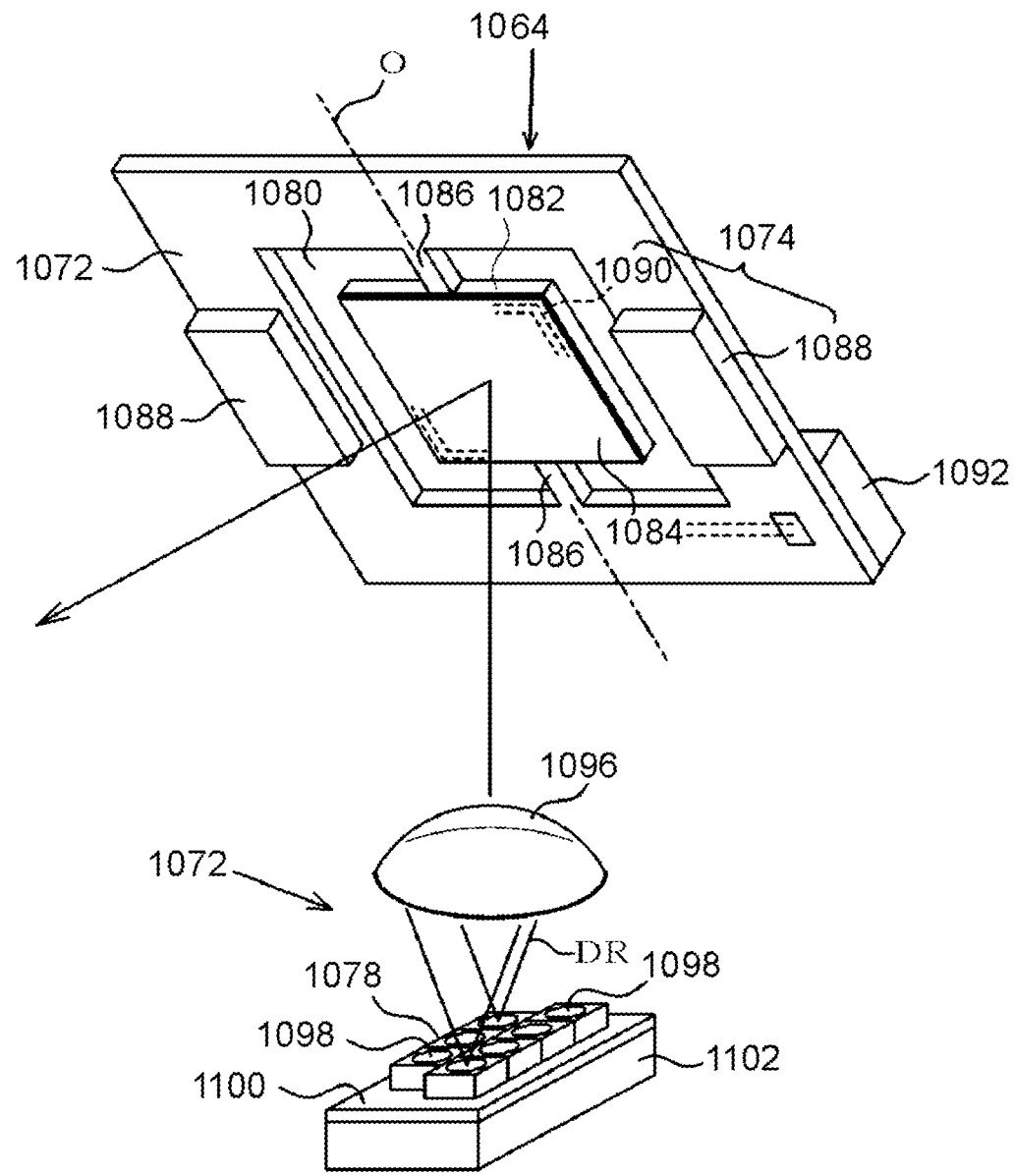
FIG. 38 is a perspective view showing a mirror unit and a light source unit.
Figure 39:
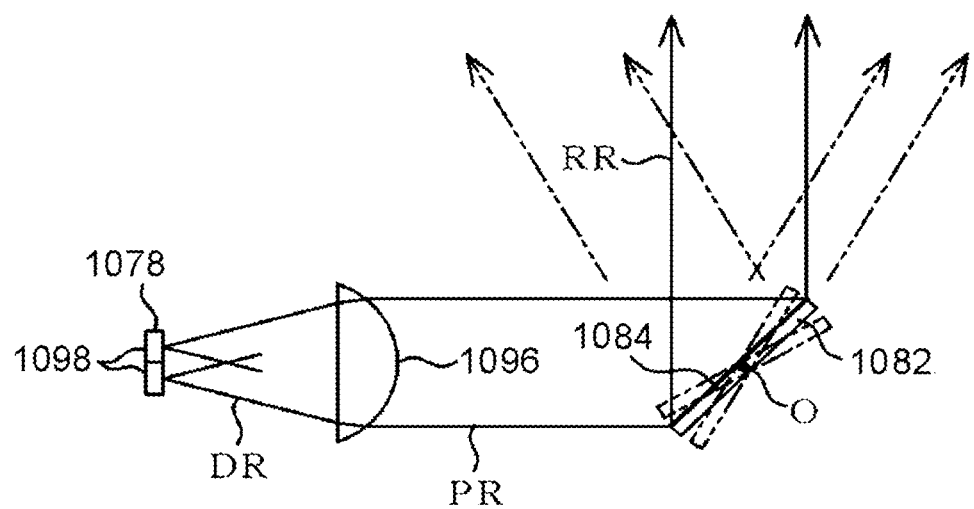
FIG. 39 is a view schematically showing the combination of a light source, an optical system for shaping, and a mirror.

The rotating reflector has been described as an optical unit by way of example in each of the above-mentioned embodiments, but a resonance mirror may be used. This embodiment will be described below with reference to the drawings. FIG. 37 is a schematic view showing the entire structure of a vehicle headlight according to an eighth embodiment. FIG. 38 is a perspective view showing a mirror unit and a light source unit. FIG. 39 is a view schematically showing the combination of a light source, an optical system for shaping, and a mirror. Meanwhile, the same structures as those of the above-mentioned embodiments are denoted by the same reference numerals and the description thereof will not be repeated.

As illustrated in FIG. 37, a vehicle headlight 110 according to the eighth embodiment includes a housing 1060 that is provided at the front portion of a vehicle body. The front surface of the housing 1060 is covered with a translucent cover 1062, and a mirror unit 1064 is installed at the central portion of the housing 1060. Abase 1066 of the mirror unit 1064 is mounted on the housing 1060 by a bracket 1068 so as to be inclined, and an extension 1070 is disposed between the base 1066 and the translucent cover 1062. A light source unit 1072 and a control unit 1036 are installed on the bottom wall of the housing 1060 below the mirror unit 1064. A portion where the light source unit 1072 is installed is not limited to an example illustrated in FIG. 37, and may be a side wall of the housing 1060.

The control unit 1036 is provided with a CPU 1038, a ROM 1040, a RAM 1042, an actuator controller 1076 that controls a scanning actuator 1074 (see FIG. 38) of the mirror unit 1064, and a light source controller 1046 that controls a light source 1078 of the light source unit 1072. A plurality of light distribution control programs is stored in the ROM 1040. The CPU 1038 selectively executes these programs, outputs operation commands to the actuator controller 1076 and the light source controller 1046, and controls a light distribution pattern formed in front of a vehicle. Further, the control unit 1036 is connected to an image processing device 1048 of the vehicle. The image processing device 1048 analyzes the imaging data of an in-vehicle camera 1050 and provides the information on the road surface in front of the vehicle to the control unit 1036.

As illustrated in FIG. 38, the base 1066 of the mirror unit 1064 is provided with a turning body 1082 in an opening portion 1080 and a mirror 1084 is formed on the surface of the turning body 1082 by means of such as plating or deposition. The turning body 1082 is supported by a vertical torsion bar 1086 so that the turning body 1082 can be turned to the left and right relative to the base 1066. Permanent magnets 1088, which form magnetic fields orthogonal to the torsion bar 1086, are disposed on the left and right sides of the base 1066. A coil 1090 is wired in the turning body 1082, and is connected to the control unit 1036 through a terminal part 1092. Further, the permanent magnets 1088 and the coil 1090 form the scanning actuator 1074. The actuator controller 1076 controls the intensity and direction of drive current flowing in the coil 1090, so that the turning body 1082 is reciprocatively turned integrally with the mirror 1084 about a vertical axis (O).

The light source unit 1072 is provided with the light source 1078 at the lower portion of a casing 1094 (see FIG. 37), and is provided with a plano-convex lens 1096 as the optical system for shaping at the upper portion of the casing 1094. The light source 1078 is formed of a plurality of light emitting elements 1098, the light emitting elements 1098 are arranged on a light source substrate 1100, and a heat sink 1102 for cooling the light emitting elements 1098 is provided on the lower surface of the light source substrate 1100. A LED, which emits diffused light DR, is used as the light emitting element 1098, and a plurality of LEDs are arranged on the light source substrate 1100 in a predetermined form. Further, the plano-convex lens 1096 shapes the light emitted from the light source 1078 so that the light emitted from the light source 1078 corresponds to the size of the mirror 1084, and makes the light enter the mirror 1084. Accordingly, it is possible to make the light, which is reflected by the mirror 1084, bright by the effective use of the light of the plurality of light emitting elements 1098.

Since the plano-convex lens 1096 is used as the optical system for shaping in the vehicle headlight 110 according to this embodiment, as illustrated in FIG. 39, the light emitted from the light source 1078 (the diffused light DR of the LEDs) enters the mirror 1084 as parallel light PR after being shaped by the plano-convex lens 1096. For this reason, the mirror 1084 can reflect the parallel light as it is, and can directly scan reflected light RP to the front of the vehicle. Accordingly, an optical system for concentrating light such as a projection lens may be omitted from the front of the mirror 1084, so that it is possible to reduce the number of parts of the optical system of the vehicle headlight 110. Further, there is also an advantage that the mirror 1084 can be turned at a large angle and widely scan a region in front of the vehicle without a limitation by the optical system for concentrating light.

Ninth Embodiment

The vehicle monitor using one rotating reflector, which is provided in one of left and right vehicle headlights 10, has been described in the seventh embodiment, but the invention is not necessarily limited to this combination. A vehicle monitor using a plurality of rotating reflectors 26, which are provided in lamp units 20 of the respective left and right vehicle headlights 10, will be described in this embodiment. Meanwhile, in this embodiment, the same structure as that of each of the above-mentioned embodiments will be denoted by the same reference numerals and the description thereof will not be repeated.

A general vehicle includes a pair of left and right vehicle headlights 10. Accordingly, a case where the images of light distribution patterns formed by irradiation beams of two optical units of the left and right vehicle headlights 10 are taken will be described in this embodiment.

A vehicle monitor according to this embodiment includes two lamp units 20 that form a light distribution pattern by scanning irradiation beams to the front of the vehicle, an in-vehicle camera 1050 that takes an image of a region in front of the vehicle, and a determining device that determines whether a reflective body is present in front of the vehicle. The two lamp units 20 are built in the above-mentioned vehicle headlights 10, which are provided at the left and right portions of the vehicle, respectively. Further, the determining device according to this embodiment is formed of a CPU 1038 and an image processing device 1048. On the basis of an image that is taken by the in-vehicle camera 1050 when a partial region included in the light distribution pattern is irradiated with irradiation beams and an image that is taken by the in-vehicle camera 1050 when the partial region is not irradiated with irradiation beams, the determining device determines whether a reflective body reflecting irradiation beams is present in the partial region.

Figure 40:
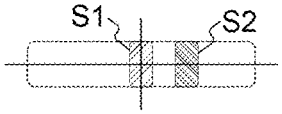
FIG. 40 is a view schematically showing a state where a partial region included in alight distribution pattern is irradiated with two irradiation beams.

FIG. 40 is a view schematically showing a state where a partial region included in a light distribution pattern is irradiated with two irradiation beams. In FIG. 40, at certain timing, an irradiation region of a first optical unit of the right vehicle headlight 10 is represented by S1 and an irradiation region of a second optical unit of the left vehicle headlight 10 is represented by S2. The vehicle monitor according to this embodiment drives the respective optical units (rotating reflectors 26) so that an irradiation region of the light distribution pattern is changed at the timings of a plurality of times of imaging performed by the in-vehicle camera 1050. In other words, the vehicle monitor according to this embodiment drives the rotating reflectors 26 so that irradiation regions of the light distribution pattern do not correspond to each other at the respective timings of the imaging performed by the in-vehicle camera 1050.

Two cases to be described below are considered as a condition where irradiation regions of the irradiation beams forming a light distribution pattern are not changed at the respective imaging timings. First, Case 1 illustrated in FIG. 40 is a case where the irradiation regions of the irradiation beams of the respective two rotating reflectors 26 are not changed at the respective imaging timings. That is, in Case 1 illustrated in FIG. 40, the position of S1 that is an irradiation region of a first rotating reflector of the right vehicle headlight 10 and the position of S2 that is an irradiation region of a second rotating reflector of the left vehicle headlight 10 are not changed at the respective imaging timings (first to fourth frames).

This condition corresponds to a case where the scanning frequency of each of the rotating reflectors is the integer multiple of the imaging frequency of the camera. In more detail, assuming that the number of times of scanning (scanning frequency) of the first rotating reflector is represented by A1 (times/s), the number of times of scanning (scanning frequency) of the second rotating reflector is represented by A2 (times/s), the number of times of imaging (imaging frequency) of the in-vehicle camera 1050 is represented by D (times/s), and m and n are natural numbers, this condition corresponds to a case where equations mD=A1 and nD=A2 are satisfied.

Next, Case 2 illustrated in FIG. 40 is a case where the irradiation regions of the irradiation beams of the respective rotating reflectors are changed at every imaging timing but an irradiation region (S1+S2) where the irradiation beams of the two rotating reflectors are combined is not changed apparently. That is, in Case 2 illustrated in FIG. 40, an irradiation region of an irradiation beam of the first rotating reflector is S1 and an irradiation region of an irradiation beam of the second rotating reflector is S2 in the first frame (third frame) that is imaged by the in-vehicle camera 1050. Further, an irradiation region S1' of an irradiation beam of the first rotating reflector in the second frame (fourth frame), which is imaged by the in-vehicle camera 1050, is the same as the irradiation region S2 of the irradiation beam of the second rotating reflector in the first frame (third frame) that is imaged by the in-vehicle camera 1050. Likewise, an irradiation region S2' of an irradiation beam of the second rotating reflector in the second frame (fourth frame), which is imaged by the in-vehicle camera 1050, is the same as the irradiation region S1 of the irradiation beam of the first rotating reflector in the first frame (third frame) that is imaged by the in-vehicle camera 1050. Accordingly, in Case 2, the irradiation region (S1+S2) where the irradiation beams of the two rotating reflectors are combined is not changed apparently at the respective imaging timings (first to fourth frames).

This condition corresponds to a case where the scanning frequency of each of the rotating reflectors is the (integer+0.5) multiple of the imaging frequency of the camera and the phases of irradiation beams of the respective rotating reflectors are shifted from each other by a half period. In more detail, assuming that the number of times of scanning (scanning frequency) of the first rotating reflector is represented by A1 (times/s), the number of times of scanning (scanning frequency) of the second rotating reflector is represented by A2 (times/s), the number of times of imaging (imaging frequency) of the in-vehicle camera 1050 is represented by D (times/s), and m and n are natural numbers, this condition corresponds to a case where equations (m+0.5)D=A1 and (n+0.5)D=A2 are satisfied.

The vehicle monitor according to this embodiment needs to rotationally drive the respective rotating reflectors so that the scanning using the irradiation beams of the respective rotating reflectors does not satisfy the condition of Case 1 or 2. That is, assuming that the number of times of scanning of the first optical unit is represented by A1 (times/s), the number of times of scanning of the second optical unit is represented by A2 (times/s), the number of times of imaging of the in-vehicle camera 1050 is represented by D (times/s), and m and n are natural numbers, the vehicle monitor controls the rotating reflectors so as to satisfy the following expressions (1) and (2).

$mD<A1<(m+0.5)D$ or $(m+0.5)D<A1<(m+1)D$   Expression (1)

$nD<A2<(n+0.5)D$ or $(n+0.5)D<A2<(n+1)D$   Expression (2)

Meanwhile, if the number A1 of times of scanning and the number A2 of times of scanning are too close to the integer multiple or [integer+0.5] multiple of the number D of times of imaging, the movement of an irradiation region at every imaging timing is reduced. For this reason, time, which is required to ordinarily take an image of the entire region of the light distribution pattern having been irradiated, is lengthened. Accordingly, there is also considered a case where the further improvement of the responsiveness or detection accuracy of the vehicle monitor is required. In this case, it is preferable that the number A1 of times of scanning and the number A2 of times of scanning be a value different from the integer multiple or [integer+0.5] multiple of the number D of times of imaging to some extent.

Accordingly, as a result of earnest examination, the present inventor has found that it is preferable that the vehicle monitor control the rotating reflectors so as to satisfy the following expressions (3) and (4).

$(m+0.1)D<A1<(m+0.4)D$ or $(m+0.6)D<A1<(m+0.9)D$   Expression (3)

$(n+0.1)D<A2<(n+0.4)D$ or $(n+0.6)D<A2<(n+0.9)D$   Expression (4)

The vehicle monitor according to this embodiment can improve responsiveness or detection accuracy by controlling the rotation of the rotating reflectors 26 or imaging timing so that Expressions (3) and (4) are satisfied.

Meanwhile, the above-mentioned DC brushless motor may be used to drive the rotating reflectors of the vehicle monitor according to this embodiment. The DC brushless motor can output rotation timing information. For this reason, for example, the above-mentioned control unit 1036 can control not only the rotational speed of the motor 1034 but also the rotational speed of the rotating reflector 26 by calculating rotational speed on the basis of information about the detected rotation timing and adjusting an output signal (output voltage) of the motor controller 1044.

Accordingly, since the vehicle monitor is provided with this control unit 1036, the vehicle monitor can easily change the rotational speed of the rotating reflector 26 to an appropriate value considering the imaging timing of the in-vehicle camera 1050.

Tenth Embodiment

In the past, generally, a radar using invisible light such as millimeter waves has included a plurality of receiving antennas, and has detected the direction or distance of an obstruction using obtained received signals by sequentially selecting the receiving antennas through switches or digital signal processing. However, since there is a restriction in reducing the size of the invisible-light radar that includes the plurality of receiving antennas, a place where the radar is installed is limited.

As a result of the recognition and earnest examination of this problem, the present inventor has thought up the structure of a certain obstruction detector. This obstruction detector can scan the surrounding region and detect an obstruction by reflecting invisible light, which is sent from an invisible-light radar, with a rotating reflector. In this case, if the waveform of a received signal and a region scanned at the timing where the received signal has been detected are known even though a plurality of receiving antennas are not provided, it is also possible to calculate the direction, the distance, or the like of an obstruction.

The invisible-light radar may use electromagnetic waves of various wavelength bands. However, a millimeter-wave radar using millimeter waves will be described below by way of example. Meanwhile, since there are various standards of wavelengths of millimeter waves according to countries or uses, wavelengths of millimeter waves are not particularly limited. For example, millimeter waves corresponding to, for example, a 47 GHz band (46.7 to 46.9 GHz), a 60 GHz band (59 to 66 GHz or 63 to 64 GHz), a 76 GHz band (76 to 77 GHz), a 94 GHz band (94.7 to 95.7 GHz), a 139 GHz band (139 to 140 GHz), and the like may be used.

Figure 41:
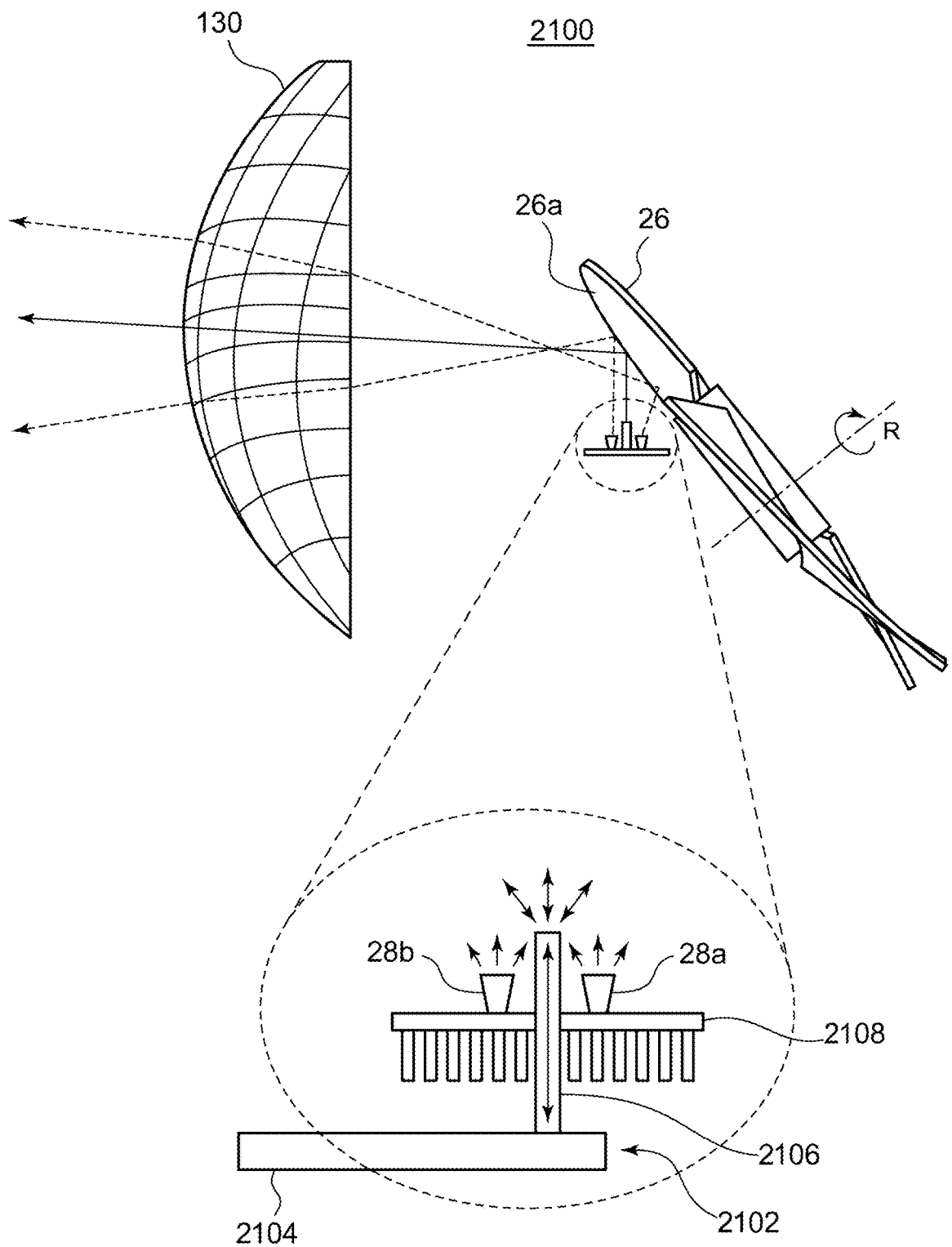
FIG. 41 is a top view schematically showing an obstruction detector according to a tenth embodiment.

Meanwhile, an obstruction detector according to this embodiment may also have a function as an optical unit of a vehicle lamp. That is, the obstruction detector may be formed using the optical unit of each of the above-mentioned embodiments. FIG. 41 is a top view schematically showing an obstruction detector according to a tenth embodiment. An obstruction detector 2100 according to this embodiment includes a millimeter-wave radar 2102, a rotating reflector 26 that is rotated about a rotation axis R in one direction while reflecting millimeter waves sent from the millimeter-wave radar 2102, and a projection lens 130 that focuses the millimeter waves reflected by the rotating reflector 26 and projects the millimeter waves to a surrounding region. The rotating reflector 26 is provided with a reflecting surface so as to scan the surrounding region with the millimeter waves that are reflected by the rotating reflector 26 while the rotating reflector 26 is rotated.

The millimeter-wave radar 2102 includes a monolithic millimeter-wave integrated circuit (MMIC: hereinafter, referred to as a "millimeter-wave integrated circuit") 2104 for a millimeter-wave radar, and a waveguide 2106 that is connected to the millimeter-wave integrated circuit 2104. The millimeter-wave integrated circuit 2104 sends predetermined millimeter waves of which the wavelengths are in the range of 1 to 10 millimeters and the frequencies are in the range of 30 to 300 GHz. The waveguide 2106 is provided so as to pass through the central portion of a heat sink 2108 on which LEDs 28a and 28b as light sources are mounted. That is, the millimeter-wave radar 2102 and the light sources are unitized in this embodiment. Further, the waveguide 2106 functions as both a sending part and a receiving part.

The sent millimeter waves are directed to the rotating reflector 26 through the waveguide 2106, and are reflected by blades 26a. The blades 26a have a twisted shape so that an angle between an optical axis and the reflecting surface is changed in the circumferential direction having a center on the rotation axis R. For this reason, the directions of the millimeter waves reflected by the blades 26a are changed by the rotation of the rotating reflector 26 so that the millimeter waves reflected by the blades 26a are directed to the projection lens 130. The millimeter waves entering the projection lens 130 are refracted and focused, so that the directivity of the millimeter waves is improved. The focused millimeter waves scan a region in front of the projection lens 130 in the state of irradiation beams.

Accordingly, since the obstruction detector 2100 according to this embodiment can scan the surrounding region with millimeter waves by the operation of the rotating reflector 26, it is possible to simplify the structure of the millimeter-wave radar 2102. Further, the diameter of the rotating reflector 26 according to this embodiment is substantially the same as the diameter of the projection lens 130 and the area of the blade 26a can also be increased according to the diameter of the rotating reflector 26. Accordingly, it is possible to efficiently reflect millimeter waves of which the directivity is low and which spread.

Furthermore, an in-vehicle millimeter-wave radar in the related art has often been disposed near a front grille, which is formed at the front portion of a vehicle, to sufficiently exhibit the performance thereof. However, the obstruction detector 2100 according to this embodiment reflects the millimeter waves, which are sent from the millimeter-wave radar 2102, by the rotating reflector 26, and scans the surrounding region with the reflected millimeter waves through the projection lens 130. In this case, the projection lens 130 apparently functions as an antenna of the radar. For this reason, the millimeter-wave radar 2102 does not need to be disposed on the outermost portion of the obstruction detector, and the emission direction of millimeter waves of the millimeter-wave radar 2102 also does not need to be directly directed to a scan range. For this reason, not only the degree of freedom of a place where the millimeter-wave radar 2102 is disposed can be increased and but also the obstruction detector can be disposed in a suitable place. Here, the surrounding region is a region around a place where the obstruction detector 2100 is installed. When the obstruction detector 2100 is installed in a vehicle as in this embodiment, the front, the rear, the side, and the like of the vehicle are included in the surrounding region.

The obstruction detector 2100 according to this embodiment further includes LEDs 28a and 28b that are semiconductor light emitting elements. As described in the above-mentioned embodiments, the rotating reflector 26 is provided with a reflecting surface so as to form a desired light distribution pattern in front of the vehicle by reflecting the light emitted from the LEDs 28a and 28b while being rotated. Further, the projection lens 130 projects the light, which is reflected by the rotating reflector 26, in the light irradiation direction. Accordingly, it is possible to achieve the scanning using millimeter waves and the formation of a light distribution pattern by the operation of the rotating reflector 26. That is, the obstruction detector 2100 and the vehicle headlight 10 are integrated.

Figure 42A:
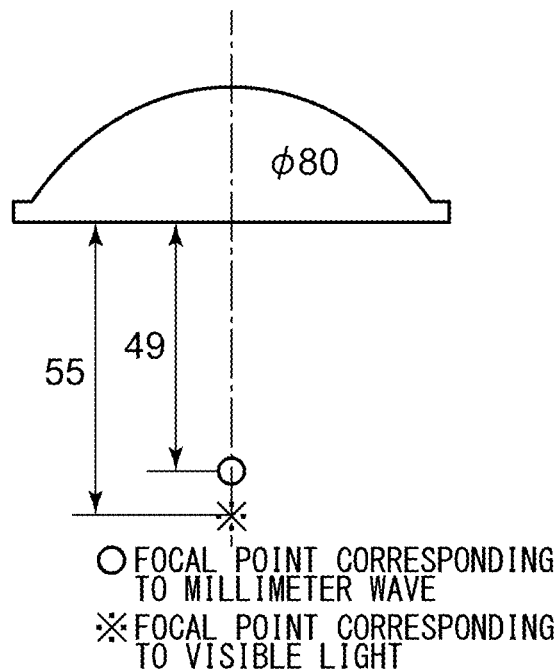
FIG. 42(a) is a view schematically showing the focal length of a millimeter wave and the focal length of visible light when a projection lens is made of polycarbonate.
Figure 42B:
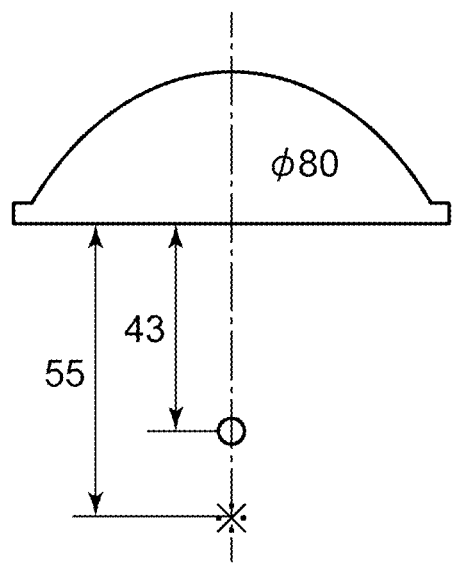
FIG. 42(b) is a view schematically showing the focal length of a millimeter wave and the focal length of visible light when a projection lens is made of acrylic.

Next, FIG. 42(a) is a view schematically showing the focal length of a millimeter wave and the focal length of visible light when the projection lens is made of polycarbonate, and FIG. 42(b) is a view schematically showing the focal length of a millimeter wave and the focal length of visible light when the projection lens is made of acrylic.

As illustrated in FIGS. 42(a) and 42(b), focal lengths are different since the wavelength of a millimeter wave is different from that of visible light even though the same projection lens is used. Further, the LEDs 28a and 28b are provided so that the positions of the virtual images of the LEDs (the positions of the secondary light sources) formed by the rotating reflector 26 are positioned near the focal point of the projection lens 130 corresponding to visible light. Furthermore, the millimeter-wave radar 2102 are provided so that the positions of the virtual images of the LEDs (the positions of the secondary light sources) formed by the rotating reflector 26 are positioned near the focal point of the projection lens 130 corresponding to a millimeter wave that is different from the focal point of the projection lens corresponding to visible light. Accordingly, the millimeter-wave radar 2102 and the LEDs 28a and 28b can be disposed at the positions of the focal points suitable therefore without interfering with each other.

Moreover, in the case of a general resin material, the focal point corresponding to a millimeter wave tends to be shorter than the focal point corresponding to visible light. Accordingly, in the obstruction detector 2100 according to this embodiment illustrated in FIG. 41, the end portion of the waveguide 2106 is positioned closer to the projection lens 130 than the LEDs 28a and 28b. In other words, the waveguide 2106 is provided so that the position of the virtual image of the end portion of the waveguide 2106 (the position of a secondary light source) formed by the rotating reflector 26 is positioned closer to the projection lens than the focal point corresponding to visible light. Accordingly, for example, the millimeter-wave integrated circuit 2104 of the millimeter-wave radar 2102 can be disposed more distant from the projection lens 130 than the LEDs 28a and 28b. As a result, light, which is directed to the projection lens 130 from the LEDs 28a and 28b, is prevented from being blocked by the millimeter-wave integrated circuit 2104.

The projection lens 130 according to this embodiment is made of a resin material. Since the projection lens is made of a resin material, the weight of the obstruction detector is reduced. In particular, when a semiconductor light emitting element such as a LED is used as a light source, the amount of generated heat is small as compared to an incandescent lamp or discharge lamp type light source in the related art. Accordingly, a resin material having low heat resistance can be used and costs are reduced. Meanwhile, as long as the projection lens is made of a material efficiently transmitting millimeter waves and visible light, the material of the projection lens is not particularly limited.

The invention has been described above with reference to the above-mentioned respective embodiments. However, the invention is not limited to the above-mentioned respective embodiments, and structure where the components of the respective embodiments are appropriately combined or substituted is also included in the invention. Further, the combination of the respective embodiments or the order of processings may be appropriately changed or modifications such as various changes in design may be added to each of the embodiments on the basis of the knowledge of those skilled in the art. Accordingly, embodiments to which the above-mentioned modifications have been added can be also included in the scope of the invention.

For example, in the vehicle headlight 10 according to the above-mentioned embodiment, the three blades of the rotating reflector 26 may be colored with red, green, and blue and a white irradiation beam may be formed by the mixture of colors. In this case, it is possible to change the color of an irradiation beam by controlling ratios of time that passes while the light of the LED 28 is reflected by the blades of which colors of the surfaces are different. Meanwhile, the coloring of the surfaces of the blades is achieved by forming a top coat layer using, for example, deposition.

Moreover, the vehicle headlight 10 can form spotlight, of which the maximum light intensity is very high, at a desired position by stopping the rotating reflector 26 at an arbitrary angle without rotating the rotating reflector 26. Accordingly, it is possible to call attention to a specific obstruction (including a person) by irradiating the specific obstruction with bright spotlight.

Figure 43:
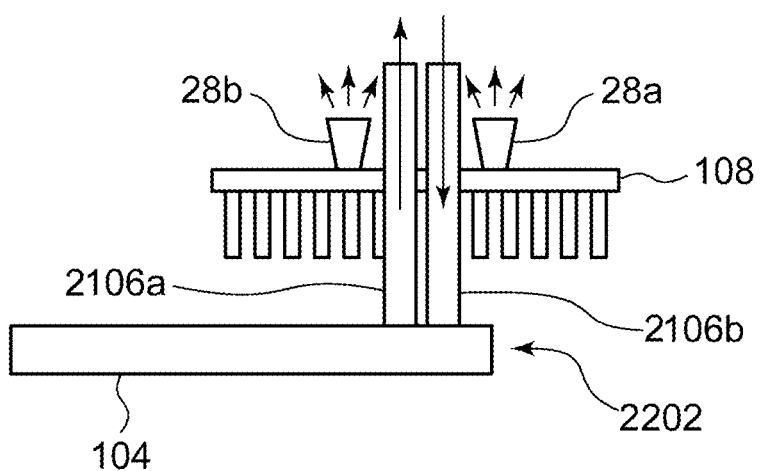
FIG. 43 is a schematic view of a millimeter-wave radar according to a modification.

Further, in the millimeter-wave radar 2102 illustrated in FIG. 41, the waveguide 2106 functions as both a sending part and a receiving part. FIG. 43 is a schematic view of a millimeter-wave radar according to a modification. As illustrated in FIG. 43, a millimeter-wave radar 2202 according to the modification is separately provided with a sending waveguide 2106a and a receiving waveguide 2106b.

Figure 29:
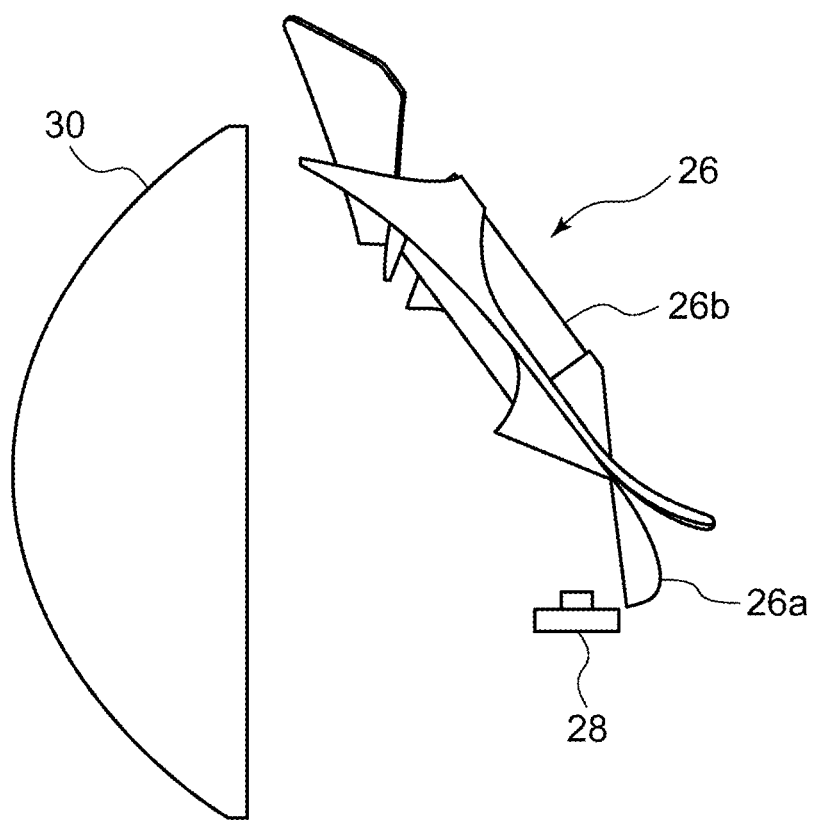
FIG. 29 is a view showing the disposition of the rotating reflector according to the modification.

Furthermore, in the lamp unit 20 illustrated in FIG. 1, the rotating reflector 26 is disposed so as to reflect the light of the LED 28 by the blade that is closer to the convex lens 30 than the rotating part 26b. FIG. 29 is a view showing the disposition of the rotating reflector according to the modification. As illustrated in FIG. 29, the rotating reflector 26 according to the modification is disposed so as to reflect the light of the LED 28 by the blade that is more distant from the convex lens 30 than the rotating part 26b. Accordingly, as illustrated in FIG. 29, the rotating reflector 26 can be disposed closer to the convex lens 30 and the depth (the longitudinal direction of the vehicle) of the lamp unit can be reduced.

Meanwhile, an aspherical lens used in the above-mentioned embodiment does not need to necessarily correct a distorted image and may not correct a distorted image.

A case where the optical unit is applied to a vehicle lamp has been described in each of the above-mentioned embodiments, but the application of the optical unit is not necessarily limited to the application to this field. For example, the optical unit may be applied to lighting equipments of stages or amusement facilities that provide illumination by changing various light distribution patterns. In the past, the lighting equipments of this field have required large drive mechanisms that change the illumination direction. However, since the optical unit according to this embodiment can form various light distribution patterns by rotating the rotating reflector and turning on/off the light source, a large drive mechanism is not needed. Accordingly, it is possible to reduce the size of the optical unit.

Further, in the optical unit according to the above-mentioned sixth embodiment, the plurality of light sources have been disposed in the longitudinal direction of the optical axis. However, the plurality of light sources may be disposed in the up and down direction of the optical axis. Accordingly, it is possible to perform scanning using the light of the light source in the up and down direction.

DESCRIPTION OF REFERENCE NUMERALS

10: vehicle headlight, 12: lamp body, 14: front cover, 16: lamp chamber, 18, 20: lamp unit, 22: reflector, 26: rotating reflector, 26a: blade, 26b: rotating part, 28: LED, 30: convex lens, 32: compound parabolic concentrator, 32a: opening portion.

INDUSTRIAL APPLICABILITY

The invention relates to an optical unit, and may be used for, for example, a vehicle lamp.

What is claimed is:
1. An optical unit comprising:
a rotating reflector including a plurality of blades rotated about a rotation axis in one direction while reflecting light emitted from a light source, the plurality of blades arranged in a circumferential direction of the rotation axis; and
a plurality of light sources that are formed of light emitting elements, wherein
the blades of the rotating reflector are each provided with a reflecting surface that does not intersect with the rotation axis so that the light of the light source reflected by the rotating reflector, while the rotating reflector is rotated, forms a desired light distribution pattern and a direction perpendicular to each reflecting surface is not perpendicular to the rotating axis, wherein each blade has a same shape so that each reflecting surface has a twisted shape so that an angle between the rotation axis and the reflecting surface is changed in a circumferential direction having a center on the rotation axis, and is shaped to change a direction of reflection of the light emitted from the light source periodically, relative to the rotation axis,
the plurality of light sources comprise:
a first light source disposed so that the light emitted in a direction inclined with respect to the rotation axis is reflected at a first position of each reflecting surface; and
a second light source disposed so that the light emitted in a direction inclined with respect to the rotation axis is reflected at a second position of each reflecting surface that is radially closer to the rotation axis than the first position.
2. An optical unit comprising:
a rotating reflector including a plurality of blades rotated about a rotation axis in one direction while reflecting light emitted from a light source, the plurality of blades arranged in a circumferential direction of the rotation axis;

a plurality of light sources that are formed of light emitting elements; and a projection lens that projects the light reflected by the rotating reflector in a light irradiation direction of the optical unit, wherein the blades of the rotating reflector are each provided with a reflecting surface that does not intersect with the rotation axis so that the light of the light source reflected by the rotating reflector, while the rotating reflector is rotated, forms a desired light distribution pattern and a direction perpendicular to each reflecting surface is not perpendicular to the rotating axis, wherein each blade has a same shape so that each reflecting surface has a twisted shape so that an angle between the rotation axis and the reflecting surface is changed in a circumferential direction having a center on the rotation axis, and is shaped to change a direction of reflection of the light emitted from the light source periodically, relative to the rotation axis, the plurality of light sources comprise:

a first light source disposed so that the light emitted in a direction inclined with respect to the rotation axis is reflected at a first position of each reflecting surface; and a second light source disposed so that the light emitted in a direction inclined with respect to the rotation axis is reflected at a second position of each reflecting surface that is radially closer to the rotation axis than the first position, and wherein the first light source is disposed closer to the projection lens than the second light source.

* * * * *